(12) United States Patent
Park et al.

(10) Patent No.: US 12,393,065 B2
(45) Date of Patent: Aug. 19, 2025

(54) LIGHT PATH CONTROL MEMBER AND DISPLAY DEVICE COMPRISING SAME

(71) Applicant: LG INNOTEK CO., LTD., Seoul (KR)

(72) Inventors: Jin Gyeong Park, Seoul (KR); Byung Sook Kim, Seoul (KR); Jong Sik Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 509 days.

(21) Appl. No.: 17/923,528

(22) PCT Filed: Apr. 15, 2021

(86) PCT No.: PCT/KR2021/004732
§ 371 (c)(1),
(2) Date: Nov. 4, 2022

(87) PCT Pub. No.: WO2021/225295
PCT Pub. Date: Nov. 11, 2021

(65) Prior Publication Data
US 2023/0185152 A1   Jun. 15, 2023

(30) Foreign Application Priority Data

May 7, 2020  (KR) .................. 10-2020-0054388
May 7, 2020  (KR) .................. 10-2020-0054674
May 8, 2020  (KR) .................. 10-2020-0055071

(51) Int. Cl.
*G02F 1/13*   (2006.01)
*G02F 1/1343*  (2006.01)
(Continued)

(52) U.S. Cl.
CPC ........ *G02F 1/1323* (2013.01); *G02F 1/13439* (2013.01); *G02F 1/167* (2013.01); *G02F 1/1676* (2019.01); *G02F 1/1685* (2019.01)

(58) Field of Classification Search
CPC .... G02F 1/1323; G02F 1/13439; G02F 1/167; G02F 1/1676; G02F 1/1685;
(Continued)

(56) References Cited

U.S. PATENT DOCUMENTS 8,970,798 B2   3/2015  Ahn
2013/0120828 A1   5/2013  Kato
(Continued)

FOREIGN PATENT DOCUMENTS

JP    2013-218176 A    10/2013
KR   10-2007-0013722 A   1/2007
(Continued)

*Primary Examiner* — James C. Jones
(74) *Attorney, Agent, or Firm* — Birch, Stewart, Kolasch & Birch, LLP

(57) ABSTRACT

A light path control member according to an embodiment comprises: a first substrate including an effective area and an ineffective area; a first electrode disposed on the first substrate; a second substrate disposed on the first substrate and including an effective area and an ineffective area; a second electrode disposed under the second substrate; and a light conversion unit disposed between the first electrode and the second electrode. The light conversion unit includes an alternating arrangement of partition wall parts and reception parts. A first hole passing through the first substrate is formed in at least one of the effective area or the ineffective area of the first substrate. A second hole passing through the first substrate is formed in at least one of the effective area or the ineffective area of the second substrate. A first connection electrode is disposed in the first hole, and a second connection electrode is disposed in the second hole.

19 Claims, 37 Drawing Sheets

(51) Int. Cl.
*G02F 1/167* (2019.01)
*G02F 1/1676* (2019.01)
*G02F 1/1685* (2019.01)

(58) Field of Classification Search
CPC ...... G02F 2201/42; G02F 1/1677; C09J 7/40; G02B 26/08
See application file for complete search history.

(56) References Cited

U.S. PATENT DOCUMENTS

| | | |
|---|---|---|
| 2016/0048228 A1 | 2/2016 | Lee |
| 2018/0067352 A1 | 3/2018 | Pellerite et al. |
| 2021/0373403 A1 | 12/2021 | Kim et al. |
| 2024/0142846 A1* | 5/2024 | Park ................ G02F 1/1676 |

FOREIGN PATENT DOCUMENTS

| | | |
|---|---|---|
| KR | 10-2013-0010738 A | 1/2013 |
| KR | 10-2013-0119330 A | 10/2013 |
| KR | 10-2014-0024376 A | 2/2014 |
| KR | 10-1485858 B1 | 1/2015 |
| KR | 10-2015-0125051 A | 11/2015 |
| KR | 10-2017-0112366 A | 10/2017 |
| KR | 10-2017-0112368 A | 10/2017 |
| WO | WO 2020/050582 A1 | 3/2020 |

\* cited by examiner

[FIG. 1]
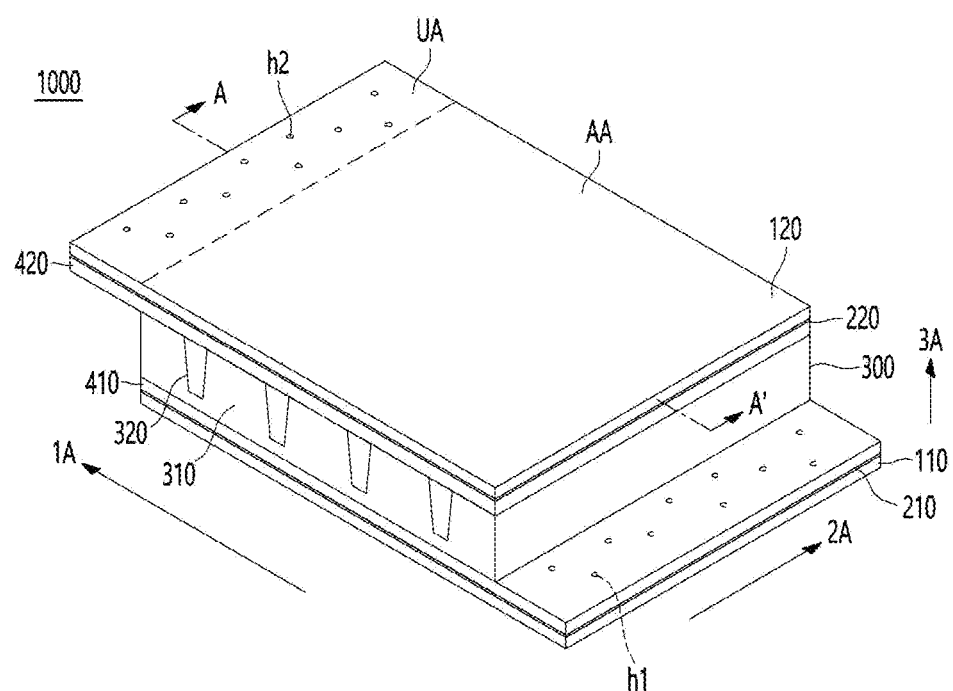
[FIG. 2]
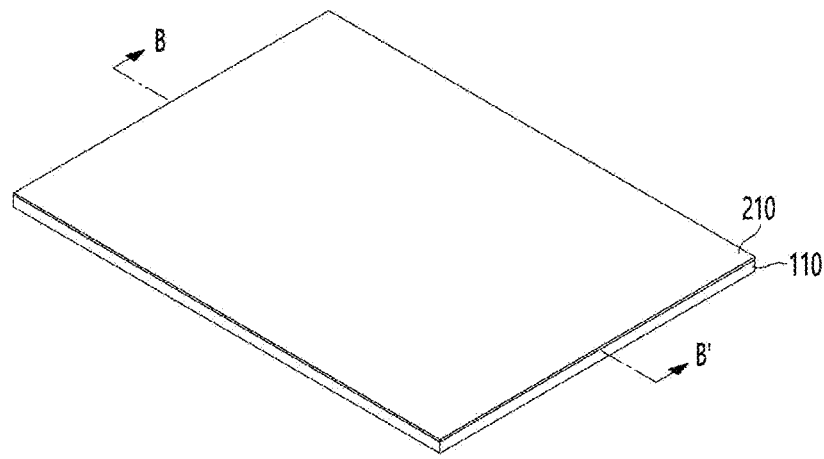

[FIG. 3]
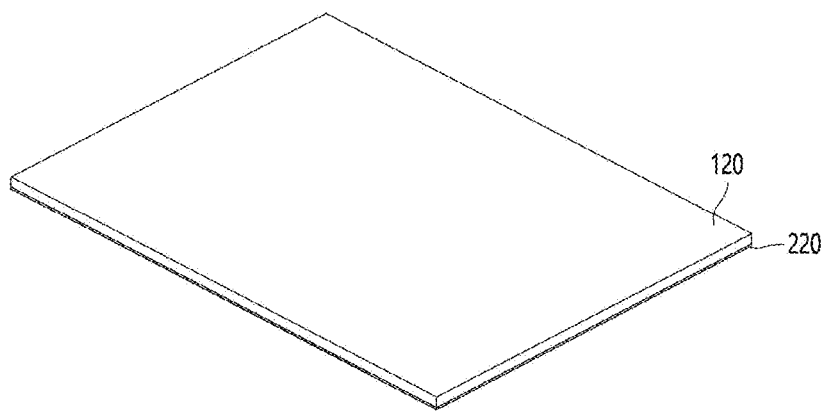
[FIG. 4]
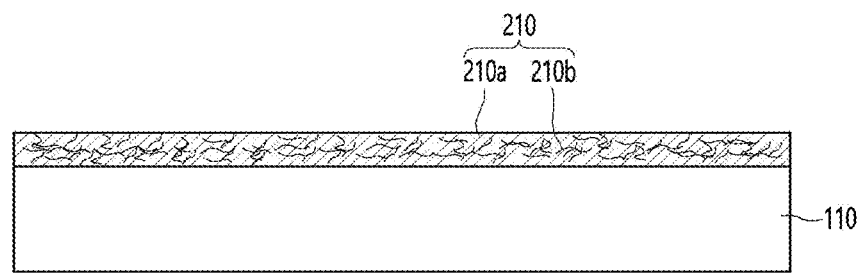

[FIG. 5]
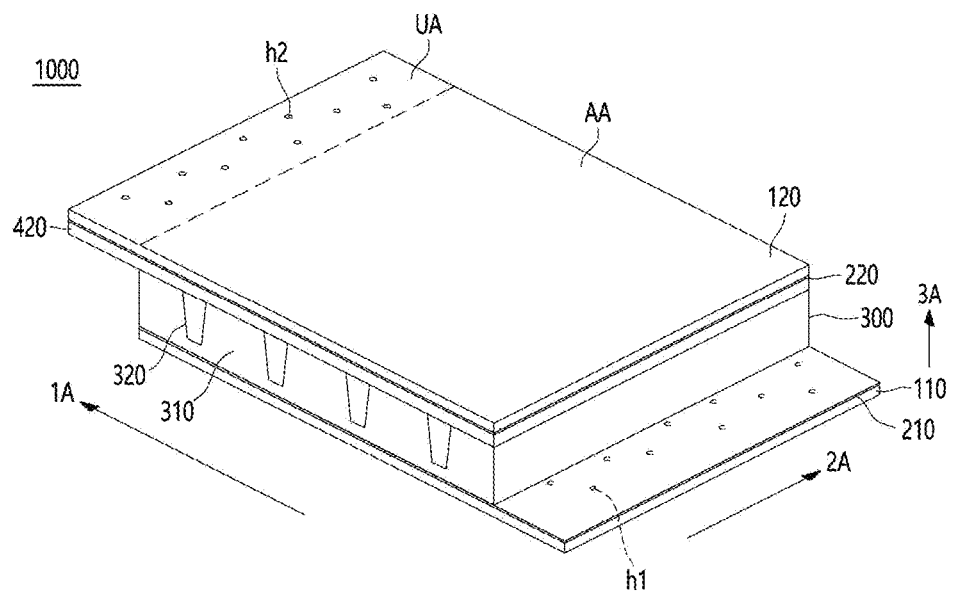
[FIG. 6]
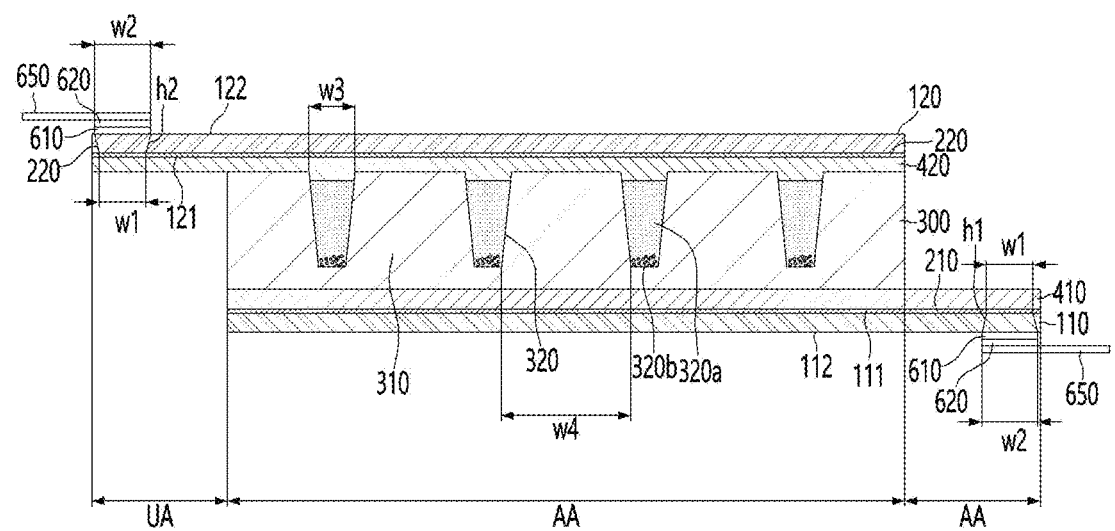

[FIG. 7]
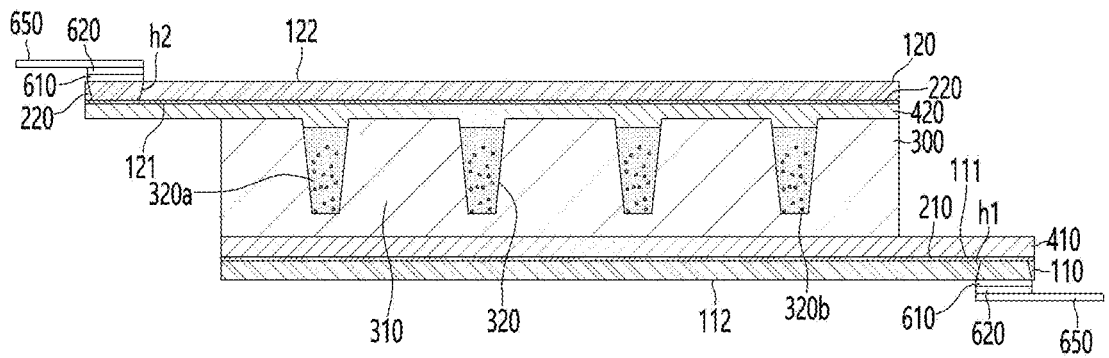
[FIG. 8]
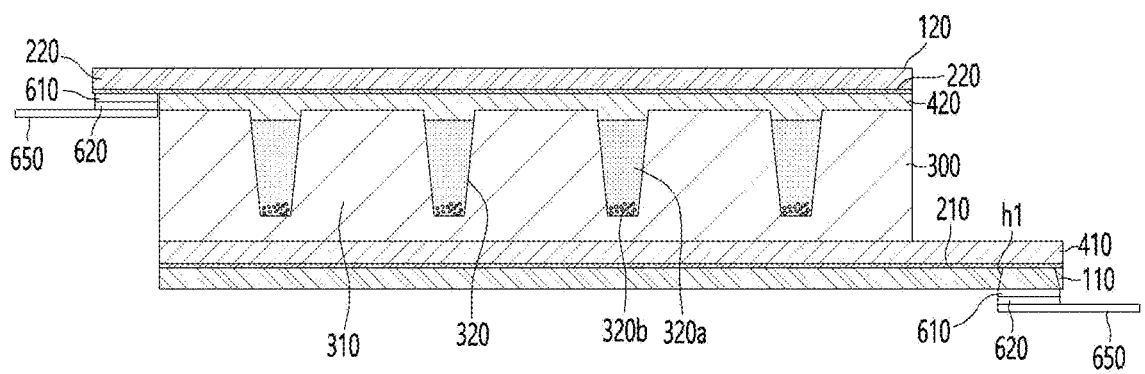
[FIG. 9]
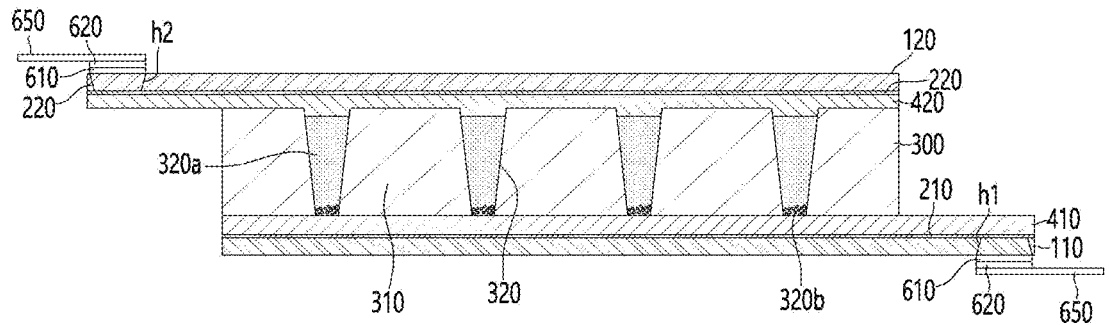

[FIG. 10]
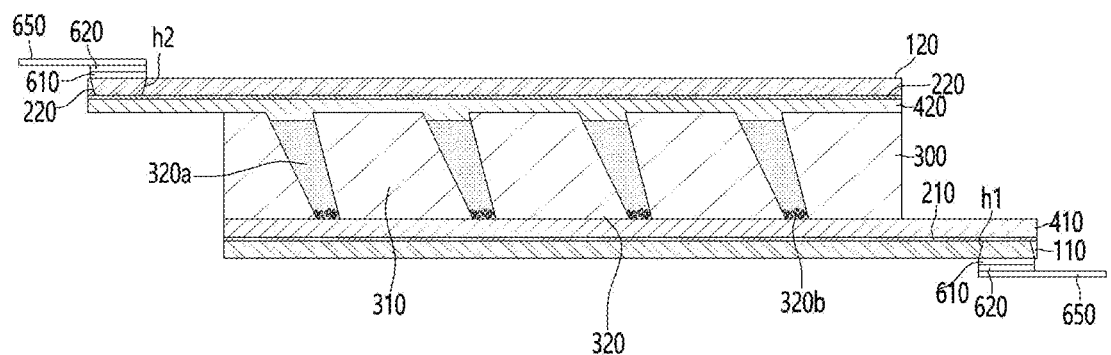
[FIG. 11]
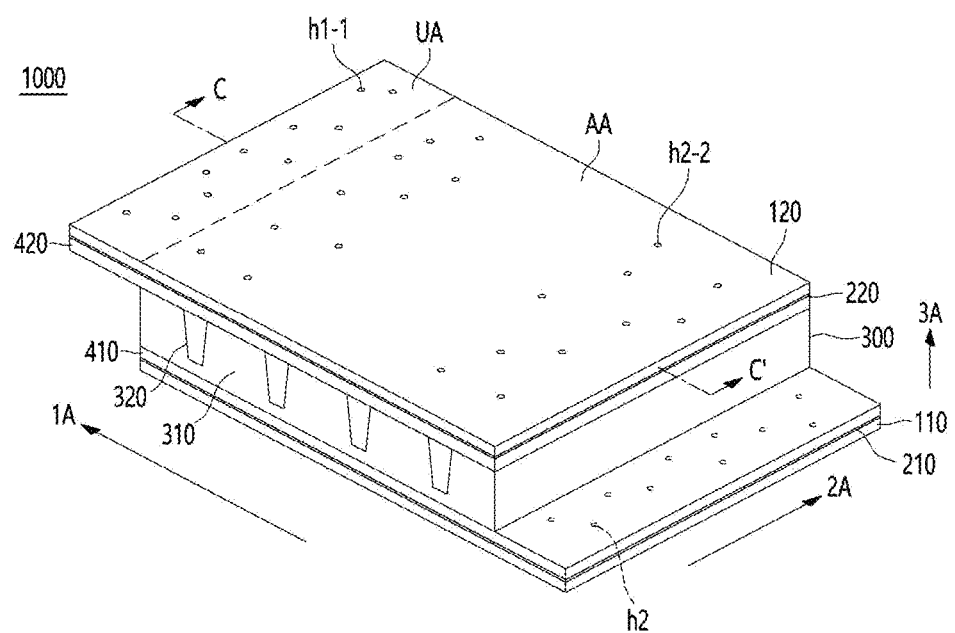

[FIG. 12]
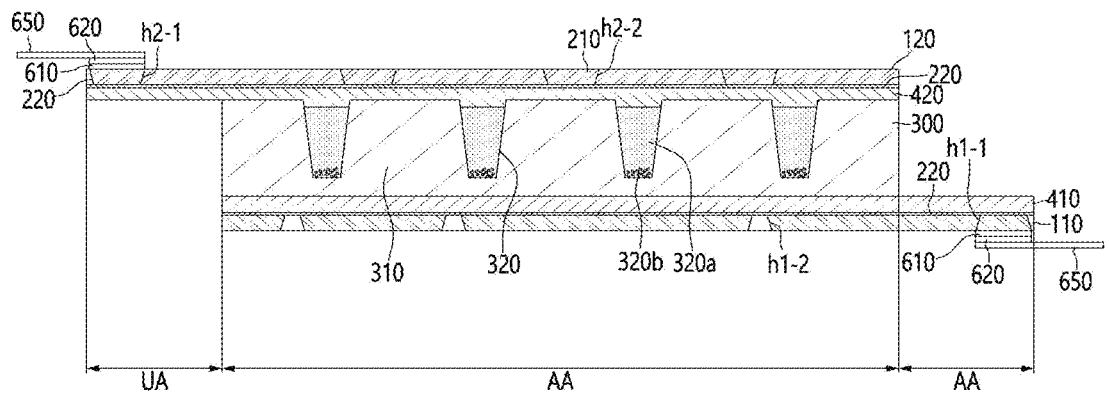
[FIG. 13]
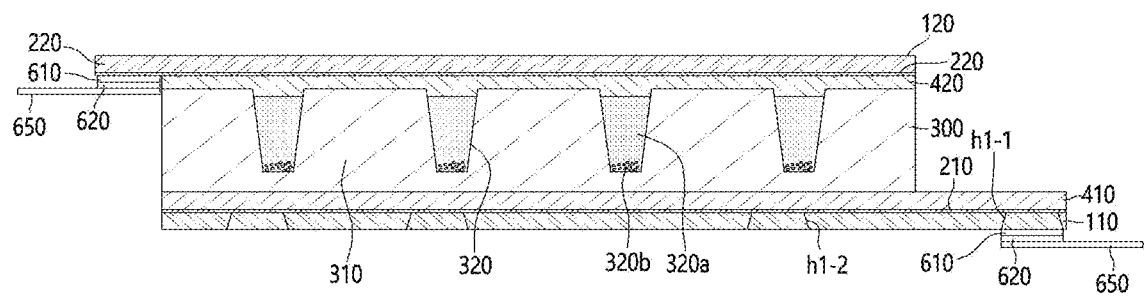

[FIG. 14]
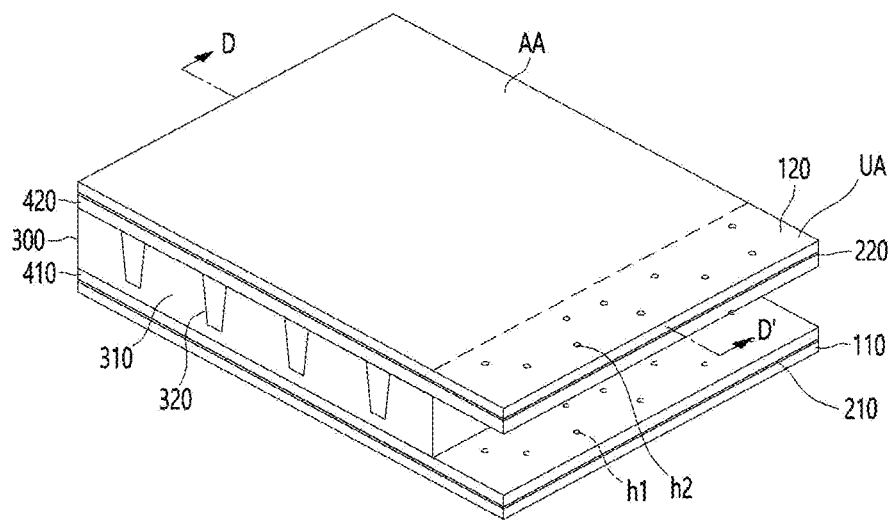
[FIG. 15]
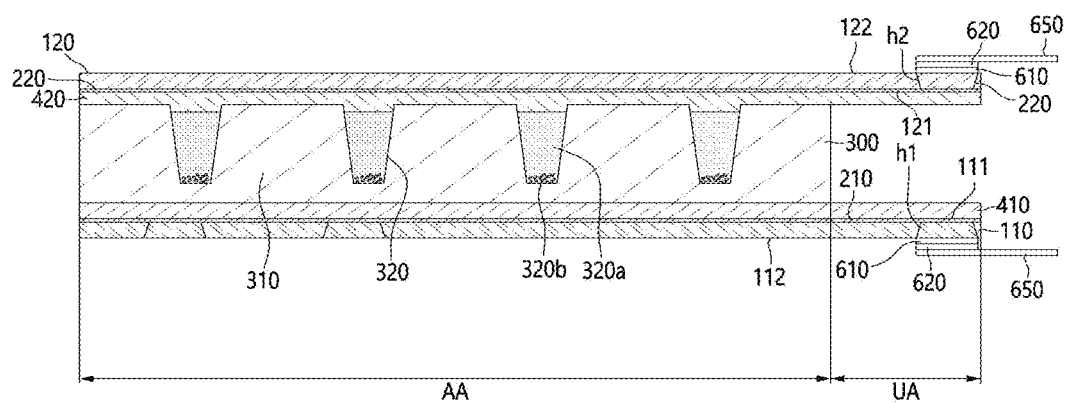

[FIG. 16]
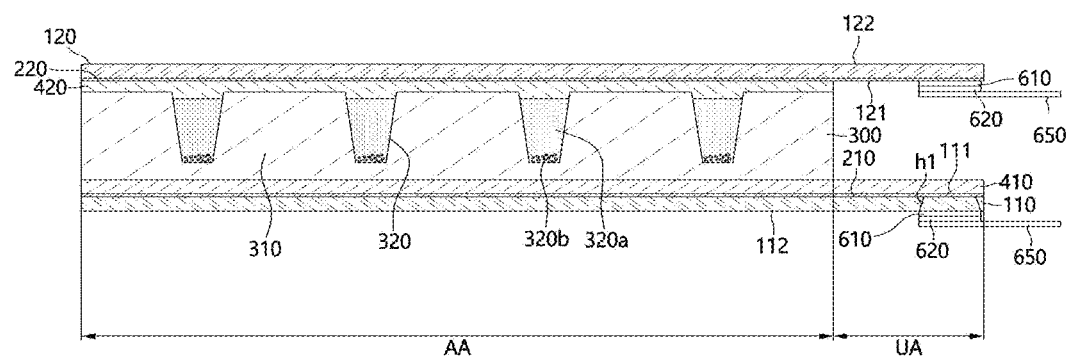
[FIG. 17]
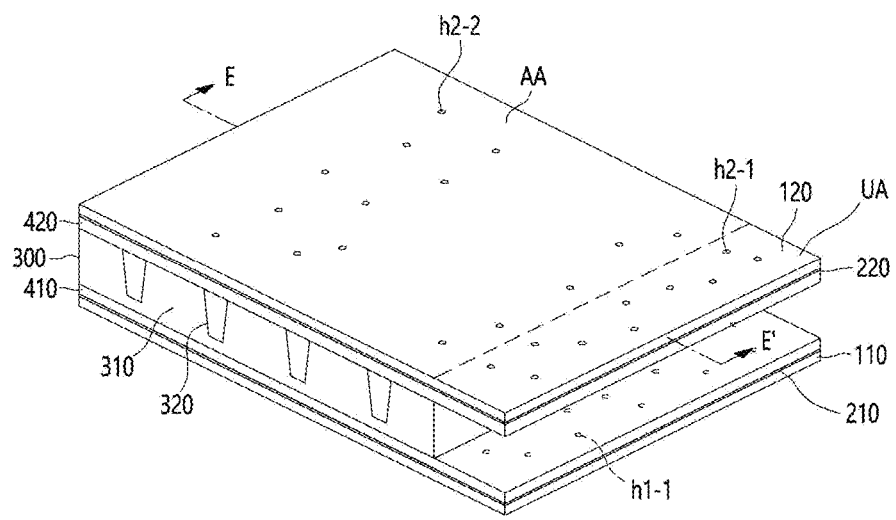

[FIG. 18]
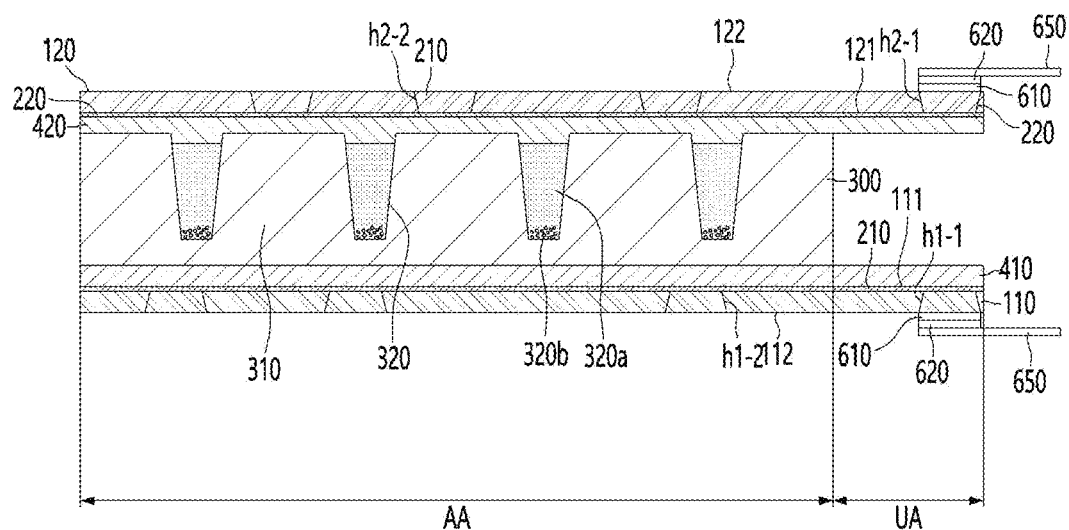
[FIG. 19]
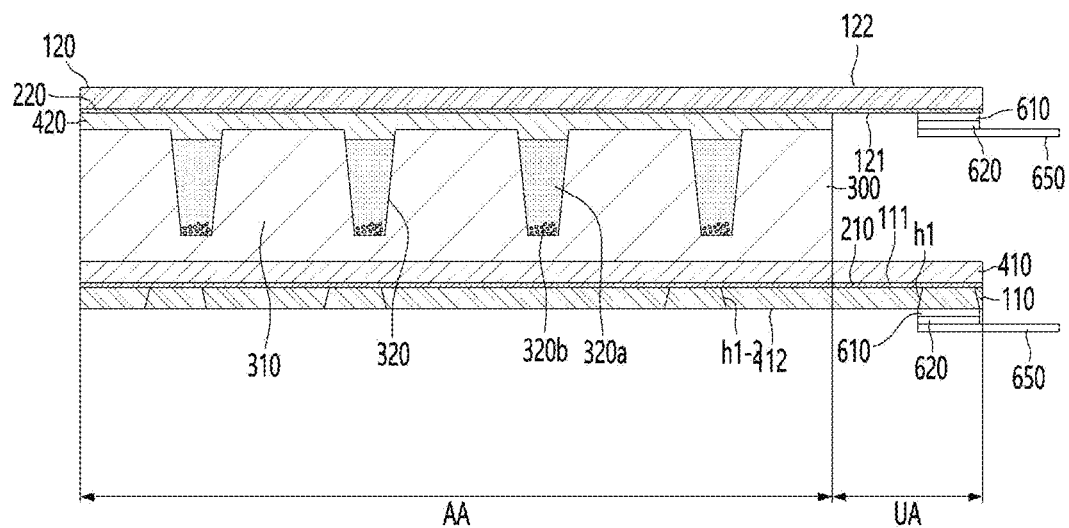

[FIG. 20]
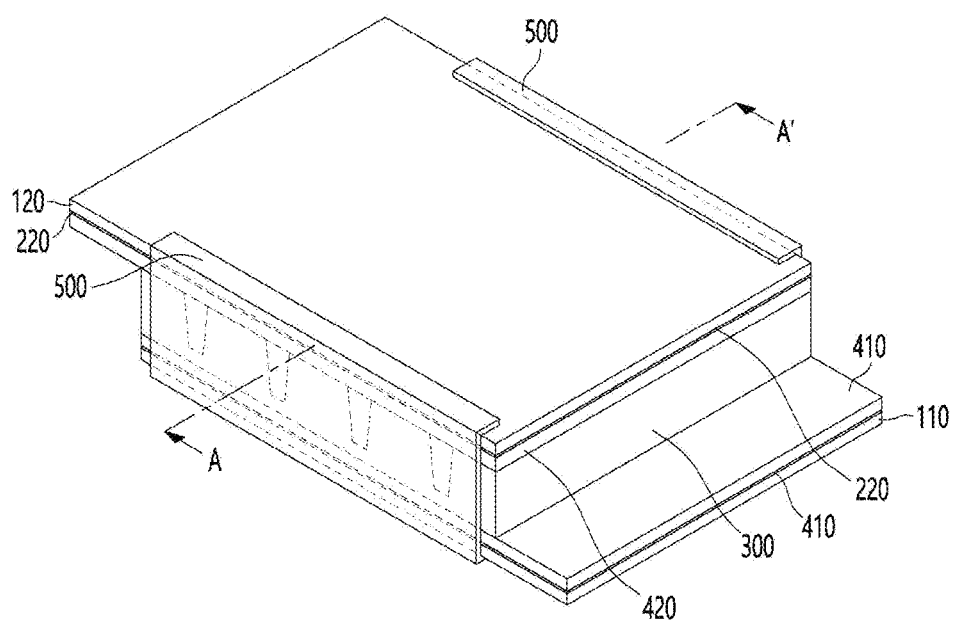
[FIG. 21]
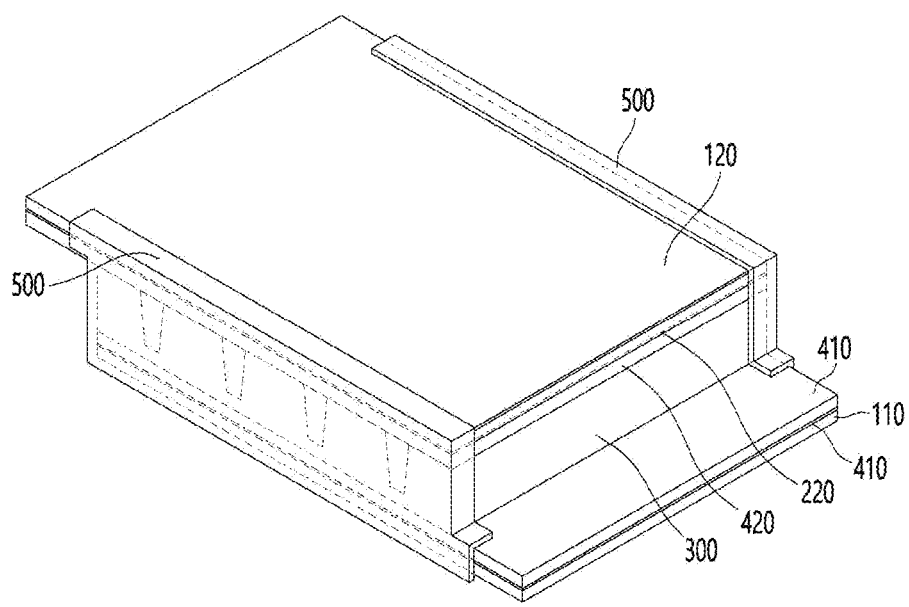

[FIG. 22]
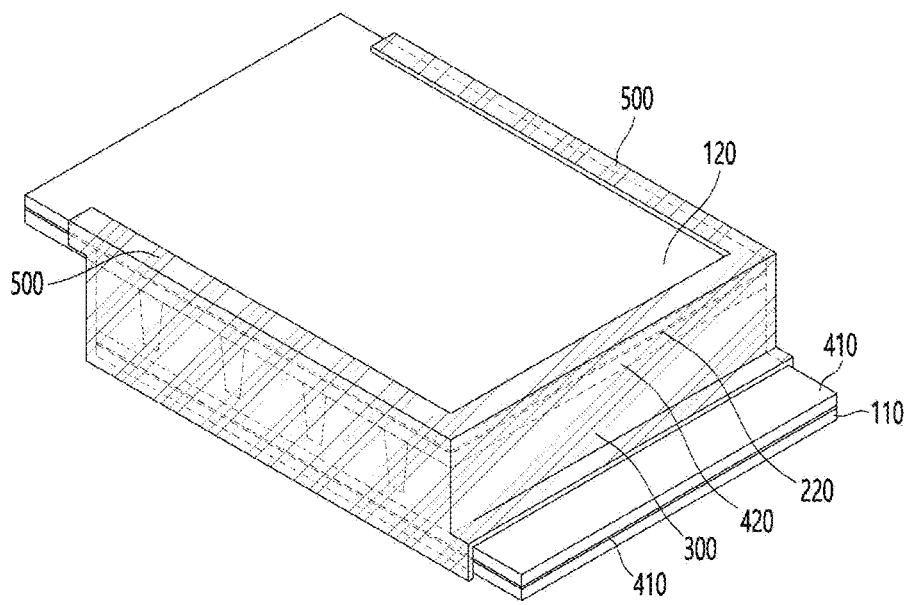
[FIG. 23]
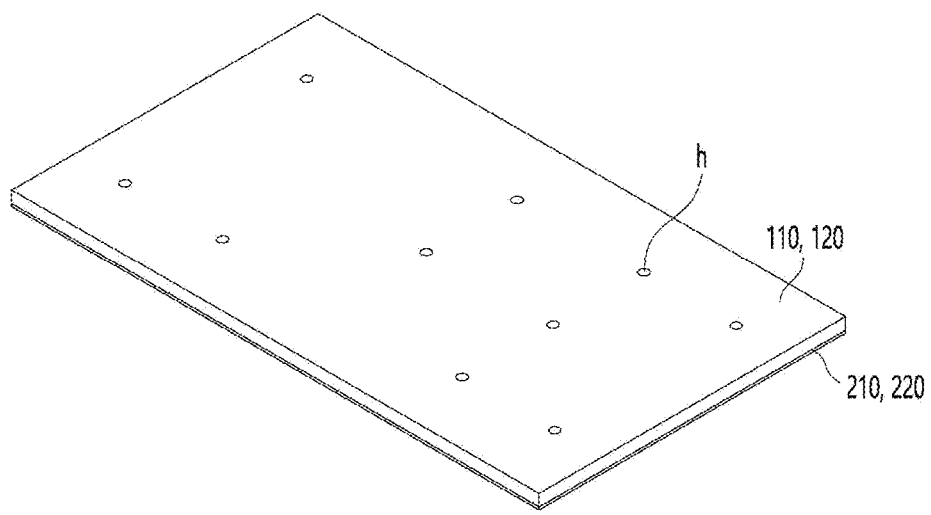

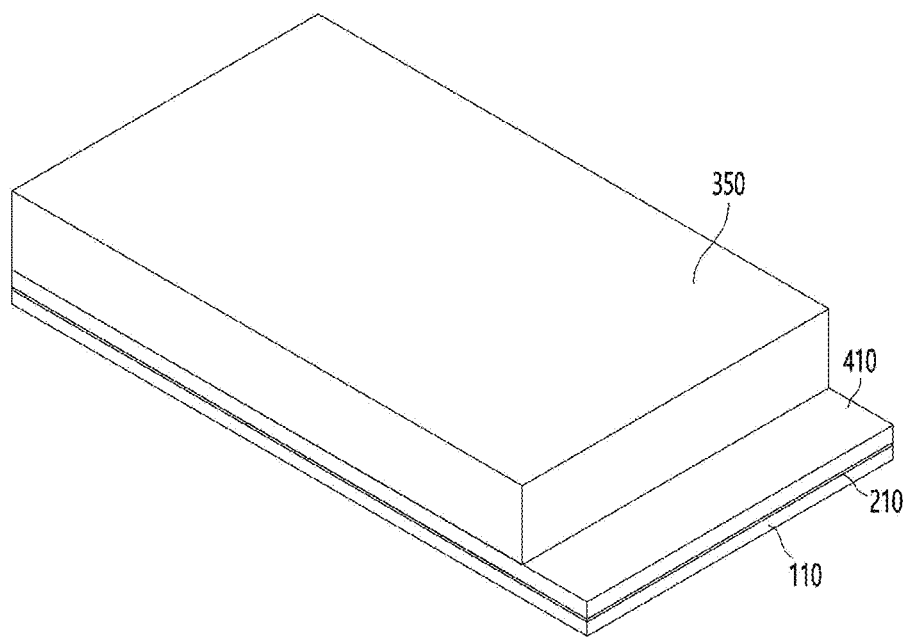
[FIG. 24]

[FIG. 25]
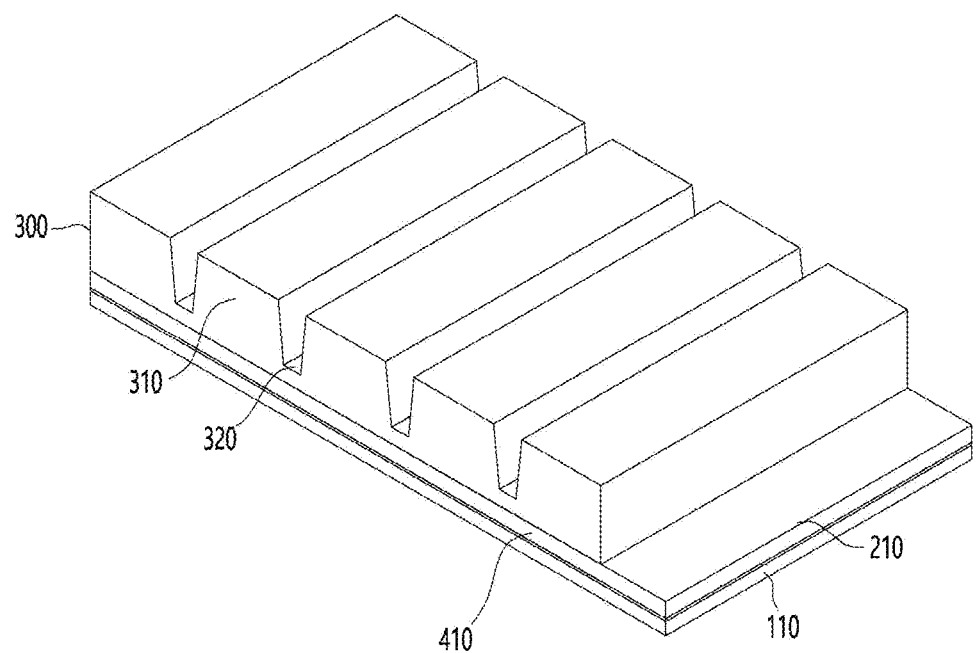

[FIG. 26]
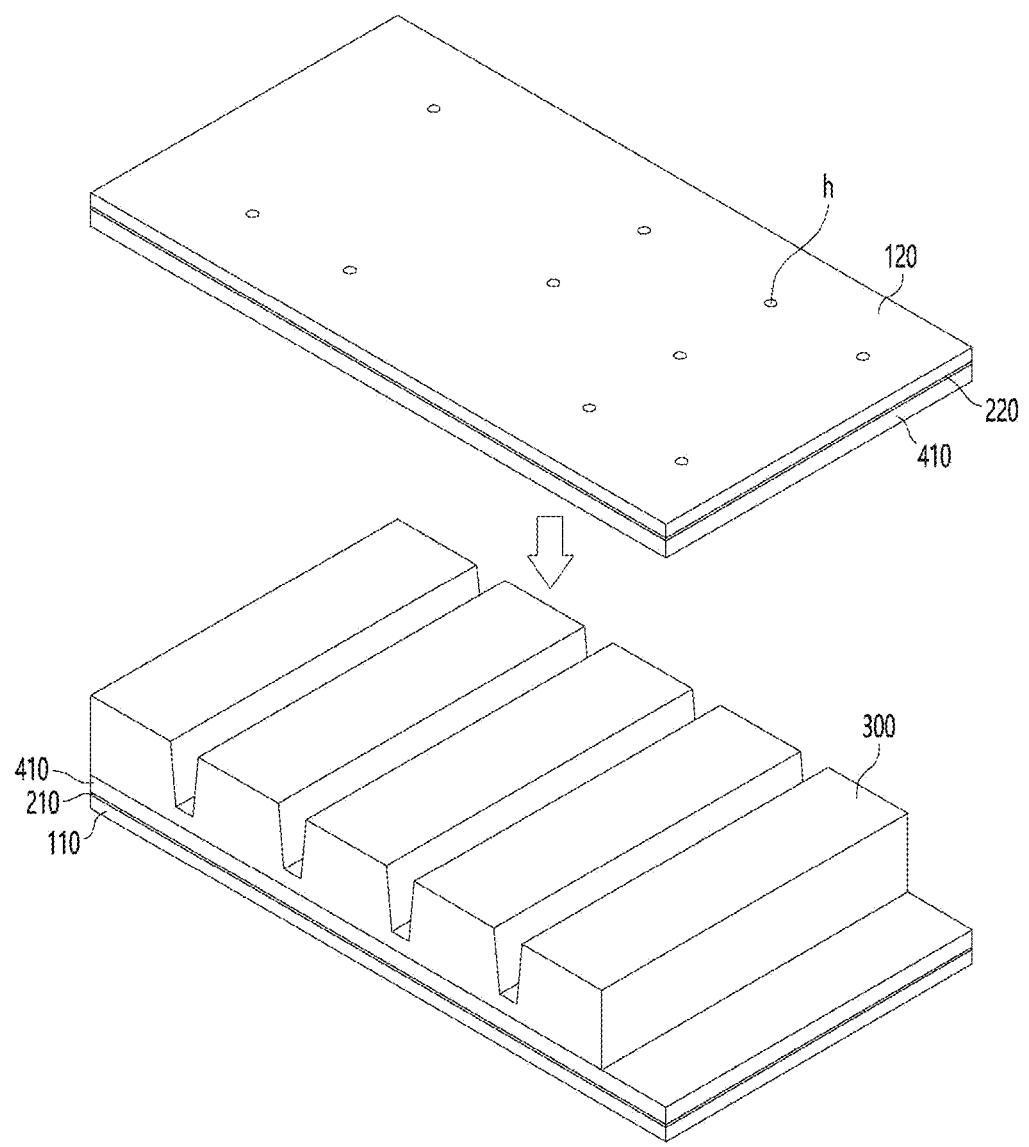

[FIG. 27]
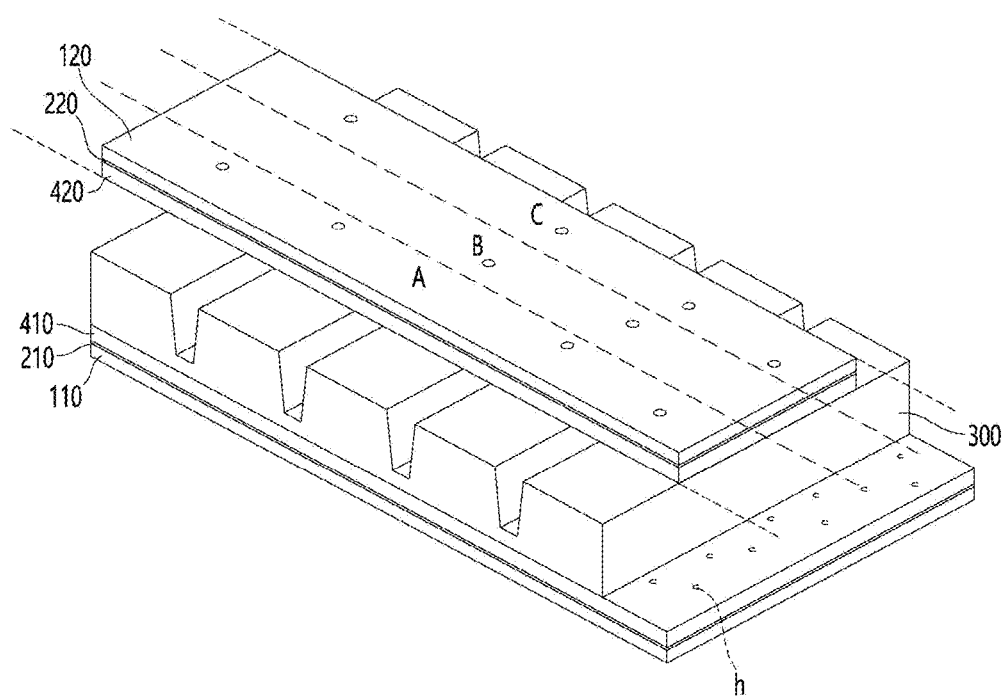

[FIG. 28]
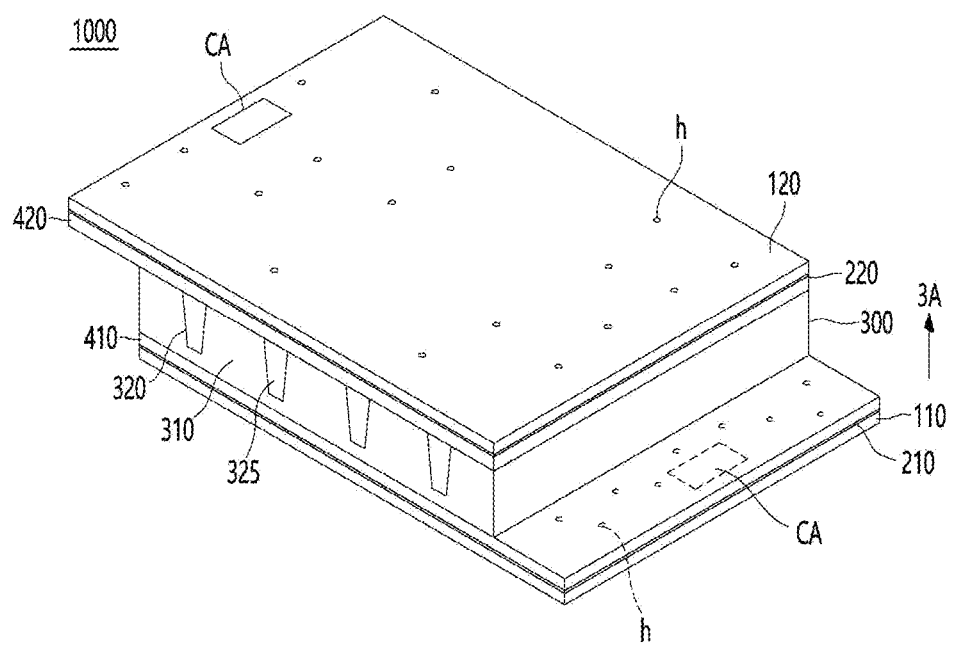
[FIG. 29]
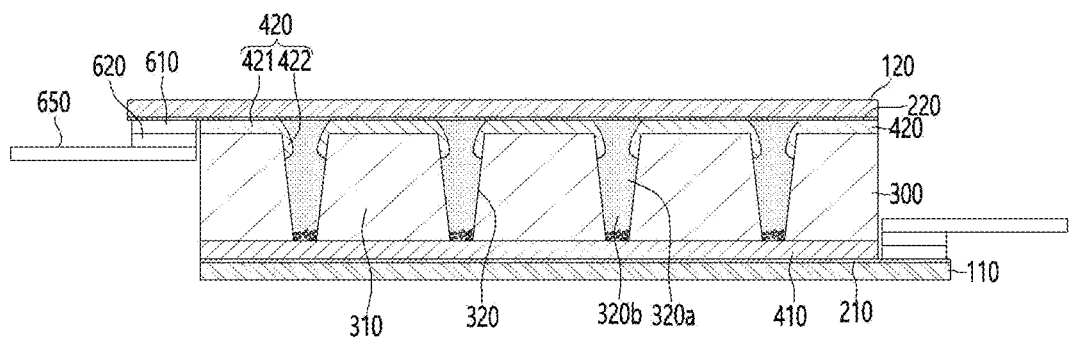

[FIG. 30]
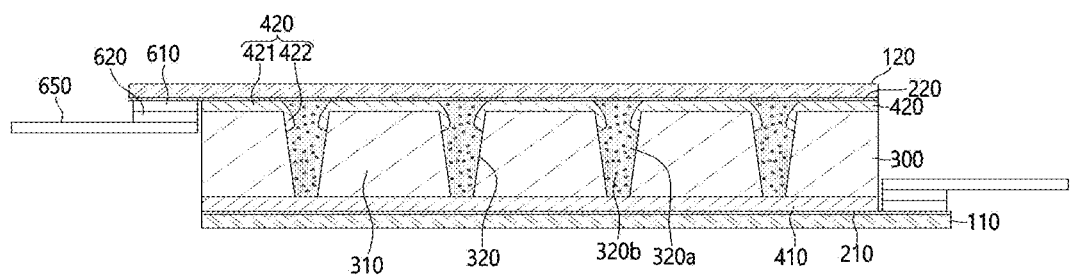
[FIG. 31]
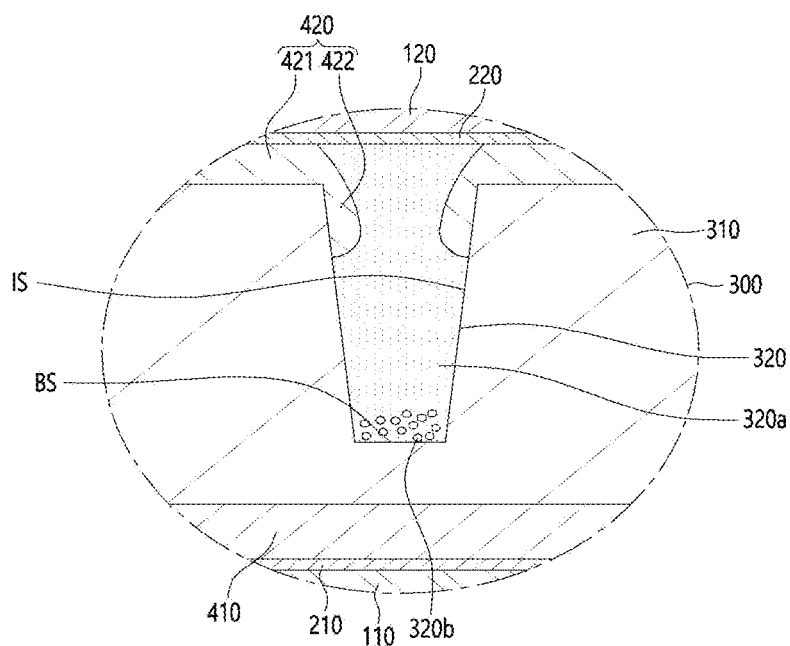

[FIG. 32]
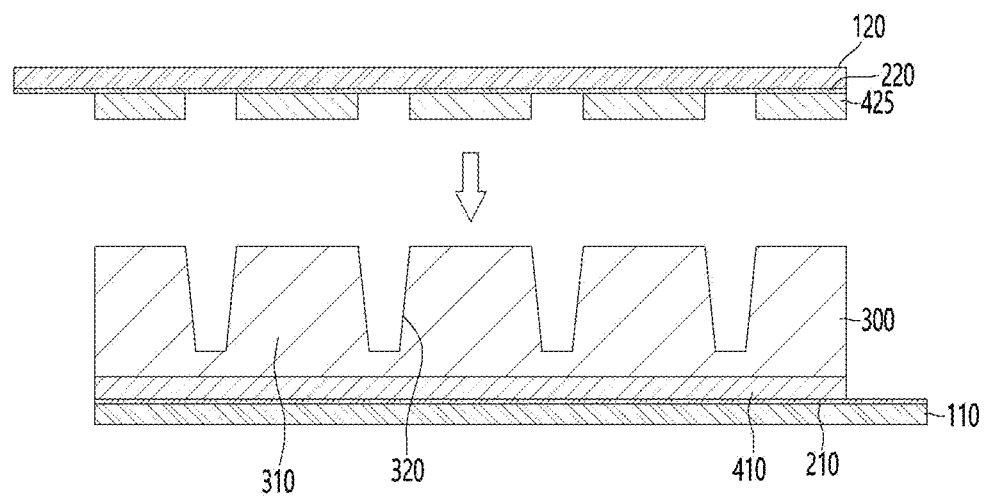
[FIG. 33]
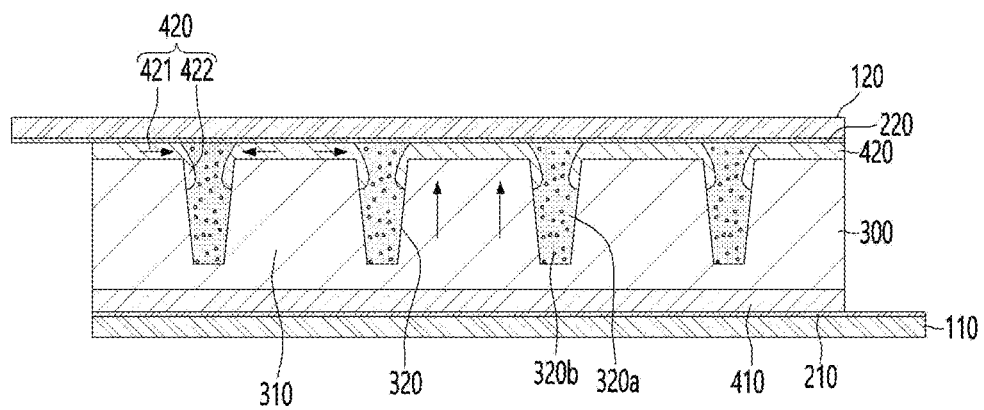

[FIG. 34]
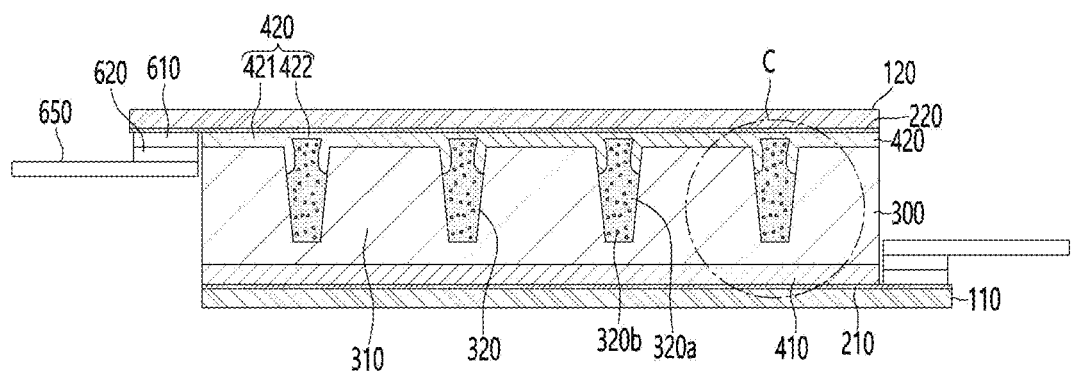
[FIG. 35]
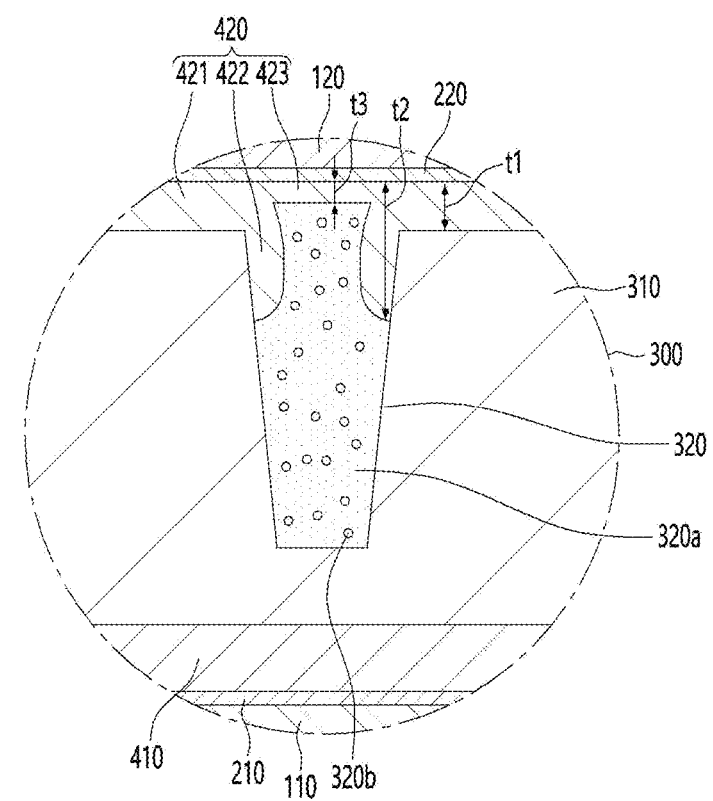

[FIG. 36]
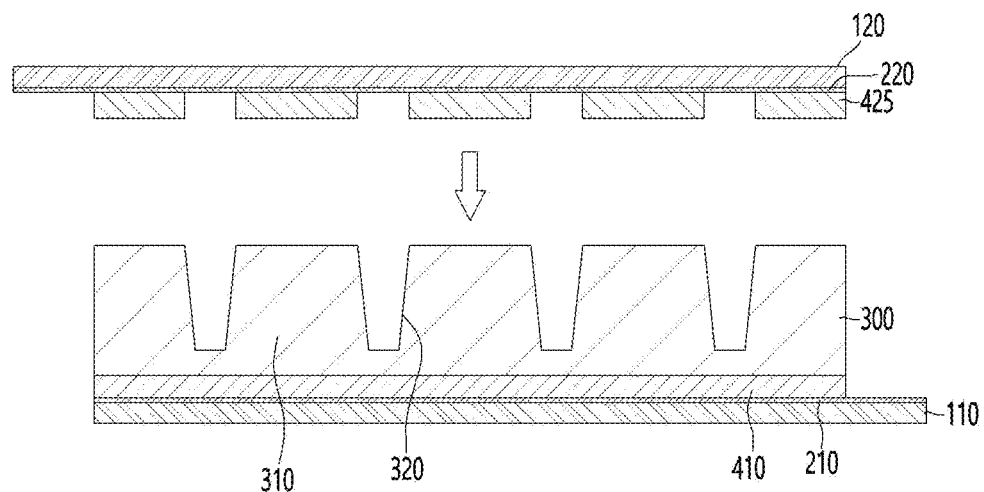
[FIG. 37]
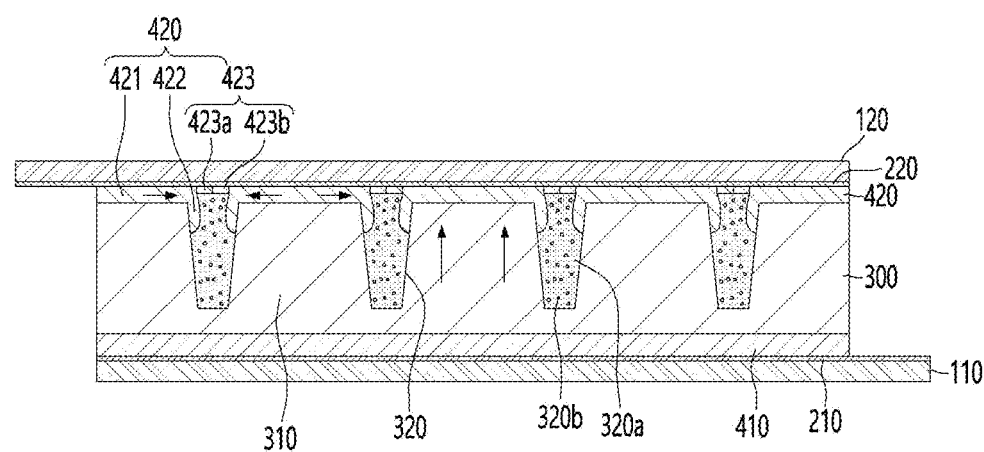

[FIG. 38]
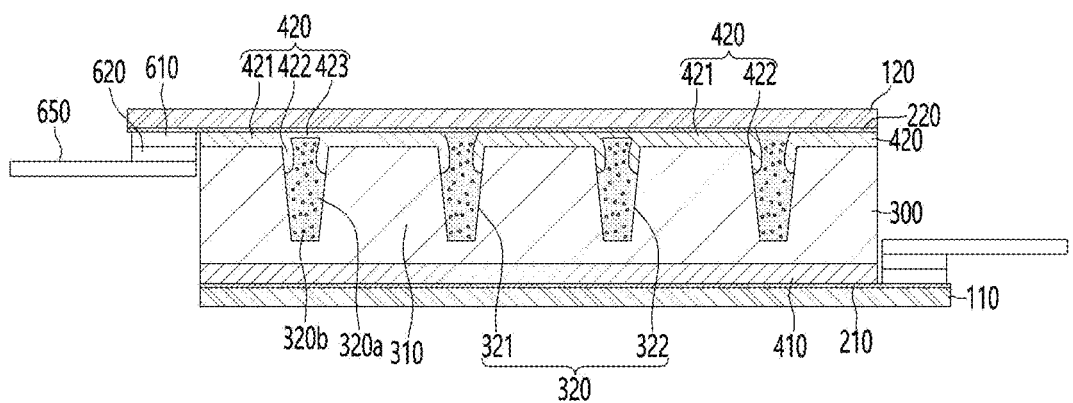
[FIG. 39]
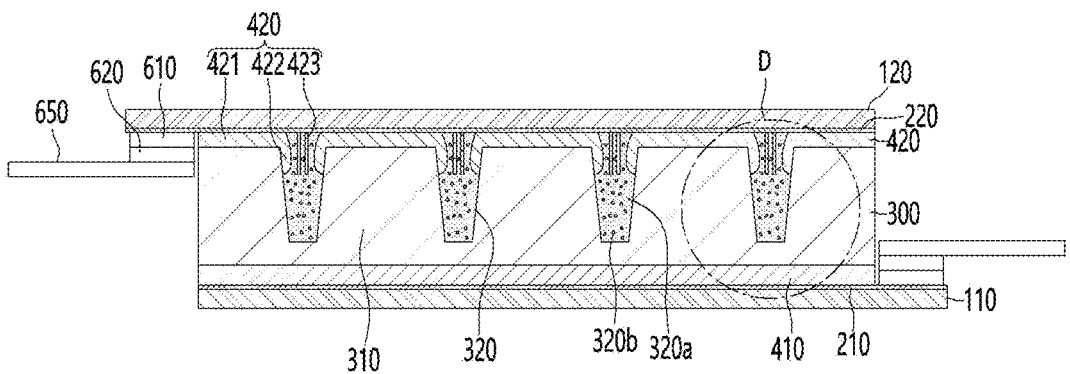

[FIG. 40]
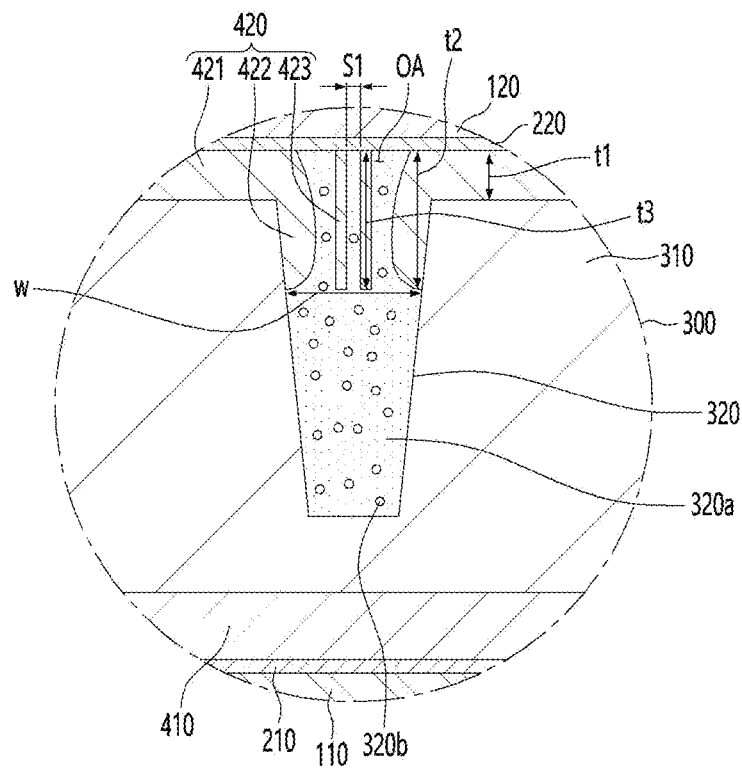
[FIG. 41]
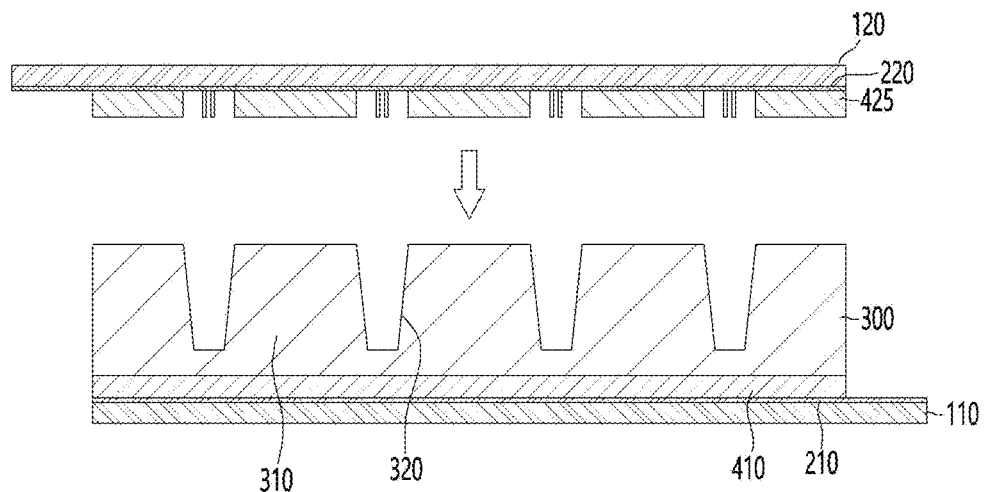

[FIG. 42]
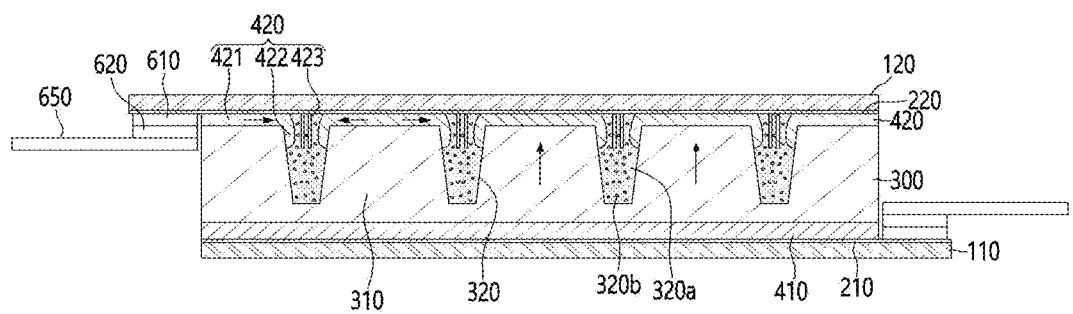
[FIG. 43]
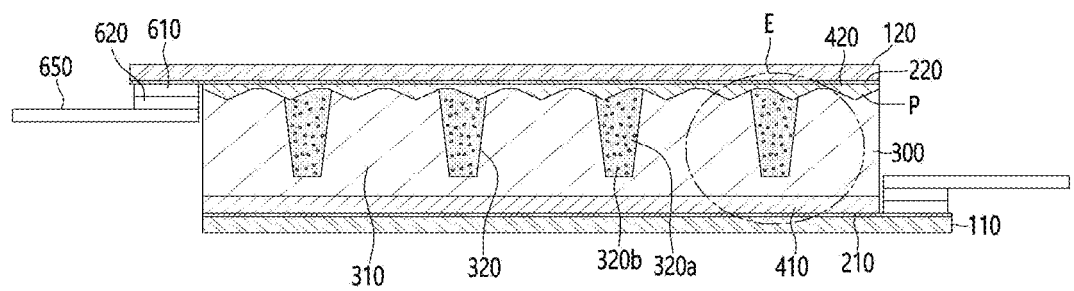

[FIG. 44]
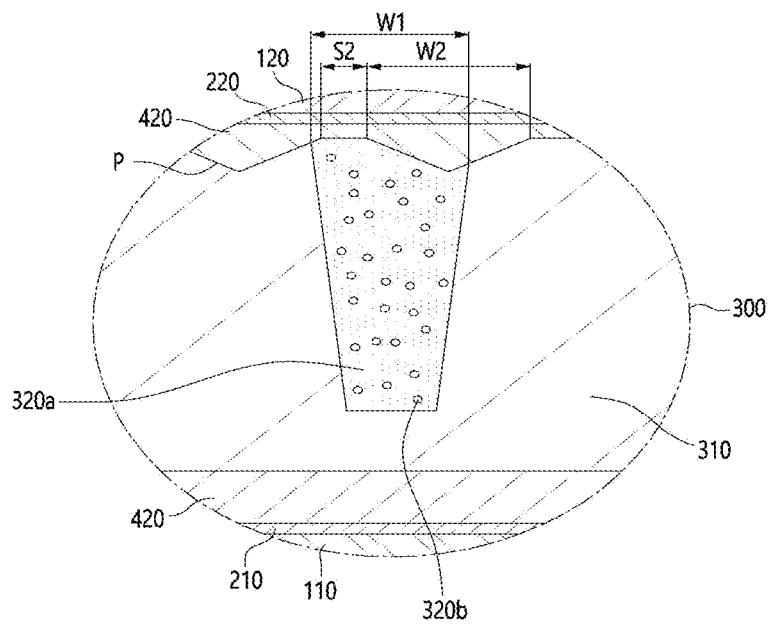
[FIG. 45]
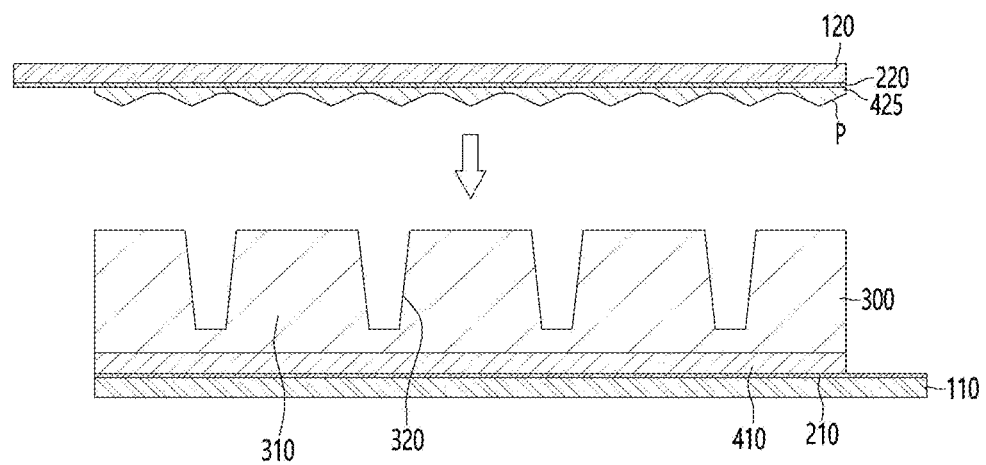

[FIG. 46]
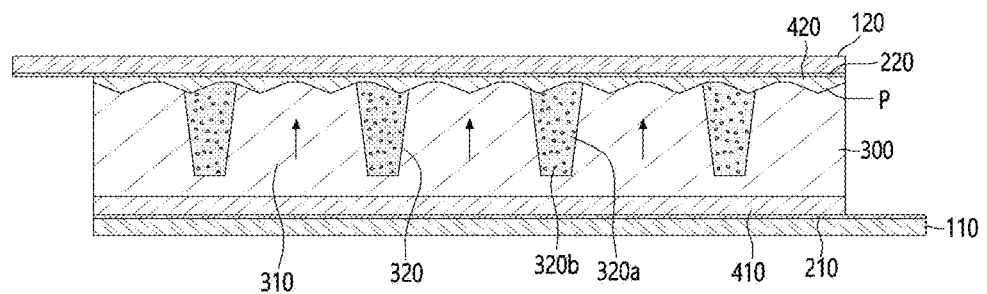

[FIG. 47]
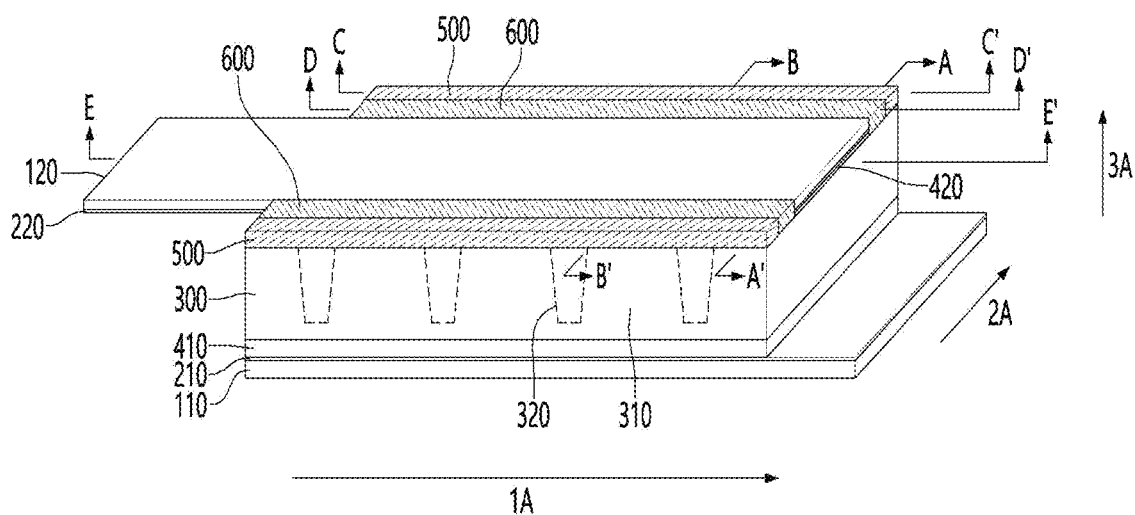
[FIG. 48]
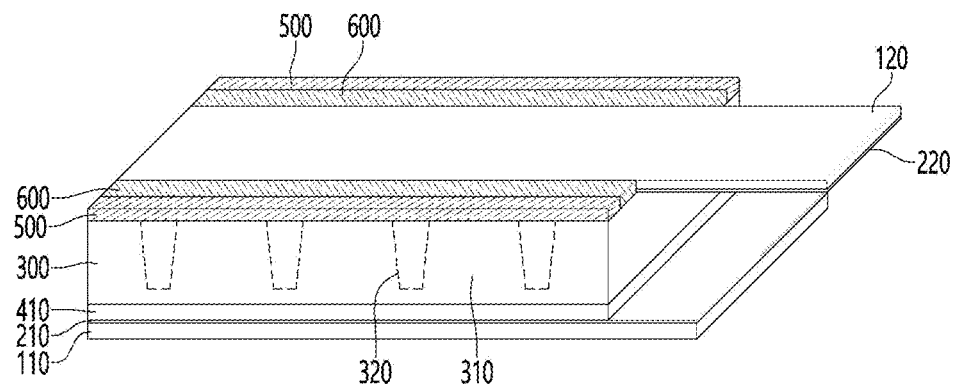

[FIG. 49]
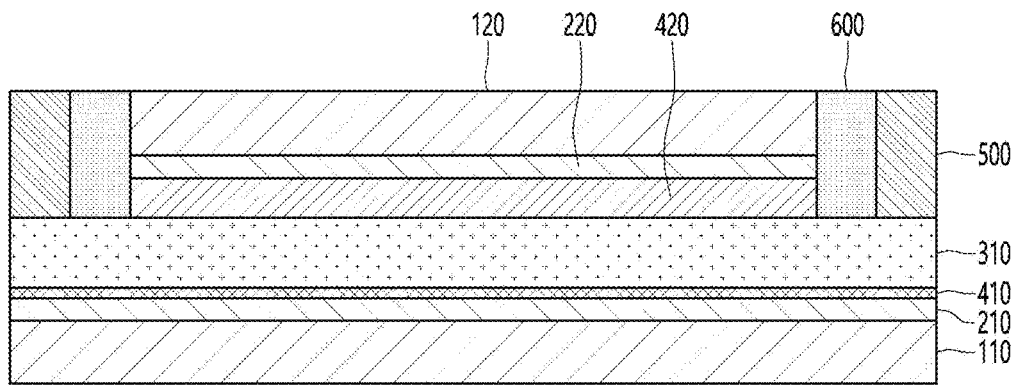
[FIG. 50]
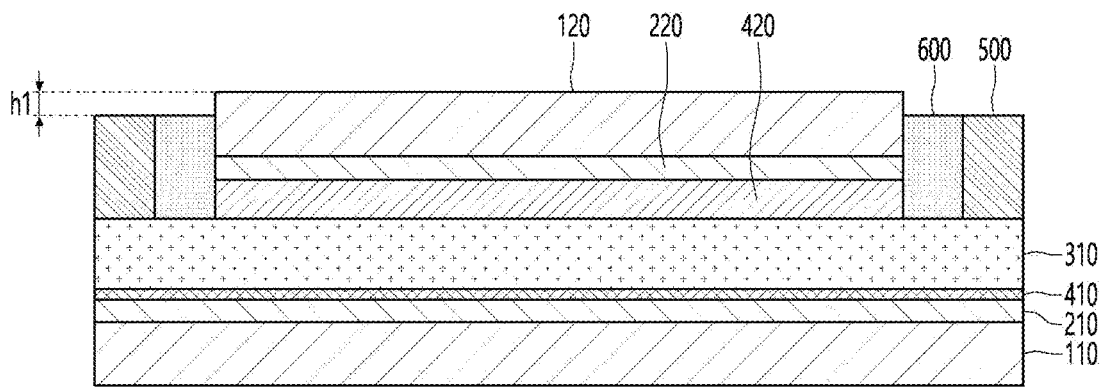

[FIG. 51]
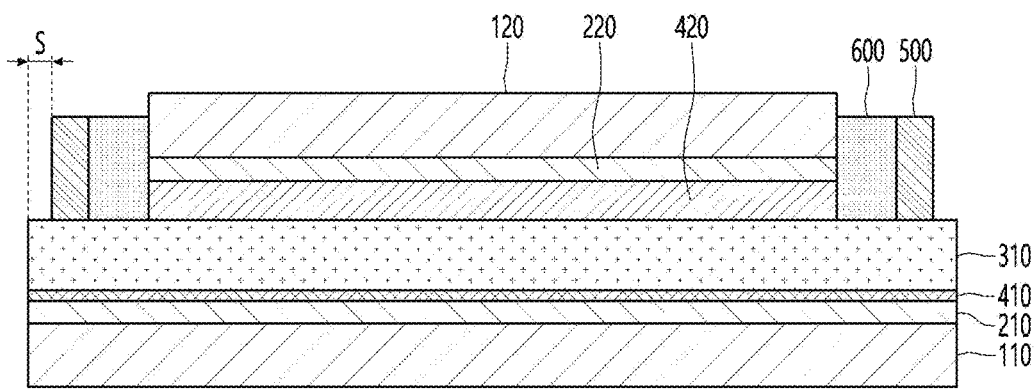
[FIG. 52]
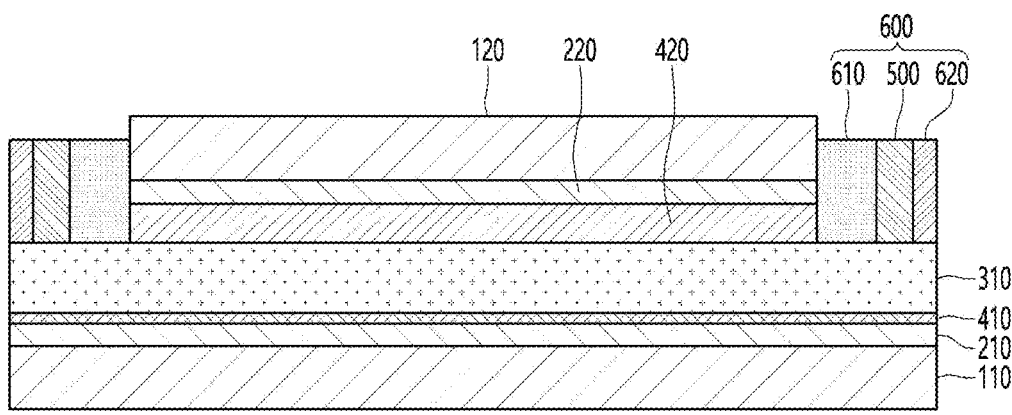

[FIG. 53]
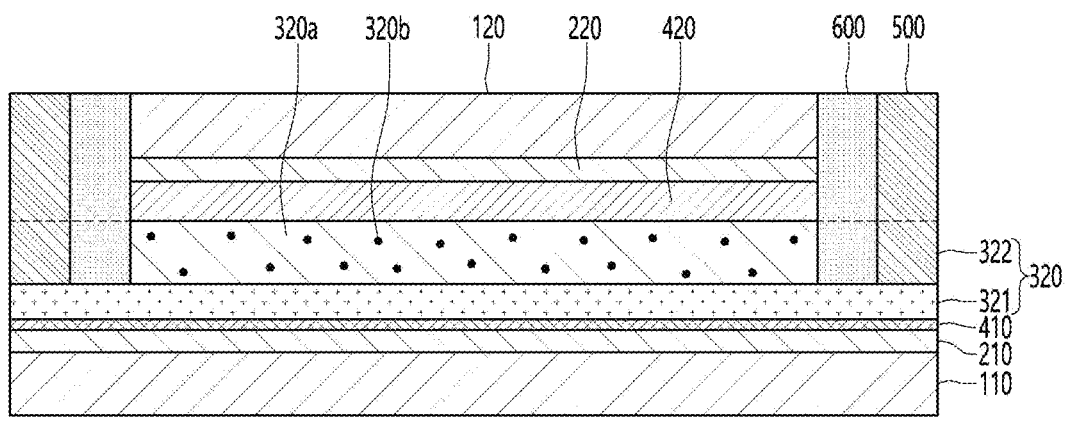
[FIG. 54]
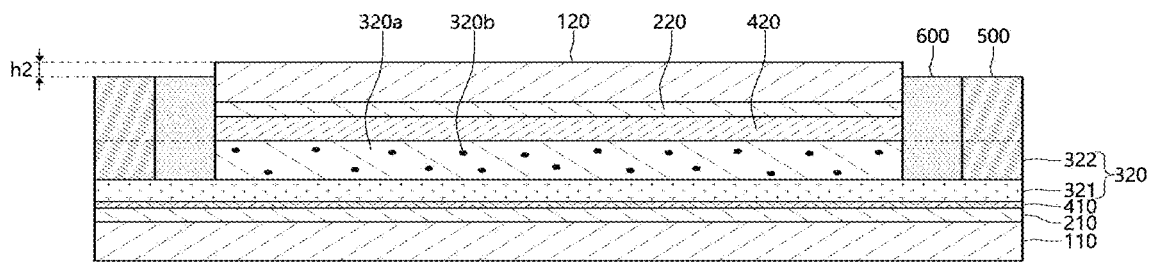

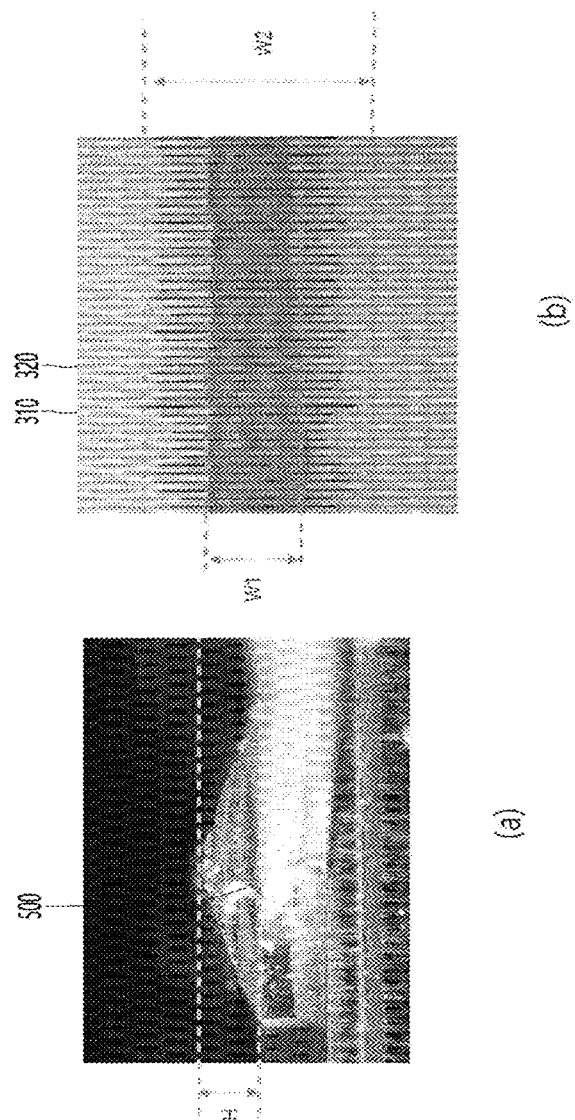
[FIG. 55]

[FIG. 56]
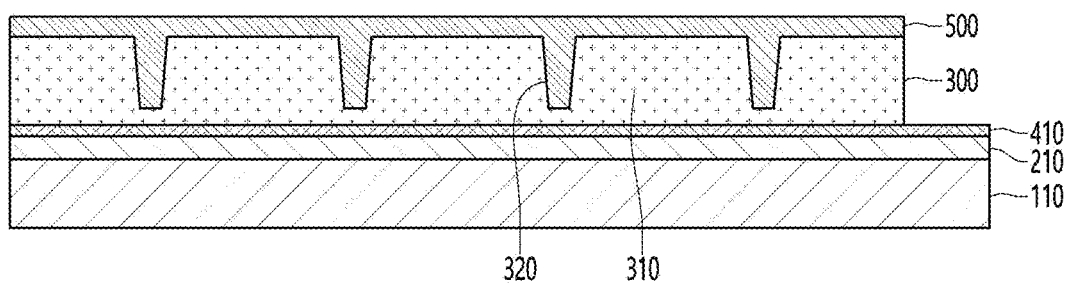
[FIG. 57]
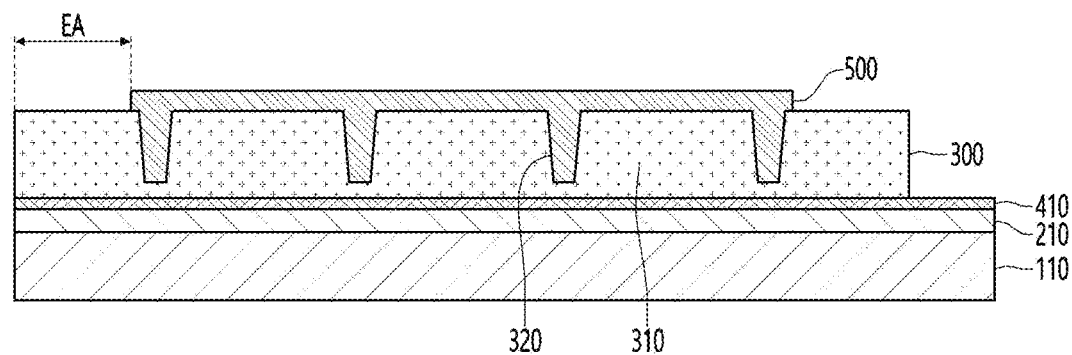
[FIG. 58]
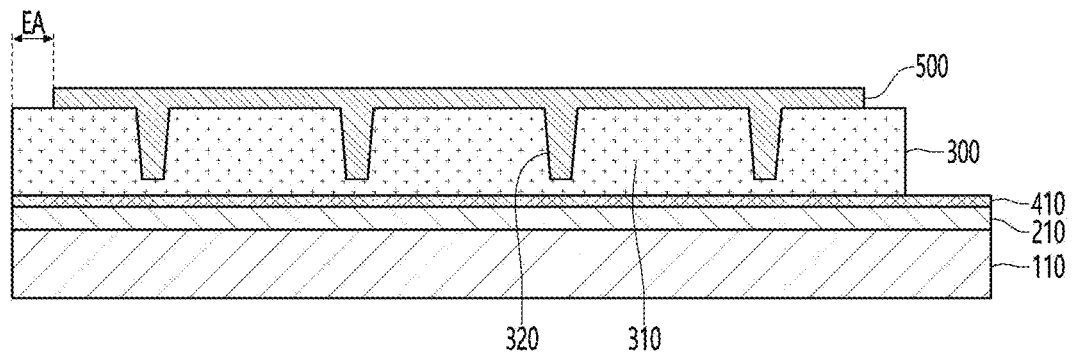

[FIG. 59]
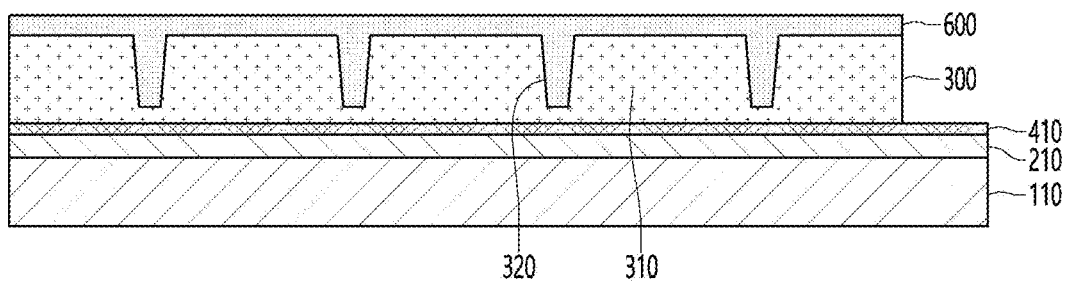
[FIG. 60]
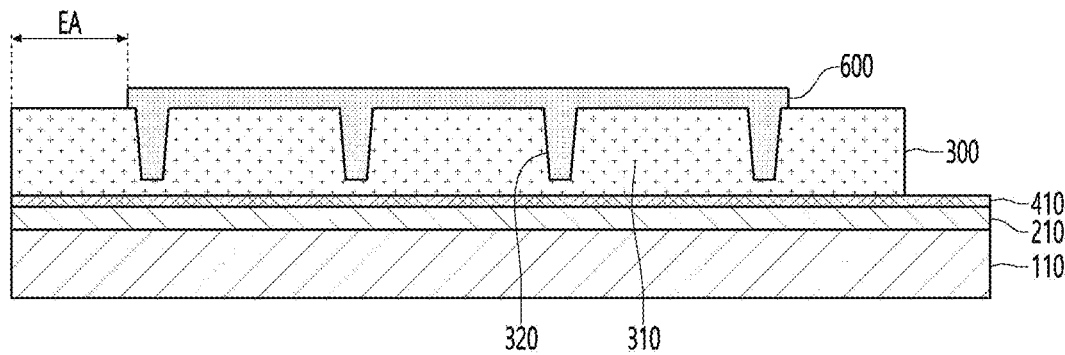
[FIG. 61]
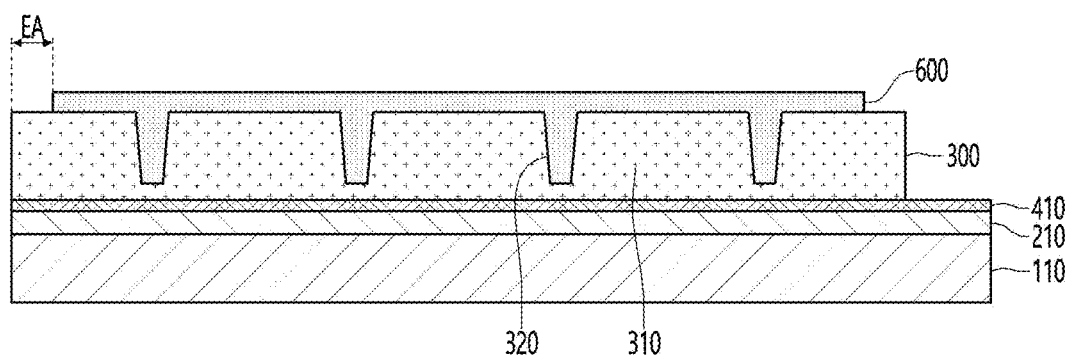

[FIG. 62]
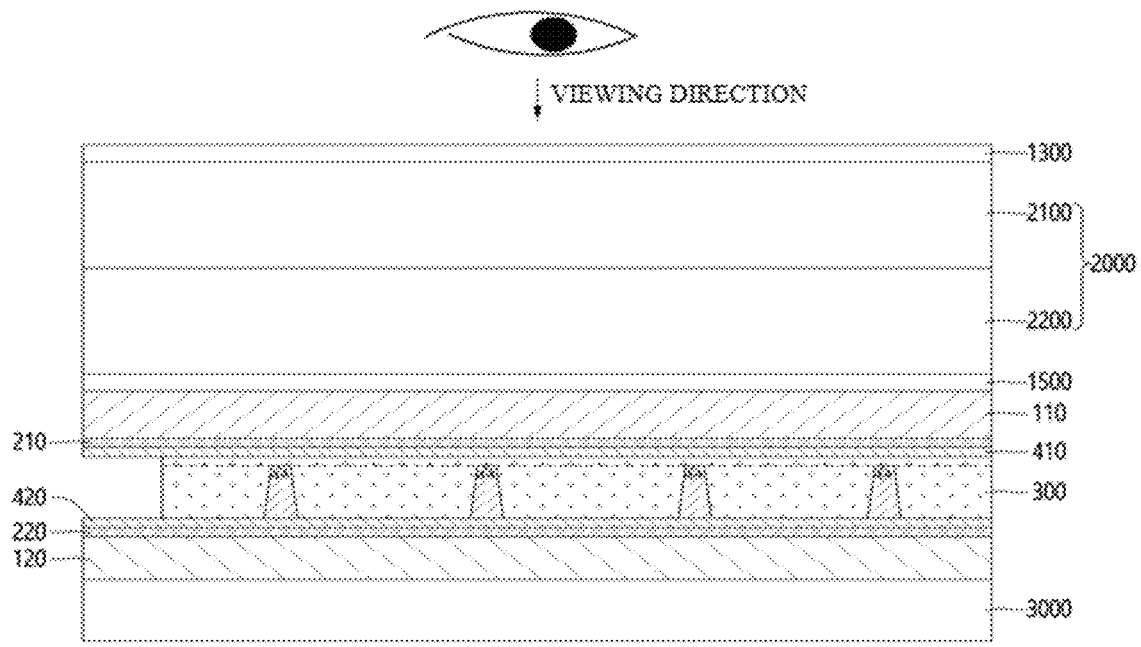

[FIG. 63]
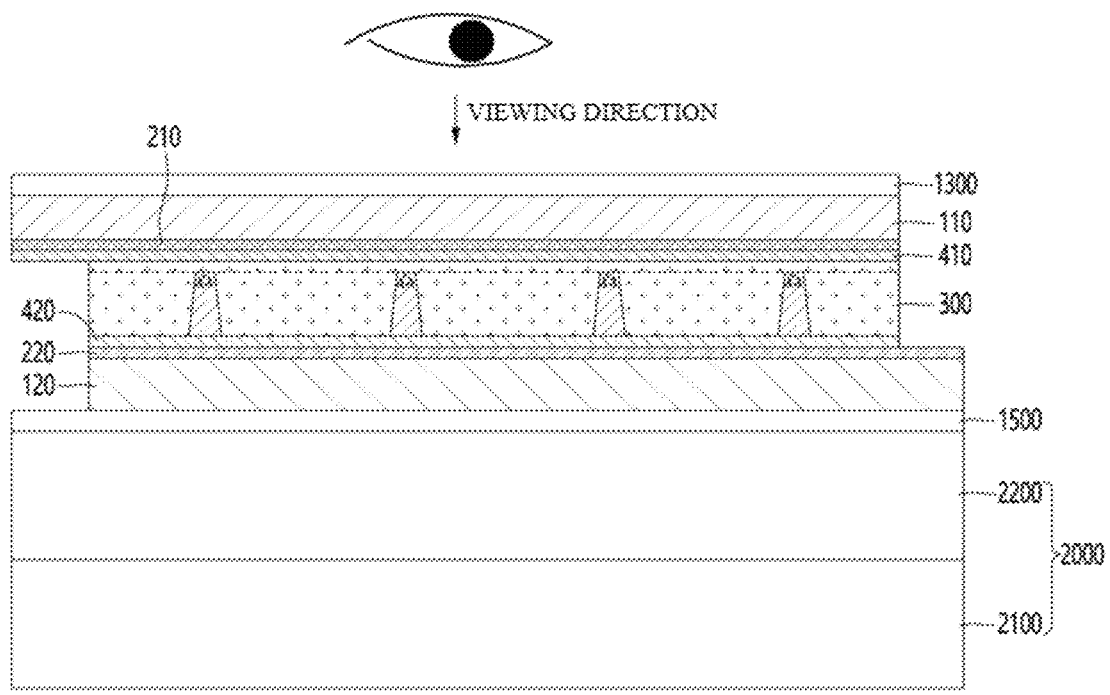

[FIG. 64]
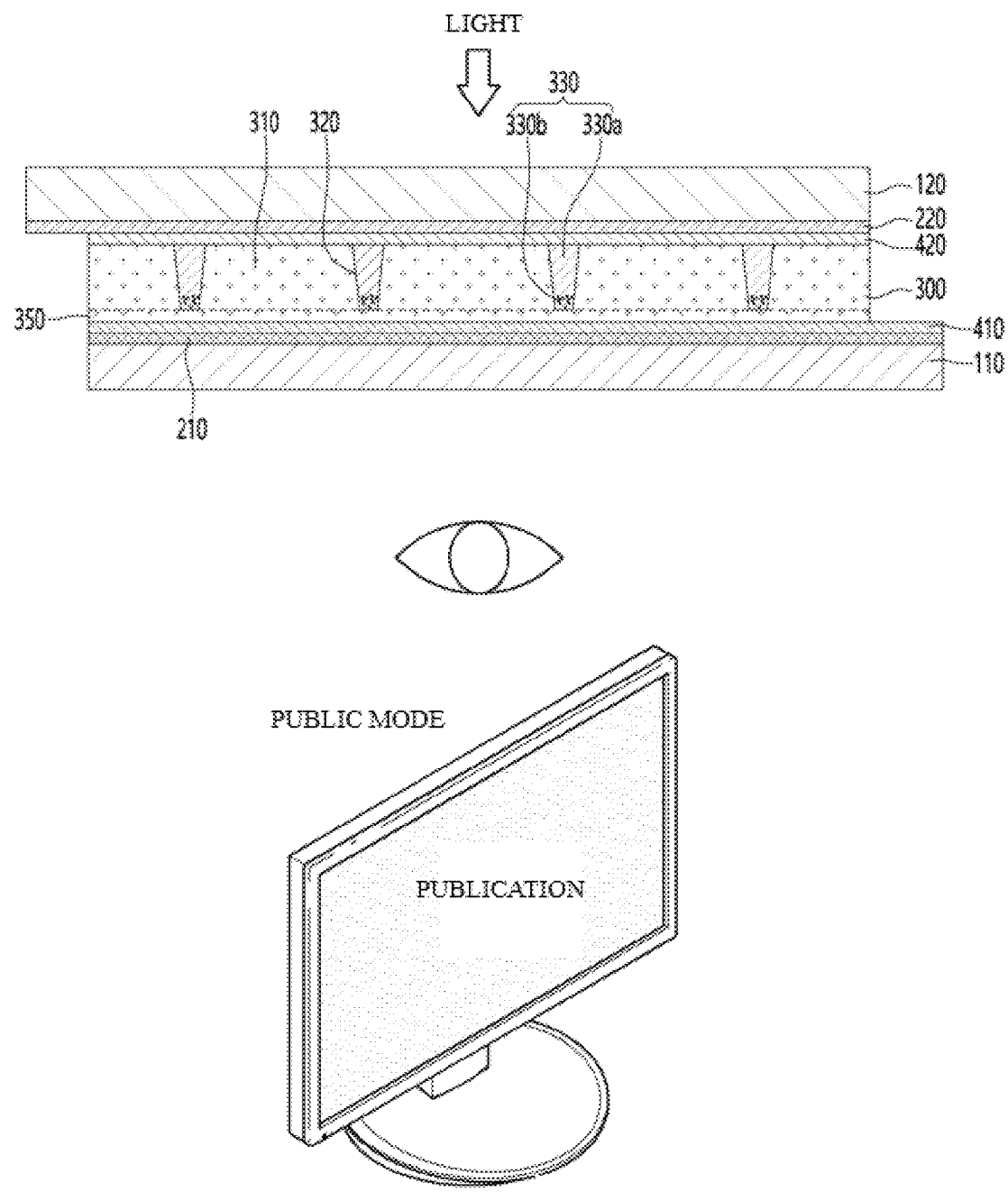

[FIG. 65]
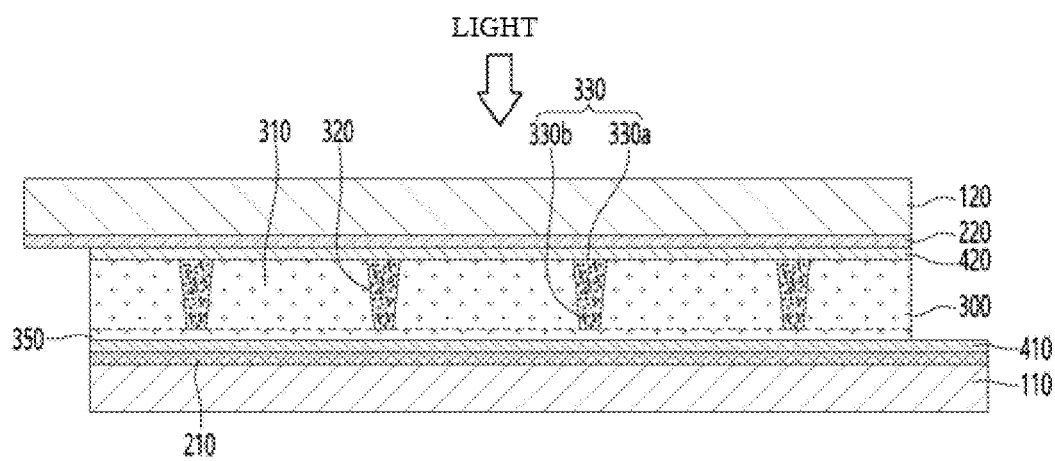
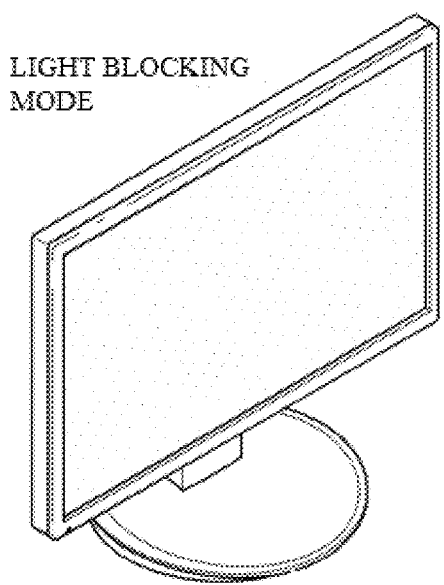

[FIG. 66]
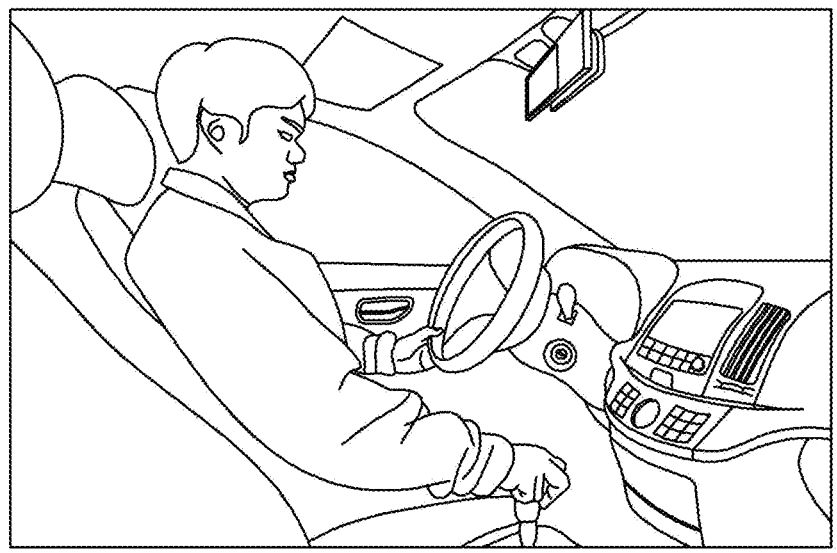

LIGHT PATH CONTROL MEMBER AND DISPLAY DEVICE COMPRISING SAME

CROSS REFERENCE TO RELATED APPLICATIONS

This application is the National Phase of PCT International Application No. PCT/KR2021/004732, filed on Apr. 15, 2021, which claims priority under 35 U.S.C. 119 (a) to Patent Application Nos. 10-2020-0054388, filed in the Republic of Korea on May 7, 2020; 10-2020-0054674, filed in the Republic of Korea on May 7, 2020; and 10-2020-0055071, filed in the Republic of Korea on May 8, 2020, all of which are hereby expressly incorporated by reference into the present application.

TECHNICAL FIELD

An embodiment relates to a light path control member, and to a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to prevent glare, or to prevent the inside from being visible from the outside.

That is, the light blocking film may be a light path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by switching a pattern portion to a light transmitting part and a light blocking part by filling the inside of the pattern portion with particles that may move when a voltage is applied and a dispersion liquid for dispersing the particles and by dispersing and aggregating the particles.

In order to apply a voltage to the switchable light blocking film, a process of connecting the switchable light blocking film to an external printed circuit board is required. That is, an electrode connection portion connected to the printed circuit board is formed on the switchable light blocking film.

In this case, in order to form such an electrode connection portion, since a process of removing a buffer layer or an adhesive layer formed on first and second substrates is required, there is a problem that process efficiency is reduced due to such a process.

In addition, when the light blocking film is cut into a unit area size after forming a large-area light blocking film, there is a problem that the cutting region is limited depending on a position of the electrode connection portion.

Therefore, a light path control member having a new structure capable of solving the above problems is required.

DISCLOSURE

Technical Problem

An embodiment relates to a light path control member that may be easily connected to an external power source, may reduce a size of the light path control member, and may improve driving characteristics.

Technical Solution

A light path control member according to an embodiment includes: a first substrate including an effective region and an ineffective region; a first electrode disposed on the first substrate; a second substrate disposed on the first substrate and including an effective region and an ineffective region; a second electrode disposed under the second substrate; and a light conversion unit disposed between the first electrode and the second electrode, wherein the light conversion unit includes a partition wall part and a reception part that are alternately disposed, a first hole passing through the first substrate is formed in at least one of the effective region and the ineffective region of the first substrate, a second hole passing through the second substrate is formed in at least one of the effective region and the ineffective region of the second substrate, a first connection electrode is disposed in the first hole, and a second connection electrode is disposed in the second hole.

Advantageous Effects

A light path control member according to an embodiment can include an electrode including a coating solution and a conductive nanowire.

Accordingly, a surface resistance of a first electrode and a second electrode can be reduced, and driving characteristics of the light path control member can be improved.

In addition, since the coating solution of the first electrode includes a resin material similar to that of a light conversion unit on the first electrode, when disposing the light conversion unit on the first electrode, a separate buffer layer for preventing a decrease in adhesion due to heterogeneous materials of the first electrode and the light conversion unit may be unnecessary.

Therefore, since the buffer layer may be removed, a thickness of the light path control member can be reduced, and a distance between the first electrode and the light conversion unit can be reduced to improve a driving speed and the driving characteristics of the light path control member.

In addition, the light path control member according to the embodiment can include a plurality of through-holes passing through the first substrate and the second substrate.

The first electrode and the second electrode can be exposed in the through-holes of the first substrate and the second substrate, respectively, and an external printed circuit board can be connected to a region where the electrode is exposed.

Therefore, an electrode connection region can be implemented at various positions in the light path control member, so that the light path control member can be applied in various environments.

In addition, when manufacturing the light path control member, cutting is possible regardless of a position of the electrode connection region, and thus it is possible to easily manufacture a plurality of light path control members having various shapes and sizes.

DESCRIPTION OF DRAWINGS

FIG. 1 is a perspective view of a light path control member according to a first embodiment.

FIGS. 2 and 3 are a perspective view of a first substrate and a first electrode and a perspective view of a second substrate and a second electrode of a light path control member according to an embodiment.

FIG. 4 is a cross-sectional view taken along line B-B' in FIG. 2.

FIG. 5 is another perspective view of the light path control member according to the first embodiment.

FIGS. 6 to 8 are cross-sectional views taken along line A-A' in FIG. 1.

FIGS. 9 and 10 are cross-sectional views taken along line A-A' in FIG. 1 for describing shapes of various reception parts of a light path control member according to an embodiment.

FIG. 11 is s perspective view of a light path control member according to a second embodiment.

FIGS. 12 and 13 are cross-sectional views taken along line C-C' in FIG. 10.

FIG. 14 is s perspective view of a light path control member according to a third embodiment.

FIGS. 15 and 16 are cross-sectional views taken along line D-D' in FIG. 14.

FIG. 17 is s perspective view of a light path control member according to a fourth embodiment.

FIGS. 18 and 19 are cross-sectional views taken along line E-E' in FIG. 17.

FIGS. 20 to 22 are perspective views for describing that a sealing part is disposed on a light path control member according to an embodiment.

FIGS. 23 to 28 are views for describing a method of manufacturing a light path control member according to an embodiment.

FIGS. 29 and 30 are views for describing a structure of an adhesive layer according to a fifth embodiment.

FIG. 31 is an enlarged view of region B in FIG. 29.

FIGS. 32 and 33 are views for describing the formation of the adhesive layer according to the fifth embodiment.

FIG. 34 is a view for describing a structure of an adhesive layer according to a sixth embodiment.

FIG. 35 is an enlarged view region C in FIG. 34.

FIGS. 36 and 37 are views for describing the formation of an adhesive layer according to the sixth embodiment.

FIG. 38 is a view for describing a structure of an adhesive layer according to a seventh embodiment.

FIG. 39 is a view for describing a structure of an adhesive layer according to an eighth embodiment.

FIG. 40 is an enlarged view region D in FIG. 39.

FIGS. 41 and 42 are views for describing the formation of the adhesive layer according to the eighth embodiment.

FIG. 43 is a view for describing a structure of an adhesive layer according to a ninth embodiment.

FIG. 44 is an enlarged view region E in FIG. 43.

FIGS. 45 and 46 are views for describing the formation of the adhesive layer according to the ninth embodiment.

FIGS. 47 and 48 are perspective views of a light path control member according to a tenth embodiment.

FIGS. 49 to 52 are cross-sectional views taken along line A-A' in FIG. 47.

FIGS. 53 and 54 are cross-sectional views taken along line B-B' in FIG. 47.

FIG. 55 is a view showing a shape of a dam part of the light path control member in direction A-A' or B-B' in FIG. 47.

FIGS. 56 to 58 are cross-sectional views taken along line C-C' in FIG. 47.

FIGS. 59 to 61 are cross-sectional views taken along line D-D' in FIG. 47.

FIGS. 62 and 63 are cross-sectional views of a display device to which a light path control member according to an embodiment is applied.

FIGS. 64 to 66 are views for describing one embodiment of the display device to which the light path control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light path control member according to an embodiment will be described with reference to drawings.

The light path control member described below relates to a switchable light path control member driven in various modes according to electrophoretic particles moving by application of a voltage.

First, a light path control member according to a first embodiment will be described with reference to FIGS. 1 to 7.

Referring to FIGS. 1 to 7, a light path control member 1000 according to the first embodiment may include a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light path control member including the first substrate 110 may also be formed to have flexible, curved, or bent characteristics. Accordingly, the light path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110, a second direction 2A extending in a direction different from the first direction 1A and corresponding to the length or width direction of the first substrate 110, and a third direction 3A extending in a direction different from the first direction 1A and the second direction 2A and corresponding to a thickness direction of the first substrate 110.

For example, the first direction 1A may be defined as the length direction of the first substrate 110, the second direction 2A may be defined as the width direction of the first substrate 110 perpendicular to the first direction 1A, and the third direction 3A may be defined as the thickness direction of the first substrate 110. Alternatively, the first direction 1A may be defined as the width direction of the first substrate 110, the second direction 2A may be defined as the length direction of the first substrate 110 perpendicular to the first direction 1A, and the third direction 3A may be defined as the thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first substrate 110 may include an effective region AA and an ineffective region UA. In detail, the first substrate 110 may include an effective region AA in which a path of light is changed by the light conversion unit 300 and an ineffective region UA in which an electrode connection portion for connecting an external power source is disposed.

That is, a path of light passing through the light path control member by the external power source transmitted through the ineffective region UA may be controlled or changed through the light conversion unit 300 of the effective region AA.

At least one of the effective region AA and the ineffective region UA of the first substrate 110 may include a first hole h1. In detail, a first hole h1 passing through the first substrate 110 may be formed in at least one of the effective region AA and the ineffective region UA of the first substrate 110.

The first hole formed in the first substrate 110 will be described in detail below.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of 0.05 μm to 2 μm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo). Gold (Au), titanium (Ti), and alloys thereof.

Referring to FIG. 2, the first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the light path control member according to the embodiment may be improved.

The second substrate 120 may be disposed on the first substrate 110. In detail, the second substrate 120 may be disposed on the first electrode 210 on the first substrate 110.

The second substrate 120 may include a material capable of transmitting light. The second substrate 120 may include a transparent material. The second substrate 120 may include a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the second substrate 120 may be a flexible substrate having flexible characteristics.

Further, the second substrate 120 may be a curved or bended substrate. That is, the light path control member including the second substrate 120 may also be formed to have flexible, curved, or bent characteristics. Accordingly, the light path control member according to the embodiment may be changed to various designs.

The second substrate 120 may also extend in the first direction 1A, the second direction 2A, and the third direction 3A in the same manner as the first substrate 110 described above.

In detail, the second substrate 120 may include the first direction 1A corresponding to a length or width direction of the second substrate 120, the second direction 2A extending in a direction different from the first direction 1A and corresponding to the length or width direction of the second substrate 120, and the third direction 3A extending in the direction different from the first direction 1A and the second direction 2A and corresponding to the thickness direction of the second substrate 120.

For example, the first direction 1A may be defined as the length direction of the second substrate 120, the second direction 2A may be defined as the width direction of the second substrate 120 perpendicular to the first direction 1A, and the third direction 3A may be defined as the thickness direction of the second substrate 120.

Alternatively, the first direction 1A may be defined as the width direction of the second substrate 120, the second direction 2A may be defined as the length direction of the second substrate 120 perpendicular to the first direction 1A, and the third direction 3A may be defined as the thickness direction of the second substrate 120.

Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second substrate 120 may include an effective region AA and an ineffective region UA. In detail, the second substrate 120 includes an effective region AA in which a path of light is changed by the light conversion unit 300 and an ineffective region UA in which an electrode connection portion for connecting an external power source is disposed.

That is, a path of light passing through the light path control member by the external power source transmitted through the ineffective region UA may be controlled or changed through the light conversion unit 300 of the effective region AA.

At least one of the effective region AA and the ineffective region UA of the second substrate 120 may include a second hole h2. In detail, a second hole h2 passing through the second substrate 120 may be formed in at least one of the effective region AA and the ineffective region UA of the second substrate 120.

The second hole formed in the second substrate 120 will be described in detail below.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above.

The second electrode 220 may include a transparent conductive material. For example, the second electrode 220 may include a conductive material having a light transmittance of about 80% or more. As an example, the second electrode 220 may include a metal oxide such as indium tin oxide, indium zinc oxide, copper oxide, tin oxide, zinc oxide, titanium oxide, etc.

The second electrode 220 may have a thickness of about 0.1 μm to about 0.5 μm.

Alternatively, the second electrode 220 may include various metals to realize low resistance. For example, the second electrode 220 may include at least one metal of chromium (Cr), nickel (Ni), copper (Cu), aluminum (Al), silver (Ag), molybdenum (Mo). gold (Au), titanium (Ti), and alloys thereof.

Referring to FIG. 3, the second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a uniform pattern such as a mesh or stripe shape.

For example, the second electrode 220 may include a plurality of conductive patterns. In detail, the second electrode 220 may include a plurality of mesh lines crossing each other and a plurality of mesh openings formed by the mesh lines.

Accordingly, even though the second electrode 220 includes a metal, the second electrode 220 is not visually recognized from the outside, so that visibility may be improved. In addition, the light transmittance is increased by the openings, so that the brightness of the light path control member according to the embodiment may be improved.

The first substrate 110 and the second substrate 120 may have sizes corresponding to each other. The first substrate 110 and the second substrate 120 may have sizes the same as or similar to each other.

In detail, a first length extending in the first direction 1A of the first substrate 110 may have a size the same as or similar to a second length L2 extending in the first direction 1A of the second substrate 120.

For example, the first length and the second length may have a size of 300 mm to 400 mm.

In addition, a first width extending in the second direction 2A of the first substrate 110 may have a size the same as or similar to a second width extending in the second direction 2A of the second substrate 120.

For example, the first width and the second width may have a size of 150 mm to 200 mm.

In addition, a first thickness extending in the third direction 3A of the first substrate 110 may have a size the same as or similar to a second thickness extending in the third direction 3A of the second substrate 120.

For example, the first thickness and the second thickness may have a size of 30 μm to 200 μm.

Alternatively, the first substrate 110 and the second substrate 120 may have different sizes.

In detail, the first length extending in the first direction 1A of the first substrate 110 may have a size the same as or similar to a second length L2 extending in the first direction 1A of the second substrate 120 within a size range of 300 mm to 400 mm.

In addition, the first width extending in the second direction 2A of the first substrate 110 may have a size different from the second width extending in the second direction 2A of the second substrate 120 within a size range of 150 mm to 200 mm.

For example, the second width extending in the second direction of the second substrate 110 may be smaller than a size of the first width extending in the second direction 2A of the first substrate 110.

Referring to FIG. 1, the first substrate 110 and the second substrate 120 may be disposed to be misaligned from each other.

In detail, the first substrate 110 and the second substrate 120 may be disposed at positions misaligned from each other in the first direction 1A. In detail, the first substrate 110 and the second substrate 120 may be disposed so that side surfaces of the substrates are misaligned from each other.

Accordingly, the first substrate 110 may be disposed to protrude in one direction of the first direction 1A, and the second substrate 120 may be disposed to protrude in the other direction of the first direction 1A.

That is, the first substrate 110 may include a first protrusion protruding in one direction of the first direction 1A, and the second substrate 110 may include a second protrusion protruding in the other direction of the first direction 1A.

The first protrusion may be defined as the ineffective region UA of the first substrate 110 described above. In addition, the second protrusion may be defined as the ineffective region UA of the second substrate 120 described above.

Accordingly, the light path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

That is, the ineffective region UA of the first substrate 110 and the ineffective region UA of the second substrate 120 may be an electrode connection region.

Meanwhile, the first electrode 210 and the second electrode 220 may include different materials.

In detail, the first electrode 210 may include a conductive nanowire. In detail, the first electrode 210 may include a conductive nanowire including a metal.

Referring to FIGS. 4 and 5, the first electrode 210 may be disposed on the first substrate 110. In detail, the first electrode 210 may be in direct contact with the first substrate 110.

The first electrode 210 may include a coating layer 210a and a conductive nanowire 210b. In detail, the first electrode 210 may include the coating layer 210a and the conductive nanowire 210b dispersed in the coating layer 210a.

The conductive nanowire 210b may include a metal. In detail, the conductive nanowire 210b may include silver (Ag). That is, the conductive nanowire 210b may include silver nanowire.

The coating layer 210a may accommodate the conductive nanowire 210b. That is, the conductive nanowire 210b may be accommodated in the coating layer 210a and disposed to be dispersed in the coating layer 210a.

The coating layer 210a may be a protective layer protecting the conductive nanowire 210b. In detail, the coating layer 210a may protect the conductive nanowire 210b from penetration of external moisture and impurities. That is, the coating layer 210a may be a kind of overcoating layer that protects the conductive nanowire 210b.

In addition, the coating layer 210a may be a buffer layer that facilitates adhesion between the first electrode 210 and other members. That is, adhesion between the first electrode 210 and the light conversion unit 300 may be improved by the coating layer 210a. In detail, the adhesion between the first electrode 210 and the light conversion unit 300 may be improved by the coating layer 210a including the same material as the light conversion unit 300 or a resin of a series similar to that of the light conversion unit 300.

The coating layer 210a may include a resin material. The coating layer 210a may include a liquid resin material. For example, the coating layer 210a may include a liquid resin of polyvinyl alcohol (PVA), polyethylene glycol (PEG), or a urethane or acryl-based polymer.

Referring to FIG. 5, the first electrode 210 and the light conversion unit 300 may be disposed in contact with each other by the first electrode 210 including the coating layer 210a. That is, a separate buffer layer 410 for improving adhesion between an electrode material including a metal and the light conversion unit 300 including the resin material may be removed.

Therefore, in the light path control member according to the embodiment, an overall thickness may be reduced by removing the buffer layer between the first electrode and the light conversion unit, and accordingly, the light path control member having a thinner thickness may be manufactured.

In addition, a loss of a voltage moving from the first electrode to the light conversion unit may be reduced by a low conductivity buffer layer, thereby improving driving characteristics of the light path control member.

Meanwhile, the second electrode 220 may include a metal oxide such as indium tin oxide, indium zinc oxide, copper oxide, tin oxide, zinc oxide, and titanium oxide as described above or at least one metal of chromium (Cr), nickel (Ni), copper (Cu), aluminum (Al), silver (Ag), molybdenum (Mo). gold (Au), titanium (Ti), and alloys thereof.

That is, the second electrode 220 may be directly disposed on the second substrate 120 without a separate coating layer.

In addition, the first electrode 210 and the second electrode 220 may include the same material.

In detail, the first electrode 210 and the second electrode 220 may include conductive nanowire. In detail, the first electrode 210 and the second electrode 220 may include a conductive nanowire including a metal. For example, the first electrode 210 and the second electrode 220 may include a silver nanowire.

Accordingly, the first electrode 210 and the second electrode 220 may include a coating layer and a conductive nanowire accommodated in the coating layer.

The conductive nanowire may have a lower resistance than that of a material of the second electrode described above. Accordingly, as the second electrode 210 includes the conductive nanowire, a surface resistance of the second electrode may decrease.

In detail, the first electrode 210 and the second electrode 220 may have a surface resistance of 30 Ω/sq to 100 Ω/sq. In more detail, the first electrode 210 and the second electrode 220 may have a surface resistance of 45 Ω/sq to 80

Ω/sq. In more detail, the first electrode 210 and the second electrode 220 may have a surface resistance of 50 Ω/sq to 70 Ω/sq.

When the first electrode 210 and the second electrode 220 have a surface resistance exceeding 100 Ω/sq, the driving characteristics of the light path control member may be deteriorated dur to the high resistance of the first electrode 210 and the second electrode 220.

In addition, when the first electrode 210 and the second electrode 220 have a surface resistance of less than 30 Ω/sq, process efficiency may be reduced due to implementation of a thickness of the electrode.

In addition, the first electrode 210 and the second electrode 220 may have a low light scattering transmittance. In detail, the first electrode 210 and the second electrode 220 may have a light scattering transmittance of 0.01% to 0.5%. In more detail, the first electrode 210 and the second electrode 220 may have a light scattering transmittance of 0.05% to 0.4%. In more detail, the first electrode 210 and the second electrode 220 may have a light scattering transmittance of 0.1% to 0.2%.

Accordingly, an amount of light emitted from the light path controlling member in a front direction by reducing the light scattering transmittance through the first electrode 210 and the second electrode 220, thereby improving a front luminance.

The light conversion unit 300 may be disposed between the first substrate 110 and the second substrate 120. In detail, the light conversion unit 300 may be disposed between the first electrode 210 and the second electrode 220.

An adhesive layer or a buffer layer may be disposed between at least one of between the light conversion unit 300 and the first substrate 110 or between the light conversion unit 300 and the second substrate 120, and the first substrate 110, the second substrate 120, and the light conversion unit 300 may be adhered to each other by the adhesive layer and/or the buffer layer.

The light conversion unit 300 may include a plurality of partition wall parts and reception parts. Light conversion particles that move by application of a voltage may be disposed in the reception part, and light transmission characteristics of the light path control member may be changed by the light conversion particles.

Referring to FIGS. 6 and 7, the light conversion unit 300 may a partition wall part 310 and a reception part 320.

The partition wall part 310 may be defined as a partition wall part dividing the reception part. That is, the partition wall part 310 may transmit light as a barrier region dividing a plurality of reception parts. In addition, the reception part 320 may be defined as a variable region where the reception part 320 is switched to a light blocking part and a light transmitting part according to application of a voltage.

The partition wall part 310 and the reception part 320 may be alternately disposed with each other. The partition wall part 310 and the reception part 320 may be disposed to have different widths. For example, a width of the partition wall part 310 may be greater than that of the reception part 320.

The partition wall part 310 and the reception part 320 may be alternately disposed with each other. In detail, the partition wall part 310 and the reception part 320 may be alternately disposed with each other. That is, each of the partition wall parts 310 may be disposed between the reception parts 320 adjacent to each other, and each of the reception parts 320 may be disposed between the adjacent partition wall parts 310.

The partition wall part 310 may include a transparent material. The partition wall part 310 may include a material that may transmit light.

The partition wall part 310 may include a resin material. For example, the partition wall part 310 may include a photo-curable resin material. As an example, the partition wall part 310 may include a UV resin or a transparent photoresist resin. Alternatively, the partition wall part 310 may include urethane resin or acrylic resin.

The partition wall part 310 may transmit light incident on any one of the first substrate 110 and the second substrate 120 toward another substrate.

For example, in FIGS. 6 and 7, light may be emitted from the first substrate 110 by a light source disposed under the first substrate 110, and the light may be incident toward the second substrate 120. In this case, the partition wall part 310 may transmit the light, and the transmitted light may move toward the second substrate 120.

The reception part 320 may include the dispersion liquid 320a and the light conversion particles 320b. In detail, the reception part 320 may be filled by injecting the dispersion liquid 320a. A plurality of light conversion particles 320b may be dispersed in the dispersion liquid 320a.

The dispersion liquid 320a may be a material for dispersing the light conversion particles 320b. The dispersion liquid 320a may include a transparent material. The dispersion liquid 320a may include a non-polar solvent. In addition, the dispersion liquid 320a may include a material capable of transmitting light. For example, the dispersion liquid 320a may include at least one of a halocarbon-based oil, a paraffin-based oil, and isopropyl alcohol.

The light conversion particles 320b may be disposed to be dispersed in the dispersion liquid 320a. In detail, the plurality of light conversion particles 320b may be disposed to be spaced apart from each other in the dispersion liquid 320a.

The light conversion particles 320b may include a material capable of absorbing light. That is, the light conversion particles 320b may be light absorbing particles. The light conversion particles 320b may have a color. For example, the light conversion particles 320b may have a black-based color. As an example, the light conversion particles 320b may include carbon black.

The light conversion particles 320b may have a polarity by charging a surface thereof. For example, the surface of the light conversion particles 320b may be charged with a negative (−) charge. Accordingly, according to the application of the voltage, the light conversion particles 320b may move toward the first electrode 210 or the second electrode 220.

The light transmittance of the reception part 320 may be changed by the light conversion particles 320b. In detail, the reception part 320 may be switched to the light blocking part and the light transmitting part by changing the light transmittance due to the movement of the light conversion particles 320b. That is, the reception part 320 may change the transmittance of light passing through the reception part 320 by dispersion and aggregation of the light conversion particles 320b disposed inside the dispersion liquid 320a.

For example, the light path control member according to the embodiment may be converted from a first mode to a second mode or from the second mode to the first mode by a voltage applied to the first electrode 210 and the second electrode 220.

In detail, in the light path control member according to the embodiment, the reception part 320 becomes the light blocking part in the first mode, and light of a specific angle may be blocked by the reception part 320. That is, a viewing angle of the user viewing from the outside is narrowed, so that the light path control member may be driven in a privacy mode.

In addition, in the light path control member according to the embodiment, the reception part 320 becomes the light transmitting part in the second mode, and in the light path control member according to the embodiment, light may be transmitted through both the partition wall part 310 and the reception part 320. That is, the viewing angle of the user viewing from the outside may be widened, so that the light path control member may be driven in a public mode.

Switching from the first mode to the second mode, that is, the conversion of the reception part 320 from the light blocking part to the light transmitting part may be realized by movement of the light conversion particles 320b of the reception part 320. That is, the light conversion particles 320b may have a charge on the surface thereof and may move toward the first electrode or the second electrode according to the application of a voltage according to characteristics of the charge. That is, the light conversion particles 320b may be electrophoretic particles In detail, the reception part 320 may be electrically connected to the first electrode 210 and the second electrode 220.

In this case, when a voltage is not applied to the light path control member from the outside, the light conversion particles 320b of the reception part 320 are uniformly dispersed in the dispersion liquid 320a, and the reception part 320 may block light by the light conversion particles. Accordingly, in the first mode, the reception part 320 may be driven as the light blocking part.

Alternatively, when a voltage is applied to the light path control member from the outside, the light conversion particles 320b may move. For example, the light conversion particles 320b may move toward one end or the other end of the reception part 320 by a voltage transmitted through the first electrode 210 and the second electrode 220. That is, the light conversion particles 320b may move from the reception part 320 toward the first electrode 210 or the second electrode 220.

In detail, when a voltage is applied to the first electrode 210 and/or the second electrode 220, an electric field is formed between the first electrode 210 and the second electrode 220, and the light conversion particles 320b charged with the negative charge may move toward a positive electrode of the first electrode 210 and the second electrode 220 using the dispersion liquid 320a as a medium.

That is, when the voltage is applied to the first electrode 210 and/or the second electrode 220, as shown in FIG. 10, the light conversion particles 320b may move toward the first electrode 210 in the dispersion liquid 320a. That is, the light conversion particles 320b may move in one direction, and the reception part 320 may be driven as the light transmitting part.

Alternatively, when the voltage is not applied to the first electrode 210 and/or the second electrode 220, as shown in FIG. 7, the light conversion particles 320b may be uniformly dispersed in the dispersion liquid 320a to drive the reception part 320 as the light blocking part.

Accordingly, the light path control member according to the embodiment may be driven in two modes according to a user's surrounding environment. That is, when the user requires light transmission only at a specific viewing angle, the reception part is driven as the light blocking part, or in an environment in which the user requires high brightness, a voltage may be applied to drive the reception part as the light transmitting part.

Therefore, since the light path control member according to the embodiment may be implemented in two modes according to the user's requirement, the light path control member may be applied regardless of the user's environment.

As described above, at least one of the first substrate 110 and the second substrate 120 may include a hole. For example, as shown in FIGS. 6 and 7, a plurality of holes are formed in the first substrate 110 and the second substrate 120, or as shown in FIG. 8, a hole may be formed in any one of the first substrate 110 and the second substrate 120.

A first hole h1 formed in the first substrate 110 may be formed in the ineffective region UA of the first substrate 110. The first substrate 110 may include a first surface 111 facing the first electrode 210 and a second surface 112 opposite to the first surface 111, and the first hole h1 may be formed to pass through the first surface 111 and the second surface 112 of the first substrate 110.

Accordingly, the first electrode 210 may be exposed on the second surface 112 of the first substrate 110. That is, the first electrode 210 may be disposed inside the first hole h1, and the first electrode 210 disposed in the first hole h1 may be exposed to the outside in the ineffective region UA of the first substrate 110 through the second surface 112 of the first substrate 110.

In addition, the second hole h2 of the second substrate 120 may be formed in the ineffective region UA of the second substrate 120. The second substrate 120 may include a first surface 121 facing the second electrode 220 and a second surface 122 opposite to the first surface 121, and the second hole h2 may be formed through the first surface 121 and the second surface 122 of the second substrate 120.

Accordingly, the second electrode 220 may be exposed on the second surface 122 of the second substrate 120. That is, the second electrode 220 may be disposed in the second hole h2, and the second electrode 220 disposed in the second hole h2 may be exposed to the outside in the ineffective region UA of the second substrate 120 through the second surface 112 of the second substrate 120.

That is, when holes are formed in both the first substrate 110 and the second substrate 120, the first hole h1 and the second hole h2 may be disposed so as not to overlap each other in the third direction.

The first hole h1 and the second hole h2 may have a predetermined width. Here, widths of the first hole h1 and the second hole h2 may be defined as a long width of the first hole h1 and the second hole h2.

The widths of the first hole h1 and the second hole h2 may be 30 μm or less. In detail, the widths of the first hole h1 and the second hole h2 may be 10 μm to 30 μm. In more detail, the widths of the first hole h1 and the second hole h2 may be 15 μm to 25 μm, When the widths of the first hole h1 and the second hole h2 exceeds 30 μm, the hole formed in the first substrate and the second substrate may be visually recognized by the user due to a size of the hole, and thus visibility of the light path control member and a display device including the same may be deteriorated.

When the widths of the first hole h1 and the second hole h2 is less than 10 μm, an electrode material constituting the first electrode and the second electrode may not easily fill the inside of the hole, and a contact area between the electrode and the printed circuit board that are connected through the hole is reduced, and thus reliability of the light path control member and the display device including the same may be deteriorated.

The widths of the first hole h1 and the second hole h2 may be different from each other on the first surfaces 111 and 121 and the second surfaces 121 and 122.

In detail, a width w1 of the first surface 111 of the first hole h1 may be different from a width w2 of the second surface 112, and the width w1 of the first surface 121 of the second hole h2 may be different from the width w1 of the second surface 122.

In detail, a width of the first hole h1 may decrease while extending from the second surface toward the first surface. That is, in the width of the first hole h1, the width w2 of the second surface may be greater than the width w1 of the first surface.

In addition, a width of the second hole h2 may decrease while extending from the second surface toward the first surface. That is, in the width of the second hole h2, a width w2' of the second surface may be greater than a width w1' of the first surface.

That is, the width of the first hole h1 may decrease as it extends in the direction of the first electrode 210, and the width of the second hole h2 decreases as it extends in the direction of the second electrode 220.

Accordingly, it is possible to reduce an area of the hole while securing a contact area between the electrode and the printed circuit board through the hole, thereby minimizing a decrease in a supporting force of the substrate.

In addition, the widths of the first hole h1 and the second hole h2 may be different from a size of the reception part 320. For example, the widths of the first hole h1 and the second hole h2 may be greater than a width w3 of the reception part 320.

For example, the width w3 of the reception part 320 may be about 5 μm to about 25 μm, and the widths of the first hole h1 and the second hole h2 within the above range may be greater than the width of the portion 320.

In addition, the widths of the first hole h1 and the second hole h2 may be the same as or different from a width w4 of the partition wall part 310.

For example, the width of the partition wall part 310 may be about 10 μm to about 40 μm, and the widths of the first hole h1 and the second hole h2 within the above range may be the same as or different from the width w4 of the partition wall part 310.

An area of the first hole h1 disposed in the ineffective region UA of the first substrate 110 may be similar to an area of the second hole h2 disposed in the ineffective region UA of the second substrate 120.

For example, the area of the second hole h2 may be about 80% or more of the area of the first hole h1. In detail, the area of the second hole h2 may be about 90% or more of the area of the first hole h1. In more detail, the area of the second hole h2 may be about 99% or more of the area of the first hole h1.

Accordingly, by making areas of holes formed in the first substrate 110 and the second substrate 120 similar, a difference in strength between the first substrate 110 and the second substrate 120 may be alleviated, and it is possible to prevent damage to the light path control member due to stress unevenness by preventing stress unevenness due to such a difference in strength.

As a hole is formed in at least one of the first substrate 110 and the second substrate 120, the printed circuit board may be connected to an outer surface of the substrate in which the hole is formed.

For example, when the hole h is formed in each of the first substrate 110 and the second substrate 120 as shown in FIGS. 6 and 7, the first electrode 210 may be exposed on the second surface 112 of the first substrate 110. That is, the first electrode 210 may be exposed on the outer surface of the light path control member.

In addition, the second electrode 220 may be exposed on the second surface 122 of the second substrate 120. That is, the second electrode 220 may be exposed on the outer surface of the light path control member.

Accordingly, a printed circuit board 650 that transmits and controls a voltage to the light conversion unit 300 may be connected to the first electrode 210 on the second surface 112 of the first substrate 110. In addition, the printed circuit board 650 that transmits and controls the voltage to the light conversion unit 300 may be connected to the second electrode 220 on the second surface 122 of the second substrate 120.

That is, the first electrode 210 exposed through the first hole h1 may be defined as a first connection electrode, and the second electrode 220 exposed through the second hole h2 may be defined as a second connection electrode.

That is, the printed circuit board 650, the first electrode 210, and the second electrode 220 may be electrically connected to each other through an anisotropic conductive material 610 and a pad portion 620 of the printed circuit board. In detail, the anisotropic conductive material 610 may be disposed at a position overlapping the hole and may electrically connect the pad portion 620 of the printed circuit board and the first electrode 210 and the pad portion 620 of the printed circuit board and the second electrode 220.

Therefore, when the printed circuit board 650, the first electrode 210, and the second electrode 220 are connected, a process of removing the buffer layer 410 and the adhesive layer 420 may be omitted.

That is, when the printed circuit board 650 and the first electrode 210 are connected on the first surface 111 of the first substrate 110, the process of removing the buffer layer 410 disposed on the first surface 111 of the first substrate 110 is required.

In addition, when the printed circuit board 650 and the second electrode 220 are connected on the first surface 121 of the second substrate 120, the process of removing the adhesive layer 420 disposed on the first surface 121 of the second substrate 120 is required.

However, in the light path control member according to the embodiment, since the printed circuit board 650 and the first electrode 210 are connected on the first surface 111 of the first board 110, and the printed circuit board 650) and the second electrode 220 are connected on the second surface 121 of the second substrate 120, such a process of removing the buffer layer and the adhesive layer is not required, thereby facilitating the process.

In addition, the light path control member according to the embodiment may increase a size of the effective region AA. That is, when the printed circuit board 650, the first electrode 210, and the second electrode 220 are connected to the first surface 111 of the first substrate 110 and the first surface of the second substrate 120, a protrusion of the first substrate 110 and a protrusion of the second substrate 120, that is, an area of the ineffective region UA, should be sufficiently secured in order to connect the printed circuit board 650, the first electrode 210, and the second electrode 220, and accordingly, there was a problem that the size of the effective region AA is relatively reduced.

However, in the light path control member according to the embodiment, since the printed circuit board 650, the first electrode 210, and the second electrode 220 are connected through the hole h formed in the first substrate 110 and the second substrate 120, it is not necessary to sufficiently secure a size of the ineffective region for a process of connecting the printed circuit board 650 to the first electrode 210 and the second electrode 220, thereby relatively increasing the effective region of the light path control member.

Meanwhile, when a hole is not formed in the first substrate 110 or the second substrate 120 as shown in FIG. 8, the first electrode or the second electrode is exposed by removing the buffer layer or the adhesive layer from the substrate in which the hole is not formed, and accordingly, the printed circuit board and the electrode may be connected to each other by the 3 and the anisotropic conductive material.

Meanwhile, the reception part may be disposed in a different shape in consideration of driving characteristics and the like.

Referring to FIG. 9, in the light path control member according to another embodiment, both ends of a reception part 320 may be disposed in contact with a buffer layer 410 and an adhesive layer 420 unlike FIGS. 6 to 8.

For example, a lower portion of the reception part 320 may be disposed in contact with the buffer layer 410, and an upper portion of the reception part 320 may be disposed in contact with the adhesive layer 420.

Accordingly, a distance between the reception part 320 and the first electrode 210 may be reduced, so that the voltage applied from the first electrode 210 may be smoothly transmitted to the reception part 320.

Accordingly, a moving speed of the light conversion particles 320b inside the reception part 320 may be improved, and thus the driving characteristics of the light path control member may be improved.

In addition, referring to FIG. 10, in the light path control member according to the embodiment, unlike FIGS. 6 to 8, the reception part 320 may be disposed to have a constant inclination angle θ.

In detail, referring to FIG. 10, the reception part 320 may be disposed to have an inclination angle θ of greater than 0° to less than 90° with respect to the first substrate 110. In detail, the reception part 320 may extend upward while having the inclination angle θ of greater than 0° to less than 90° with respect to one surface of the first substrate 110.

Accordingly, when the light path member is used together with a display panel, moire caused by an overlapping phenomenon between a pattern of the display panel and the reception part 320 of the light path member may be alleviated, thereby improving user visibility.

Hereinafter, a light path control member according to a second embodiment will be described with reference to FIGS. 11 to 13. In the description of the light path control member according to the second embodiment, descriptions of the same as or similar to those of the light path control member according to the first embodiment described above will be omitted. In addition, in the description of the light path control member according to the second embodiment, the same reference numerals are assigned to the same configurations as those of the light path control member according to the first embodiment described above.

Referring to FIGS. 11 to 13, the light path control member according to the second embodiment may include a plurality of holes formed in an ineffective region UA and an effective region AA of at least one of the first substrate 110 and the second substrate 120.

For example, as shown in FIG. 12, holes may be formed in both the effective region AA and the ineffective region UA of the first substrate 110 and the second substrate 120.

Alternatively, as shown in FIG. 13, holes may be formed in the effective region AA and the ineffective region UA of any one of the first substrate 110 and the second substrate 120.

Hereinafter, the light path control member according to the second embodiment will be described with reference to FIGS. 11 and 12.

Referring to FIGS. 11 and 12, the first substrate 110 may include a first hole h1-1 and a third hole h1-2. In detail, the first hole h1-1 may be disposed in the ineffective region UA of the first substrate 110, and the third hole h1-2 may be disposed in the effective region AA of the first substrate 110.

In addition, the second substrate 120 may include a second hole h2-1 and a fourth hole h2-2. In detail, the second hole h2-1 may be disposed in the ineffective region UA of the second substrate 120, and the fourth hole h2-2 may be disposed in the effective region AA of the second substrate 120.

The first hole h1-1 may be formed to pass through the first surface 111 and the second surface 112 in the ineffective region of the first substrate 110. In addition, the second hole h2-1 may be formed to pass through the first surface 121 and the second surface 122 in the ineffective region of the second substrate 120.

Accordingly, the first electrode 210 may be exposed on the second surface 112 of the first substrate 110, and the second electrode 220 may be exposed on the second surface 122 of the second substrate 120.

That is, when the hole h1 is formed in both the first substrate 110 and the second substrate 120, the first hole h1-1 and the second hole h2-1 may be disposed so as not to overlap each other in the third direction.

In the first hole h1-1 and the second hole h2-1, as described in the first embodiment, the printed circuit board 650, the first electrode 210, and the second electrode 220 may be electrically connected to each other through the anisotropic conductive material 610 and the pad portion 620.

The third hole h1-2 may be formed to pass through the first surface 111 and the second surface 112 in the effective region AA of the first substrate 110.

The first electrode 210 may be exposed on the second surface 112 in the effective region AA of the first substrate 110 by the third hole h1-2.

In addition, the fourth hole h2-2 may be formed to pass through the first surface 121 and the second surface 122 in the effective region AA of the second substrate 120.

The second electrode 220 may be exposed on the second surface 122 in the effective region AA of the second substrate 120 by the 4 holes h2-2.

The third hole h1-2 and the fourth hole h2-2 may overlap each other. In detail, the third hole h1-2 and the fourth hole h2-2 may be disposed to overlap each other in the third direction.

Alternatively, the third hole h1-2 and the fourth hole h2-2 may not overlap each other. In detail, the third hole h1-2 and the fourth hole h2-2 may be disposed so as not to overlap each other in the third direction.

Alternatively, at least one of a plurality of third holes h1-2 may overlap the fourth hole h2-2 in thickness directions of the first substrate and the second substrate.

In detail, the third hole h1-2 and the fourth hole h2-2 may partially overlap each other. In detail, the third hole h1-2 and the fourth hole h2-2 may be disposed so as to partially overlap and not to partially overlap in the third direction.

At least one of the third hole h1-2 and the fourth hole h2-2 may be disposed at a position overlapping at least one of the partition wall part 310 and the reception part 320 of the light conversion unit 300.

In detail, at least one of the third hole h1-2 and the fourth hole h2-2 may be disposed at a position overlapping at least one of the partition wall part 310 and the reception part 320 of the light conversion unit 300 in the third direction.

For example, an overlapping ratio of at least one of the third hole h1-2 and the fourth hole h2-2 and the partition wall part 310 may be greater than that of at least one of the third hole h1-2 and the fourth hole h2-2 and the reception part 320.

Accordingly, when the light path control member is driven by the light transmitting part, incident light or emitted light may be scattered by the hole in the path passing through the reception part 320, thereby improving luminance of light in a light transmitting mode.

In addition, by increasing a ratio of holes formed in the partition wall part 310 having a thickness greater than that of the reception part 320, it is possible to prevent a decrease in strength in a specific region of the light conversion unit 300.

Alternatively, the overlapping ratio of at least one of the third hole h1-2 and the fourth hole h2-2 and the reception part 320 may be greater than that of at least one of the third hole h1-2 and the fourth hole h2-2 and the partition wall part 310.

Accordingly, when the light path control member is driven as the light transmitting part, incident light or emitted light may be scattered by the hole in the path passing through the reception part 320, thereby improving luminance of light in the light transmitting mode.

The first hole h1-1 and the second hole h2-1 disposed in the ineffective region UA, the third hole h1-2 and the fourth hole h2-2 disposed in the effective region AA may be disposed in different areas.

In detail, a total area of the first hole h1-1 disposed in the ineffective region UA may be greater than a total area of the third hole h1-2 disposed in the effective region AA.

In addition, a total area of the first hole h2-1 disposed in the ineffective region UA may be greater than a total area of the fourth hole h2-2 disposed in the effective region AA.

In detail, the total area of the third hole h1-2 disposed in the effective region AA may be 20% or less of the total area of the first hole h1-1 disposed in the ineffective region UA. In more detail, the total area of the third hole h1-2 disposed in the effective region AA may be 1% to 15% of the total area of the first hole h1-1 disposed in the ineffective region UA. In more detail, the total area of the third hole h1-2 disposed in the effective region AA may be 5% to 10% of the total area of the first hole h1-1 disposed in the ineffective region UA.

In addition, the total area of the fourth hole h2-2 disposed in the effective region AA may be 20% or less of the total area of the second hole h2-1 disposed in the ineffective region UA. In more detail, the total area of the fourth hole h2-2 disposed in the effective region AA may be 1% to 15% of the total area of the second hole h2-1 disposed in the ineffective region UA. In more detail, the total area of the fourth hole h2-2 disposed in the effective region AA may be 5% to 10% of the total area of the second hole h2-1 disposed in the ineffective region UA.

When the total area of the third hole h1-2 or the fourth hole h2-2 disposed in the effective region AA exceeds 20% of the total area of the first hole h1-1 or the second hole h2-1 disposed in the ineffective region UA, a front transmittance may be reduced by the hole in the effective region, thereby reducing the luminance of the light path control member.

In addition, the total area of the holes disposed in the ineffective region UA and the effective region AA of the first substrate 110 may be similar to the total area of the holes disposed in the ineffective region UA and the effective region AA of the second substrate 120.

For example, the total area of the holes disposed in the ineffective region UA and the effective region AA of the second substrate 120 may be about 80% or more of the total area of the holes disposed in the ineffective region UA and the effective region AA of the first substrate 110. In detail, the total area of the holes disposed in the ineffective region UA and the effective region AA of the second substrate 120 may be about 90% or more of the total area of the holes disposed in the ineffective region UA and the effective region AA of the first substrate 110. In more detail, the total area of the holes disposed in the ineffective region UA and the effective region AA of the second substrate 120 may be about 99% or more of the total area of the holes disposed in the ineffective region UA and the effective region AA of the first substrate 110.

Accordingly, by making areas of holes formed in the first substrate 110 and the second substrate 120 similar, a difference in strength between the first substrate 110 and the second substrate 120 may be alleviated, and it is possible to prevent damage to the light path control member due to stress unevenness by preventing stress unevenness due to such a difference in strength.

In addition, the total area of the first hole h1-1 or the second hole h2-1 disposed in the ineffective region UA may be 50% or less of the total area of the ineffective region UA, respectively. In detail, the total area of the first hole h1-1 or the second hole h2-1 disposed in the ineffective region UA may be 10% to 50% of the total area of the ineffective region UA, respectively. In more detail, the total area of the first hole h1-1 or the second hole h2-1 disposed in the ineffective region UA may be 20% to 30% of the total area of the ineffective region UA, respectively.

When the total area of the first hole h1-1 or the second hole h2-1 disposed in the ineffective region UA exceeds 50% of the total area of the ineffective region UA, respectively, a sealing part disposed in the ineffective region may be introduced into the light conversion unit through a via, thereby deteriorating overall reliability of the light path control member.

In addition, the total area of the third hole h1-2 or the fourth hole h2-2 disposed in the effective region AA may be 10% or less of the total area of the effective region AA, respectively. In detail, the total area of the third hole h1-2 or the fourth hole h2-2 disposed in the ineffective region UA may be 1% to 10% of the total area of the ineffective region UA, respectively. In more detail, the total area of the third hole h1-2 or the fourth hole h2-2 disposed in the ineffective region UA may be 5% to 8% of the total area of the ineffective region UA, respectively.

When the total area of the third hole h1-2 or the fourth hole h2-2 disposed in the effective region AA exceeds 10% of the total area of the effective region AA, respectively, an overall luminance of the light path control member may be lowered by the hole, and external impurities may be introduced the inside through the hole disposed in the effective region or the dispersion liquid may be discharged to the outside through the hole disposed in the effective region, and thus the overall reliability of the light path control member may be deteriorated.

Meanwhile, when a hole is not formed in the first substrate 110 or the second substrate 120 as shown in FIG. 13, the first electrode or the second electrode is exposed by removing the buffer layer or the adhesive layer from the substrate in which the hole is not formed, and accordingly, the printed circuit board and the electrode may be connected to each other by the 3 and the anisotropic conductive material.

Hereinafter, a light path control member according to a third embodiment will be described with reference to FIGS. 14 to 16. In the description of the light path control member according to the third embodiment, descriptions of the same as or similar to those of the light path control member according to the first and second embodiments described above will be omitted. In addition, in the description of the light path control member according to the third embodiment, the same reference numerals are assigned to configurations the same as those of the light path control member according to the first and second embodiments described above.

Referring to FIG. 14, in the light path control member according to the third embodiment, the first substrate 110 and the second substrate 120 may be disposed at positions corresponding to each other. In detail, the first substrate 110 and the second substrate 120 may be disposed so that side surfaces thereof correspond to each other.

Accordingly, the first substrate 110 may be disposed to protrude in one direction of the first direction 1A, and the second substrate 120 may also be disposed to protrude in one direction of the first direction 1A, that is, in the same direction as the first substrate 110.

That is, the first substrate 110 may include a first protrusion protruding in one direction in the first direction 1A, and the second substrate may also include a second protrusion protruding in one direction in the first direction 1A.

The first protrusion may be defined as the ineffective region UA of the first substrate 110, and the second protrusion may be defined as an ineffective region UA of the second substrate 120.

That is, the first protrusion and the second protrusion may protrude in the same direction.

Accordingly, the light path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

That is, the first protrusion and the second protrusion may be an electrode connection region.

At least one of the first substrate 110 and the second substrate 120 may include a plurality of holes. For example, as shown in FIGS. 14 and 15, holes may be formed in the first substrate 110 and the second substrate 120, or as shown in FIG. 16, a plurality of holes may be formed in any one of the first substrate 110 and the second substrate 120.

A first hole h1 formed in the first substrate 110 may be formed in the ineffective region UA of the first substrate 110. The first substrate 110 may include a first surface 111 facing the first electrode 210 and a second surface 112 opposite to the first surface 111, and the first hole h1 may be formed to pass through the first surface 111 and the second surface 112 of the first substrate 110.

Accordingly, the first electrode 210 may be exposed on the second surface 112 of the first substrate 110. That is, the first electrode 210 may be disposed inside the first hole h1, and the first electrode 210 disposed in the first hole h1 may be exposed to the outside in the ineffective region UA of the first substrate 110 through the second surface 112 of the first substrate 110.

In addition, the second hole h2 of the second substrate 120 may be formed in the ineffective region UA of the second substrate 120. The second substrate 120 may include a first surface 121 facing the second electrode 220 and a second surface 122 opposite to the first surface 121, and the second hole h2 may be formed through the first surface 121 and the second surface 122 of the second substrate 120.

Accordingly, the second electrode 220 may be exposed on the second surface 122 of the second substrate 120. That is, the second electrode 220 is disposed in the second hole h2, and the second electrode 220 disposed in the second hole h2 is the second electrode 220 of the second substrate 120. It may be exposed to the outside in the ineffective region UA of the second substrate 120 through the second surface 112.

Since the ineffective region UA of the first substrate 110 and the ineffective region UA of the second substrate 120 overlap each other in the third direction, when holes are formed in both the first substrate 110 and the second substrate 120, the first hole h1 and the second hole h2 may be disposed in the same direction based on the first direction 1A.

For example, the first hole h1 and the second hole h2 may be disposed so as to overlap each other in the third direction while being disposed in the same direction based on the first direction 1A.

Alternatively, the first hole h1 and the second hole h2 may be disposed so as not overlap each other in the third direction while being disposed in the same direction based on the first direction 1A.

Alternatively, at least one first hole h1 of the plurality of first holes h1 may be disposed so as to overlap the second hole h2 in thickness directions of the first substrate and the second substrate.

In detail, the first hole h1 and the second hole h2 may be disposed so as to partially overlap and not to partially overlap in the third direction while being disposed in the same direction based on the first direction 1A.

Meanwhile, when a hole is not formed in the first substrate 110 or the second substrate 120 as shown in FIG. 16, the first electrode or the second electrode is exposed by removing the buffer layer or the adhesive layer from the substrate in which the hole is not formed, and accordingly, the printed circuit board and the electrode may be connected to each other by the 3 and the anisotropic conductive material.

Hereinafter, a light path control member according to a fourth embodiment will be described with reference to FIGS. 17 to 19. In the description of the light path control member according to the fourth embodiment, descriptions of the same as or similar to those of the light path control member according to the first, second, and third embodiments described above will be omitted. In addition, in the description of the light path control member according to the fourth embodiment, the same reference numerals are assigned to configurations the same as those of the light path control member according to the first, second, and third embodiments described above.

Referring to FIG. 17, in the light path control member according to the fourth embodiment, the first substrate 110 and the second substrate 120 may be disposed at positions corresponding to each other, as in the third embodiment described above. In detail, the first substrate 110 and the second substrate 120 may be disposed so that side surfaces thereof correspond to each other.

Accordingly, the first substrate 110 may be disposed to protrude in one direction of the first direction 1A, and the second substrate 120 may also be disposed to protrude in one direction of the first direction 1A, that is, in the same direction as the first substrate 110.

That is, the first substrate 110 may include a first protrusion protruding in one direction in the first direction 1A, and the second substrate may also include a second protrusion protruding in one direction in the first direction 1A.

The first protrusion may be defined as the ineffective region UA of the first substrate 110, and the second protrusion may be defined as an ineffective region UA of the second substrate 120.

That is, the first protrusion and the second protrusion may protrude in the same direction.

Accordingly, the light path control member 1000 may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a connection portion that will be described below.

The light path control member according to the fourth embodiment may include holes formed in the ineffective region UA and the effective region AA of at least one of the first substrate 110 and the second substrate 120. For example, as shown in FIGS. 17 and 18, holes may be formed in both the effective region AA and the ineffective region UA of the first substrate 110 and the second substrate 120. Alternatively, as shown in FIG. 19, holes may be formed in the effective region AA and the ineffective region UA of any one of the first substrate 110 and the second substrate 120.

Hereinafter, the light path control member according to the fourth embodiment will be described with reference to FIGS. 17 and 18.

Referring to FIGS. 17 and 18, the first substrate 110 may include a first hole h1-1 and a third hole h1-2. In detail, the first hole h1-1 may be disposed in the ineffective region UA of the first substrate 110, and the third hole h1-2 may be disposed in the effective region AA of the first substrate 110.

In addition, the second substrate 120 may include a second hole h2-1 and a fourth hole h2-2. In detail, the second hole h2-1 may be disposed in the ineffective region UA of the second substrate 120, and the fourth hole h2-2 may be disposed in the effective region AA of the second substrate 120.

The third hole h1-2 and the fourth hole h2-2 may overlap each other. In detail, the third hole h1-2 and the fourth hole h2-2 may be disposed to overlap each other in the third direction.

Alternatively, the third hole h1-2 and the fourth hole h2-2 may not overlap each other. In detail, the third hole h1-2 and the fourth hole h2-2 may be disposed so as not to overlap each other in the third direction.

Alternatively, at least one third holes h1-2 of a plurality of third holes h1-2 may overlap the fourth hole h2-2 in thickness directions of the first substrate and the second substrate.

In detail, the third hole h1-2 and the fourth hole h2-2 may partially overlap each other. In detail, the third hole h1-2 and the fourth hole h2-2 may be disposed so as to partially overlap and not to partially overlap in the third direction.

In addition, similar to the second embodiment, at least one of the third hole h1-2 and the fourth hole h2-2 may be disposed at a position overlapping at least one of the partition wall part 310 and the reception part 320 of the light conversion unit 300.

In addition, the first hole h1-1 and the second hole h2-1 may be disposed so as to overlap each other in the third direction while being disposed in the same direction based on the first direction 1A.

Alternatively, the first hole h1-1 and the second hole h2-1 may be disposed so as not overlap each other in the third direction while being disposed in the same direction based on the first direction 1A.

Alternatively, at least one first hole h1-1 of the plurality of first holes h1-1 may overlap the second hole h2-1 in thickness directions of the first substrate and the second substrate.

In detail, the first hole h1-1 and the second hole h2-1 may be disposed so as to partially overlap and not to partially overlap in the third direction while being disposed in the same direction based on the first direction 1A.

Meanwhile, when a hole is not formed in the first substrate 110 or the second substrate 120 as shown in FIG. 19, the first electrode or the second electrode is exposed by removing the buffer layer or the adhesive layer from the substrate in which the hole is not formed, and accordingly, the printed circuit board and the electrode may be connected to each other by the 3 and the anisotropic conductive material.

Referring to FIGS. 20 to 22, a sealing part 500 may be disposed on an outer surface of the light path control member.

The sealing part 500 may be disposed to cover the outer surface of the light path control member. In detail, the sealing part 500 may be disposed to partially cover the outer surface of the light path control member. That is, the sealing part 500 may be disposed to partially cover the outer surface of the light path control member while extending from the first substrate 110 toward the second substrate 120.

The light path control member 1000 may include a plurality of side surfaces. In detail, the light path control member 1000 may include side surfaces extending in the first direction 1A and facing each other and side surfaces extending in the second direction 2A and facing each other.

The sealing part 500 may be disposed to surround the side surfaces of the light path control member extending in the first direction 1A. For example, the sealing part 500 may be disposed to surround the side surfaces of the light path control member in which the reception part 320 in which the light conversion particles are disposed is exposed at the light conversion unit 300.

In detail, as shown in FIG. 20, the sealing part 500 may be partially disposed on the side surface of the light path control member while covering the reception part 320 exposed on the side surface of the light path control member.

Alternatively, as shown in FIG. 21, the sealing part 500 may be disposed entirely on the side surface of the light path control member while covering the reception part 320 exposed on the side surface of the light path control member.

In detail, the reception part 320 may be disposed to extend from the light conversion unit 300 in the second direction 2A based on the first substrate 110 and the second substrate 120. That is, the plurality of reception parts 320 may be disposed to extend in the second direction 2A while being spaced apart from each other.

Accordingly, a reception part 320 may be exposed in both surface directions of the first direction 1A of the light conversion unit 300. The sealing part 500 may be disposed to cover the reception part 320 exposed at the light conversion unit 300 to protect the light conversion particles inside the exposed reception part.

That is, the sealing part 500 may be disposed on a part of a side surface of the light conversion unit 300, a part of a lower surface of the first substrate 110, and a part of an upper surface of the second substrate 120. In other words, the sealing part 500 may be disposed on a part of the side surface of the light conversion unit 300, a part of the lower surface of the first substrate 110, and a part of the upper surface of the second substrate 120 while surrounding the exposed reception part of the light conversion unit.

The sealing part 500 may include a resin material having a viscosity of 300 cP or more.

Alternatively, referring to FIG. 22, the sealing part 500 may be disposed to surround the side surfaces of the light path control member extending in the first direction 1A and the side surfaces of the light path control member extending in the second direction 2A.

Accordingly, at least one of the side surfaces of the light conversion unit 300 in the second direction may also be entirely surrounded by the sealing part 500.

Accordingly, in the light path control member according to the embodiment, an outer side surface of the light conversion unit 300 may be entirely sealed by the sealing part 500. That is, it is possible to prevent penetration of impurities, such as moisture and air, that may penetrate into the reception part from the side surface of the light conversion unit 300 in the second direction.

That is, during a manufacturing process of the light path control member, thicknesses of the side surfaces of the light conversion unit 300 in the second direction may be different from each other due to tolerance, and a width of any one of the side surfaces in the second direction is formed to be small, so that the impurities that may permeate into the reception part may permeate into the reception part through the partition wall part.

In the light path control member according to the embodiment, by disposing the sealing part on the side surface of the light conversion unit in the second direction, it is possible to effectively prevent impurity penetration according to a size of the partition wall part.

Meanwhile, it is illustrated that the sealing part is disposed on the outer surface of the light path member in FIGS. 20 to 22, but the embodiment is not limited thereto, and the sealing part may be disposed on the upper surface of the light conversion unit 300.

For example, the light conversion unit 300 may include a reception part region that is not filled with the dispersion liquid, the sealing part may fill the reception part region that is not filled with the dispersion liquid on the light conversion unit 300, and the sealing part may be disposed to partially cover the adhesive layer 420, the second electrode 220, the side surface of the second substrate 120 in the first direction, and the upper surface of the second substrate 120.

That is, when a plurality of light path control members are manufactured by cutting a large-area light path control member, the sealing part may be formed as shown in FIGS. 20 to 22, and when a small-area light path control member is manufactured, the sealing part may be disposed on the light conversion unit 300 while filling the reception part region where the dispersion liquid is not filled.

Hereinafter, a method of manufacturing a light path control member according to an embodiment will be described with reference to FIGS. 23 to 28.

Referring to FIG. 23 the first substrate 110 and the second substrate 120 having a plurality of holes passing through the substrate may be prepared.

The hole h may be formed in the first substrate 110 and the second substrate 120 through a physical process such as punching.

Next, a first substrate 110 and an electrode material for forming a first electrode are prepared. Then, the first substrate 110 is disposed on a carrier film to support the first substrate, and then the electrode material is formed on the upper surface of the first substrate 110 and inside the hole to form the first electrode 210.

Then, in order to protect the exposed electrode, a release film may be attached to the upper surface of the first substrate 110.

The second electrode 220 was formed by filling the second substrate 120 with an electrode material on the upper surface of the second substrate 120 and inside the hole in the same manner as in a process of the first electrode.

Subsequently, referring to FIG. 24, a resin layer 350 may be formed by coating a resin material on the first electrode 210. In detail, the resin layer 350 may be formed by applying a urethane resin or an acrylic resin on the first electrode 210.

In this case, before disposing the resin layer 350, a buffer layer 410 may be additionally disposed on the first electrode 210. In detail, by disposing the resin layer 350 on the buffer layer 410 after disposing the buffer layer 410 having good adhesion to the resin layer 350 on the first electrode 210, it is possible to improve the adhesion of the resin layer 350.

For example, the buffer layer 410 may include an organic material including a lipophilic group such as —CH—, an alkyl group, etc. Having good adhesion to the electrode and a hydrophilic group such as —NH, —OH, —COOH, etc. Having a good adhesion to the resin layer 410.

The resin layer 350 may be disposed on a partial region of the first substrate 110. That is, the resin layer 350 may be disposed in an area smaller than that of the first substrate 110. Accordingly, a region where the resin layer 350 is not disposed and the first electrode 210 is exposed may be formed on the first substrate 110. In addition, when the buffer layer 410 is disposed on the first electrode 210, a region where the buffer layer 410 is exposed may be formed.

However, when the first electrode 210 is formed of the coating layer and the conductive nanowire described above, the buffer layer 410 may not be formed.

Subsequently, referring to FIG. 25, the resin layer 350 may be patterned to form a plurality of partition wall parts 310 and a plurality of reception parts 320 in the resin layer 350. In detail, an engraved portion may be formed in the resin layer 350 to form an engrave-shaped reception part 320 and the emboss-shaped partition wall part 310 between the engraved portions.

Accordingly, a light conversion unit 300 including the partition wall part 310 and the reception part 320 may be formed on the first substrate 110.

Subsequently, referring to FIG. 26, an adhesive layer 420 may be formed by coating an adhesive material on the second electrode 220. In detail, a light-transmitting adhesive layer capable of transmitting light may be formed on the second electrode 220. For example, the adhesive layer 420 may include an optical transparent adhesive layer OCA.

Then, the first substrate 110 and the second substrate 120 may be adhered. In detail, the second substrate 120 may be disposed on the light conversion unit 300, and the second substrate 120 and the light conversion unit 300 may be adhered through the adhesive layer 420 disposed under the second substrate 120.

Subsequently, referring to FIG. 27, the light conversion unit 300 may be cut to manufacture one light path control member. In detail, the light conversion unit 300 may be cut in a longitudinal direction of the light conversion unit 300. That is, along the dotted line shown in FIG. 22, the light conversion unit 300 and the buffer layer 410 under the light conversion unit 300, the first electrode 210, and the first substrate 110 may be cut. A plurality of light path control members A, B, and C may be formed by the cutting process.

In this case, the cutting direction may extend in the same direction as the longitudinal direction of the light conversion unit 300 or may also extend in a different direction. That is, since the printed circuit board connected to the light path control member is connected from the outer surface of the light path control member through the hole, the light path control member may be cut in various directions regardless of the electrode connection region of the light path control member.

Therefore, a size and shape of the light path control member having a unit size to be manufactured may be variously implemented.

Subsequently, referring to FIG. 28, electrode connection regions CA may be formed on outer surfaces of the first substrate 110 and the second substrate 120, respectively.

The electrode connection region may be formed in a region overlapping holes formed in the first substrate 110 and the second substrate 120.

Hereinafter, the present invention will be described in more detail by measuring a transmittance of the light path control member according to Examples and Comparative Examples. Such Examples are merely presented as examples in order to describe the present invention in more detail. Therefore, the present invention is not limited thereto.

Meanwhile, the surface resistance of the electrode of the light path control member described below was measured by a contact method (4 points probe) or a non-contact method using a magnetic field.

In addition, the light scattering transmittance of the light path control member described below was measured using an integrating sphere-type UV-Vis or a Haze Meter device.

In this case, the light scattering transmittance was defined as a value obtained by subtracting the straight light transmittance from the total transmittance.

Example 1

A light path control member was manufactured by the method of manufacturing the light path control member.

In this case, the first electrode and the second electrode were formed by dispersing silver nanowires in a urethane-based coating solution.

In addition, a thickness of each of the first electrode and the second electrode was formed in a thickness of 125 μm.

Then, the surface resistance of the first electrode and the second electrode and the light scattering transmittance of the light path control member were measured.

Example 2

Except that each of the first electrode and the second electrode was formed in a thickness of 50 μm, the light path control member was manufactured in the same manner as in Example 1, and then the surface resistance of first electrode and the second electrode and the light scattering transmittance of the light path control member were measured.

Comparative Example

Except that the first electrode and the second electrode were formed of indium tin oxide (ITO), the light path control member was manufactured in the same manner as in Example 1, and then the surface resistance of first electrode and the second electrode and the light scattering transmittance of the light path control member were measured.

TABLE 1

| | Surface resistance (Ω/sq) | Light scattering transmittance (%) |
|---|---|---|
| Example 1 | 54.70 | 0.40 |
| Example 2 | 32.25 | 0.09 |
| Comparative Example | 110.00 | 0.00 |

Referring to Table 1, it can be seen that the surface resistances of the first and second electrodes of the light path control member according to Examples are very low compared to the surface resistances of the first and second electrodes of the light path control member according to Comparative Example.

Accordingly, by reducing a resistance applied to the light path control member, it is possible to reduce a loss of current transferred from the first electrode and the second electrode to the inside of the reception part in which the light conversion material is disposed.

Therefore, it can be seen that the light path control member according to Examples has improved driving characteristics compared to the light path control member according to Comparative Example.

In addition, it can be seen that the light scattering transmittance of the light path controlling member according to Examples is very similar to the light scattering transmittance of the light path controlling member according to Comparative Example.

The light path control member according to the embodiment may include the electrode including the coating solution and the conductive nanowire.

Accordingly, the surface resistance of the first electrode and the second electrode may be reduced, and the driving characteristics of the light path control member may be improved.

In addition, since the coating solution of the first electrode contains a resin material similar to that of the light conversion unit on the first electrode, when disposing the light conversion unit on the first electrode, a separate buffer layer for preventing a decrease in adhesion due to heterogeneous materials of the first electrode and the light conversion unit may be unnecessary.

Therefore, since the buffer layer may be removed, the thickness of the light path control member may be reduced, and a distance between the first electrode and the light conversion unit may be reduced to improve the driving speed and driving characteristics of the light path control member.

In addition, the light path control member according to the embodiment may include a plurality of through-holes passing through the first substrate and the second substrate.

The first electrode and the second electrode may be exposed in the through-holes of the first substrate and the second substrate, respectively, and the external printed circuit board may be connected to the region where the electrode is exposed.

Therefore, the electrode connection region may be implemented at various positions in the light path control member, so that the light path control member may be applied in various environments.

In addition, when manufacturing the light path control member, cutting is possible regardless of a position of the electrode connection region, and thus it is possible to easily manufacture a plurality of light path control members having various shapes and sizes.

Hereinafter, a light path control member according to a fifth embodiment will be described with reference to FIGS. 29 to 33. The light path control member according to the fifth embodiment may control the arrangement of an adhesive layer to prevent interference of voltage movement due to resistance of the adhesive layer.

Referring to FIGS. 29 to 31, an adhesive layer 420 may be disposed between the light conversion unit 300 and the second electrode 220.

The adhesive layer 420 may include a first adhesive layer 421 and a second adhesive layer 422. In detail, the adhesive layer 420 may include the first adhesive layer 421 and the second adhesive layer 422 formed integrally with each other.

The first adhesive layer 421 may be disposed on an upper surface of the partition wall part 310. That is, the first adhesive layer 421 may be disposed in a region corresponding to the partition wall part 310 based on the third direction 3A.

Thicknesses of the first adhesive layer 421 and the second adhesive layer 422 may be different from each other. In detail, the thickness of the second adhesive layer 422 may be greater than the thickness of the first adhesive layer 421.

The first adhesive layer 421 may be in contact with the second electrode 220. That is, the first adhesive layer 421 may be in contact with the partition wall part 310 and the second electrode 220, and thus the light conversion unit 300 and the second electrode 220 may be adhered to each other.

The second adhesive layer 422 may be disposed in a part of a region corresponding to the reception part.

The second adhesive layer 422 may be disposed to be bent at an end of the first adhesive layer 421. In detail, the second adhesive layer 422 may be bent at the end of the first adhesive layer 421 to be disposed in contact with an inner surface of the reception part 320. In addition, an outer surface of the second adhesive layer 422 may include a curved surface.

The second adhesive layer 422 may be disposed in contact with an inner surface of a part of an entire region of the inner surface of the reception part 320. For example, a size of the inner surface of the second adhesive layer 422 in contact with the second adhesive layer 422 on the inner surface of the reception part 320 may be disposed to be smaller than a size of the inner surface not in contact with the second adhesive layer 422.

That is, the reception part 320 may include a bottom surface BS and inner surfaces IS connected by the bottom surface BS and facing each other, and the second adhesive layer 422 is may be disposed in contact with the inner surface IS.

The second adhesive layers 422 disposed on the inner surfaces of the reception part 320 may be disposed to be spaced apart from each other. That is, the second adhesive layer 422 disposed on one inner surface of the reception part and the second adhesive layer 422 disposed on the other inner surface of the reception part may be disposed to be spaced apart from each other.

Accordingly, a dispersion liquid 320a disposed inside the reception part 320 and in which light conversion particles 320b are dispersed may be disposed in contact with the second adhesive layer 422 while being in contact with the second electrode 222 inside the reception part 320.

That is, the dispersion liquid 320a may be disposed in direct contact with the second electrode 220 through a space between the second adhesive layers spaced apart from each other on the inner surfaces of the reception part 320.

Therefore, since the second adhesive layer 422 is partially disposed in the region corresponding to the reception part 320, the dispersion liquid 320a in which the light conversion particles 320b inside the reception part 320 are dispersed may be in direct contact with the second electrode 220. Accordingly, a distance between the second electrode and the dispersion liquid may be formed to be close to zero, and since there is no resistor between the second electrode and the dispersion liquid, a voltage applied from the second electrode may be effectively transmitted in a direction of the dispersion liquid.

Therefore, the light path control member according to the first embodiment may have improved driving characteristics and driving speed by reducing the distance between the second electrode and the dispersion and removing the resistor interposed therebetween.

FIGS. 32 and 33 are views for describing a process of forming the adhesive layer of the light path control member according to the fifth embodiment.

Referring to FIG. 32, first, an adhesive material 425 may be disposed on a lower surface of the second electrode 220 disposed on a lower surface of the second substrate 120.

In this case, the adhesive material 425 may be disposed in a pattern. In detail, the adhesive material 425 may be disposed on the lower surface of the second electrode 220 only in the region corresponding to the partition wall part 310 of the light conversion unit 300.

That is, the adhesive material 425 may be disposed in a plurality of patterns having a length equal to or less than the width of the partition wall part 310 of the light conversion unit 300.

Subsequently, referring to FIG. 33, the second substrate 120 and the light conversion unit 300 may be adhered to each other through the adhesive material 425, and the dispersion liquid 320a in which the light conversion particles 320b are dispersed may be injected into the reception part 320.

In this case, the adhesive material 425 may be moved in the arrow direction shown in FIG. 12. That is, the adhesive material 425 before curing has a certain viscosity, and a force pressed in the arrow direction by the partition wall part 310 which is a region protruding from the light conversion unit 300 is generated in the process of adhering, and the adhesive material 425 may move in a lateral direction while being adhered by the force.

Accordingly, the adhesive material 425 disposed only in the region corresponding to the partition wall part of the second electrode 220 may be moved toward the bottom surface of the reception part 320 while being in contact with the inner surface of the reception part 320.

Accordingly, after curing the adhesive material 425, the adhesive layer 420 may be formed so as to include the first adhesive layer 421 disposed on the upper surface of the partition wall part 310 and the second adhesive layer 422 flowed into the reception part by the pressure during the adhering process.

Hereinafter, a light path control member according to a sixth embodiment will be described with reference to FIGS. 34 to 37. In the description of the light path control member according to the sixth embodiment, descriptions of configurations the same as or similar to those of the light path control member according to fifth embodiment described above will be omitted. In addition, in the description of the light path controlling member according to the sixth embodiment, the same reference numerals are assigned to configurations the same as and similar to those of the light path controlling member according to the fifth embodiment described above.

Referring to FIGS. 34 and 35, an adhesive layer 420 may be disposed between the light conversion unit 300 and the second electrode 220.

The adhesive layer 420 may include a first adhesive layer 421, a second adhesive layer 422, and a third adhesive layer 423. In detail, the adhesive layer 420 may include the first adhesive layer 421, the second adhesive layer 422, and the third adhesive layer 423 formed integrally with each other.

The first adhesive layer 421 may be disposed on an upper surface of the partition wall part 310. That is, the first adhesive layer 421 may be disposed in a region corresponding to the partition wall part 310 based on the third direction 3A.

The first adhesive layer 421 may be in contact with the second electrode 220. That is, the first adhesive layer 421 may be in contact with the partition wall part 310 and the second electrode 220, and thus the light conversion unit 300 and the second electrode 220 may be adhered to each other.

The second adhesive layer 422 may be disposed to be bent at an end of the first adhesive layer 421. In detail, the second adhesive layer 422 may be bent at the end of the first adhesive layer 421 to be disposed in contact with an inner surface of the reception part 320. In addition, an outer surface of the second adhesive layer 422 may include a curved surface.

The second adhesive layer 422 may be disposed in contact with an inner surface of a part of an entire region of the inner surface of the reception part 320. For example, a size of the inner surface of the second adhesive layer 422 in contact with the second adhesive layer 422 on the inner surface of the reception part 320 may be disposed to be smaller than a size of the inner surface not in contact with the second adhesive layer 422.

The third adhesive layer 423 may extend from the end of the first adhesive layer 421 in a horizontal direction.

The third adhesive layer 423 may be in contact with the second adhesive layer 422. In detail, the third adhesive layer 423 may be in contact with the second adhesive layer 422 facing each other, and accordingly, the third adhesive layer 423 may connect the second adhesive layers 422 facing each other.

That is, the third adhesive layer 423 may be disposed in contact with the second electrode 220 like the first adhesive layer 411. Accordingly, the light conversion unit 300 and the second electrode 220 may be adhered by the third adhesive layer 423.

Accordingly, based on the third direction, the first adhesive layer 421 may be disposed in the region corresponding to the partition wall part 310, and the second adhesive layer 422 and the third adhesive layer 423 may be disposed in a region corresponding to the reception part 320.

In this case, a thickness of the adhesive layer disposed in the region corresponding to the reception part 320 may be smaller than a thickness of the adhesive layer disposed in the region corresponding to the partition wall part 310. In detail, a minimum thickness of the adhesive layer disposed in the region corresponding to the reception part 320 may be smaller than the thickness of the adhesive layer disposed in the region corresponding to the partition wall part 310.

In the light path control member according to the sixth embodiment, the first adhesive layer 421 may have a first thickness t1, the second adhesive layer 422 may have a second thickness t2, and the third adhesive layer 423 may have a third thickness t3, and in this case, the minimum thickness of the adhesive layer disposed in the region corresponding to the reception part 320 may be defined as the third thickness t3 of the third adhesive layer 423.

In this case, the third thickness t3 may be smaller than the first thickness t1. In addition, the second thickness t2 may be greater than the first thickness t1 and the third thickness t3.

That is, the third thickness t3 may be smaller than the first thickness t1, and an average thickness of the second thickness t3 and the third thickness t3 may be greater than the first thickness t1.

That is, the minimum thickness of the adhesive layer in the region corresponding to the reception part 320 may be smaller than the thickness of the adhesive layer in the region corresponding to the partition wall part 310, and in the region corresponding to the reception part 320. The average thickness of the adhesive layer of, may be greater than the thickness of the adhesive layer in the region corresponding to the partition wall part 310.

Accordingly, by making the average thickness of the adhesive layer in the region corresponding to the reception part 320 greater than the thickness of the adhesive layer in the region corresponding to the partition wall part 310, thereby improving adhesion between the light conversion unit 300 and the reception part 320.

In addition, by making the thickness of the third adhesive layer 423 in direct contact with the second electrode 220 smaller than the thickness of the adhesive layer in the region corresponding to the partition wall part 310, thereby improving the driving characteristics of the light path control member.

That is, a distance between the dispersion liquid 320a disposed inside the reception part 320 and the second electrode and a thickness of a resistor interposed therebetween may be minimized to minimize movement interference of a voltage applied in a direction of the dispersion liquid through the second electrode.

Accordingly, the second adhesive layer 422 and the third adhesive layer 430 in the region corresponding to the reception part 320 may serve to adhere the light conversion unit 300 and the second electrode, and at the same time, it is possible to improve the driving characteristics of the reception part.

Therefore, in the light path control member according to the sixth embodiment, adhesive properties between the light conversion unit and the second electrode may be improved by disposing the adhesive layer in both the reception part and the partition wall part, and it is possible to have improved driving characteristics and driving speed by reducing the distance between the second electrode and the dispersion liquid and minimizing the thickness of the resistor interposed therebetween.

FIGS. 36 and 37 are views for describing a process of forming the adhesive layer of the light path controlling member according to the sixth embodiment.

Referring to FIG. 36, first, an adhesive material 425 may be disposed on a lower surface of the second electrode 220 disposed on a lower surface of the second substrate 120.

In this case, the adhesive material 425 may be disposed in a pattern. In detail, the adhesive material 425 may be disposed only in the region corresponding to the partition wall part 310 of the light conversion unit 300 on the lower surface of the second electrode 220.

That is, the adhesive material 425 may be disposed in a plurality of patterns having a length equal to or less than the width of the partition wall part 310 of the light conversion unit 300.

Subsequently, referring to FIG. 37, the second substrate 120 and the light conversion unit 300 may be adhered to each other through the adhesive material 425, and the dispersion liquid 320*a* in which the light conversion particles 320*b* are dispersed may be injected into the reception part 320.

In this case, the adhesive material 425 may be moved in the arrow direction shown in FIG. 16. That is, the adhesive material 425 before curing has a certain viscosity, and a force pressed in the arrow direction by the partition wall part 310 which is a region protruding from the light conversion unit 300 is generated in the process of adhering, and the adhesive material 425 may move in a lateral direction while being adhered by the force.

Accordingly, the first adhesive layer 421 may be formed in the region corresponding to the partition wall part 310, and the adhesive material 425 disposed only in the region corresponding to the partition wall part in the second electrode 220 may be moved toward the bottom surface of the reception part 320 while being in contact with the inner surface of the reception part 320, and thus a second adhesive layer 423 in contact with the inner surface of the reception part 320 may be formed.

In addition, some adhesive materials moving in the lateral direction may be connected to each other along the lower surface of the second electrode 220. That is, in the adhesive material, a third adhesive layer 423*a* moving in the left direction and a fourth adhesive layer 423*b* moving in the right direction may be connected to each other. Accordingly, the third adhesive layer 423 that is in contact with the lower surface of the second electrode 220 and connects the second adhesive layers 423 may be formed.

Accordingly, the adhesive layer 420 including the first adhesive layer 421, the second adhesive layer 422, and the third adhesive layer 423, which are integrally formed in contact with each other and have different thicknesses, may be formed between the second electrode 220 and the light conversion unit 300.

Hereinafter, a light path control member according to a seventh embodiment will be described with reference to FIG. 38. In the description of the light path control member according to the seventh embodiment, descriptions of configurations the same as or similar to those of the light path control member according to the fifth and sixth embodiments described above will be omitted. In addition, in the description of the light path control member according to the seventh embodiment, the same reference numerals are assigned to configurations the same as and similar to those of the light path control member according to the fifth and sixth embodiments described above.

Referring to FIG. 38, an adhesive layer 420 may be disposed between the light conversion unit 300 and the second electrode 220.

The light path controlling member according to the seventh embodiment may include both the adhesive layers according to the fifth and sixth embodiments described above.

In detail, only the second adhesive layer 422 disposed on the inner surface of the reception part 320 may be disposed in a region corresponding to one of the reception parts. In addition, the second adhesive layer 422 disposed on the inner surface of the reception part and the third adhesive layer 423 in contact with the second electrode 220 may be disposed in a region corresponding to the other reception part.

Descriptions of the first adhesive layer 421, the second adhesive layer 422, and the third adhesive layer 423 are the same as those of the adhesive layers of the light path control member according to the fifth and sixth embodiments described above. the following description will be omitted.

Hereinafter, a light path control member according to an eighth embodiment will be described with reference to FIGS. 39 to 42. In the description of the light path control member according to the eighth embodiment, descriptions of configurations the same as or similar to those of the light path control member according to the fifth, sixth, and seventh embodiments described above will be omitted. In addition, in the description of the light path control member according to the eighth embodiment, the same reference numerals are assigned to configurations the same as and similar to those of the light path control member according to the fifth, sixth, and seventh embodiments described above.

Referring to FIGS. 39 and 40, an adhesive layer 420 may be disposed between the light conversion unit 300 and the second electrode 220.

The adhesive layer 420 may include a first adhesive layer 421, a second adhesive layer 422, and a third adhesive layer 423. In detail, the adhesive layer 420 may include the first adhesive layer 421 and the second adhesive layer 422 formed integrally with each other and the third adhesive layer 423 disposed to be spaced apart from the first adhesive layer 421 and the second adhesive layer 422.

The first adhesive layer 421 may be disposed on an upper surface of the partition wall part 310. That is, the first adhesive layer 421 may be disposed in a region corresponding to the partition wall part 310 based on the third direction 3A.

The first adhesive layer 421 may be in contact with the second electrode 220. That is, the first adhesive layer 421 may be in contact with the partition wall part 310 and the second electrode 220, and thus the light conversion unit 300 and the second electrode 220 may be adhered to each other.

The second adhesive layer 422 may be disposed to be bent at an end of the first adhesive layer 421. In detail, the second adhesive layer 422 may be bent at the end of the first adhesive layer 421 to be disposed in contact with an inner surface of the reception part 320. In addition, an outer surface of the second adhesive layer 422 may include a curved surface.

The second adhesive layer 422 may be disposed in contact with an inner surface of a part of an entire region of the inner surface of the reception part 320. For example, a size of the inner surface of the second adhesive layer 422 in contact with the second adhesive layer 422 on the inner surface of the reception part 320 may be disposed to be smaller than a size of the inner surface not in contact with the second adhesive layer 422.

The third adhesive layer 423 may be disposed to be spaced apart from the second adhesive layer 422. The third adhesive layer 423 may be disposed in contact with the second electrode 220. The third adhesive layer 423 may include a plurality of third adhesive layers 423 spaced apart at a first interval S1. Accordingly, an open region OA may be formed between the plurality of third adhesive layers 423 by a distance of the interval S1. That is, the open region OA may be formed between the plurality of third adhesive layers 423 to be spaced apart by the distance of the interval S1 and exposing the second electrode 220.

A size of the first interval S1 defined as a width of the open region OA may be smaller than a maximum width w1 of the reception part 320. In addition, the size of the first interval S1 defined as the width of the open region OA may be 5% or more of the maximum width w1 of the reception part 320. In detail, the size of the first interval S1 defined by the width of the open region OA may be 10% or more of the maximum width w1 of the reception part 320. In more detail, the size of the first interval S1 defined by the width of the open region OA may be 30% or more of the maximum width w1 of the reception part 320.

When the size of the first interval S1 defined by the width of the open region OA is less than 10% of the maximum width of the reception part 320, the plurality of third adhesive layers may be connected to each other during the process, and thus a contact region between the dispersion liquid and the second electrode through the open region is reduced, so that the driving characteristics and driving speed of the light path control member may be reduced.

Accordingly, based on the third direction, the first adhesive layer 421 may be disposed in the region corresponding to the partition wall part 310, and the second adhesive layer 422 and the third adhesive layer 423 may be disposed in the region corresponding to the reception part 320.

In this case, an area of the adhesive layer disposed in the region corresponding to the reception part 320 may be smaller than an area of the adhesive layer disposed in the region corresponding to the partition wall part 310.

In the light path control member according to the eighth embodiment, the first adhesive layer 421 may have a first thickness t1, the second adhesive layer 422 may have a second thickness t2, and the third adhesive layer 423 may have a third thickness t3.

The third thickness t3 may be greater than the second thickness t2 and the first thickness t1. In addition, the second thickness t2 may be greater than the first thickness t1.

For example, the first thickness t1 may be about 5 μm to 30 μm, and the third thickness t3 may be greater than the first thickness t1 and less than or equal to twice the first thickness t1.

In addition, in the light path control member according to the eighth embodiment, the first adhesive layer 421 may have a first area, the second adhesive layer 422 may have a second area, and the third adhesive layer 423 may have a third area.

The third area may be smaller than the second area and the first area. In addition, the second area may be greater than the first area.

Accordingly, an average area of the adhesive layer in the region corresponding to the reception part 320 may be smaller than the area of the adhesive layer in the region corresponding to the partition wall part 310.

Therefore, in the region corresponding to the reception part 320, by increasing thicknesses of the second adhesive layer 422 and the third adhesive layer 423, adhesion between the light conversion unit 300 and the second electrode 220 may be improved even in the region corresponding to the reception part 320.

In addition, in the region corresponding to the reception part 320, by increasing areas of the second adhesive layer 422 and the third adhesive layer 423, resist interference due to the adhesive layer in the region corresponding to the reception part 320 may be minimized.

In addition, the open region OA may be formed in the third adhesive layer 423 so that the dispersion liquid 320a may be in contact with the second electrode 220 through the open region OA. Therefore, a voltage applied in the direction of the dispersion liquid through the second electrode may be efficiently transmitted.

Therefore, in the light path control member according to the eighth embodiment, the adhesive properties between the light conversion unit and the second electrode may be improved by disposing the adhesive layer in both the reception part and the partition wall part, and it is possible to have improved driving characteristics and driving speed by forming a region where the second electrode and the dispersion liquid may be in contact with each other.

FIGS. 41 and 42 are views for describing a process of forming the adhesive layer of the light path controlling member according to the eighth embodiment.

Referring to FIG. 41, first, an adhesive material 425 may be disposed on a lower surface of the second electrode 220 disposed on a lower surface of the second substrate 120.

In this case, the adhesive material 425 may be disposed in a pattern. In detail, the adhesive material 425 may be disposed in the region corresponding to the partition wall part 310 and the region corresponding to the reception part 320 of the light conversion unit 300 on the lower surface of the second electrode 220.

A width of the adhesive material 425 in the region corresponding to the partition wall part 310 may be greater than a width of the adhesive material 425 in the region corresponding to the reception part 320. In addition, a thickness of the adhesive material 425 in the region corresponding to the partition wall part 310 and a thickness of the adhesive material 425 in the region corresponding to the reception part 320 may be the same as or similar to each other. In addition, in the region corresponding to the reception part 320, the adhesive material may be formed in a plurality of patterns spaced apart from each other.

Subsequently, referring to FIG. 42, the second substrate 120 and the light conversion unit 300 may be adhered to each other through the adhesive material 425, and the dispersion liquid 320a in which the light conversion particles 320b are dispersed may be injected into the reception part 320.

In this case, the adhesive material 425 may be moved in the arrow direction shown in FIG. 21. That is, the adhesive material 425 before curing has a certain viscosity, and a force pressed in the arrow direction by the partition wall part 310 which is a region protruding from the light conversion unit 300 is generated in the process of adhering, and the adhesive material 425 may move in a lateral direction while being adhered by the force.

Accordingly, the first adhesive layer 421 may be formed in the region corresponding to the partition wall part 310, and the adhesive material 425 disposed only in the region corresponding to the partition wall part in the second electrode 220 may be moved toward the bottom surface of the reception part 320 while being in contact with the inner surface of the reception part 320, and thus a second adhesive layer 423 in contact with the inner surface of the reception part 320 may be formed.

In addition, since the adhesive material 425 disposed in the region corresponding to the reception part 320 does not generate adhesive pressure due to the partition wall part, the adhesive material 425 may be cured to the thickness and shape before adhesion to form the third adhesive layer 423.

Accordingly, the adhesive layer 420 including the first adhesive layer 421 and the second adhesive layer 422 formed integrally with each other and the third adhesive layer 423 spaced apart from the first adhesive layer and the second adhesive layer and having a large thickness may be formed between the second electrode 220 and the light conversion unit 300.

Hereinafter, a light path control member according to a ninth embodiment will be described with reference to FIGS. 43 to 46. In the description of the light path control member according to the ninth embodiment, descriptions of configurations the same as or similar to those of the light path control member according to the fifth, sixth, seventh, and eighth embodiments described above will be omitted. In addition, in the description of the light path control member according to the ninth embodiment, the same reference numerals are assigned to configurations the same as and similar to those of the light path control member according to the fifth, sixth, seventh, and eighth embodiments described above.

Referring to FIGS. 43 and 44, an adhesive layer 420 may be disposed between the light conversion unit 300 and the second electrode 220.

The adhesive layer 420 may include a plurality of pattern portions P protruding toward the light conversion unit 300. In detail, the adhesive layer 420 may include the plurality of pattern portions P that protrude toward the light conversion unit 300 and are spaced apart from each other.

The drawings illustrate that the pattern portion P has a triangular shape, but the embodiment is not limited thereto, and the pattern portion P may be formed in a polygonal shape other than a triangle or a circular shape including a curved surface.

A width w2 of the pattern portion P and the maximum width w1 of the reception part 320 may be different from each other. In detail, the width w2 of the pattern portion P may be greater than the maximum width w1 of the reception part 320.

In addition, an interval S of the pattern portion P may be formed to have a size equal to or less than the width w2 of the pattern portion P. In detail, the interval S of the pattern portion P may be formed to have a size of 0.1 times to 1 time or less with respect to the width w2 of the pattern portion P.

In the region corresponding to the partition wall part 310, a region between the pattern portions P may be filled with a material constituting the light conversion unit 300. That is, the material of the light conversion unit 300 also including a resin material may be filled between the pattern portions P including the resin material and disposed. Accordingly, in the region corresponding to the partition wall part, a pattern shape of the adhesive layer may be offset by the light conversion unit. That is, a shape of the pattern portion P of the adhesive layer 420 may be removed from the region corresponding to the partition wall part 310 after adhering.

In addition, in the region corresponding to the reception part 320, the region between the pattern portions P may be filled with the dispersion liquid 320*a*. That is, in the region corresponding to the reception part 320, the dispersion liquid 320*a* and the pattern portion P may be in contact with each other. That is, in the region corresponding to the reception part 320, the shape of the pattern portion P of the adhesive layer 420 may be maintained even after adhering.

In addition, a size of the adhesive layer 420 in the region corresponding to the partition wall part 310 and a size of the adhesive layer 420 in the region corresponding to the reception part 320 may be different from each other. In detail, the size of the adhesive layer 420 in the region corresponding to the reception part 320 may be greater than the size of the adhesive layer 420 in the region corresponding to the partition wall part 310.

The pattern portion P disposed in the region corresponding to the reception part 320 may serve as a prism pattern capable of condensing light passing through the reception part. That is, the light passing through the reception part may be condensed through the portion P, and thus the front luminance of the light passing through the reception part and emitted toward the second substrate may be improved.

Therefore, the light path controlling member according to the ninth embodiment may induce the condensing of transmitted light through the adhesive layer having the pattern portion, and thus, the front luminance of the light path controlling member may be improved.

FIGS. 45 and 46 are views for describing a process of forming the adhesive layer of the light path control member according to the ninth embodiment.

Referring to FIG. 45, first, an adhesive material 425 may be disposed on a lower surface of the second electrode 220 disposed on a lower surface of the second substrate 120.

In this case, the adhesive material 425 may include a pattern P. In detail, the adhesive material 425 may include a plurality of patterns P spaced apart from each other. For example, the pattern P may have a moth-eye pattern or an MLA pattern structure, but the embodiment is not limited thereto.

Subsequently, referring to FIG. 46, the second substrate 120 and the light conversion unit 300 may be adhered to each other through the adhesive material 425, and the dispersion liquid 320*a* in which the light conversion particles 320*b* are dispersed may be injected into the reception part 320.

Accordingly, since the partition wall part 310 and the pattern portion P are in contact with each other in the adhering process, a space between the pattern portions P may be filled with a material of the partition wall part 310. That is, in the region corresponding to the partition wall part 310, the shape of the pattern portion P may be offset by the partition wall part 310.

In addition, since the reception part 320 and the pattern portion P are not in contact with each other during the adhering process, the reception part 320 and the pattern portion P may be cured while maintaining the shape of the pattern before adhering.

That is, in a finally manufactured light path control member, the pattern portion of the adhesive material may maintain the shape thereof only in the region corresponding to the reception part 320. Therefore, in the finally manufactured light path control member, the pattern portion of the adhesive layer 420 may be disposed only in the region corresponding to the reception part 320.

In this case, an adhesive pressure may be applied to the adhesive material 425 in the arrow direction shown in FIG. 25. Accordingly, a thickness of the adhesive layer in the region corresponding to the partition wall part 310 and a thickness of the adhesive layer in the region corresponding to the reception part 320 may be changed. That is, as the adhesive layer in the region corresponding to the partition wall part 310 is pressed by the adhesive pressure, the thickness of the adhesive layer in the region corresponding to the partition wall part 310 may be smaller than the thickness of the adhesive layer in the region corresponding to the reception part 320.

That is, the adhesive layer 420 may be formed while maintaining the pattern shape of the adhesive layer only in the region corresponding to the reception part 320.

Hereinafter, a light path control member according to a tenth embodiment will be described with reference to FIGS. 47 to 64.

Referring to FIGS. 47 and 48, a dam part 500 and a sealing part 600 may be disposed between one end of the second substrate 120 in the second direction 2A and one end of the first substrate 110 in the second direction 2A, and between the other end of the second substrate 120 in the second direction 2A and the other end of the first substrate 110 in the second direction 2A.

Referring to FIGS. 49 to 52, the dam part 500 and the sealing part 600 may be disposed on the partition wall part 310 of the light conversion unit 300. In detail, the dam part 500 and the sealing part 600 may be disposed at both ends of the partition wall part 310 in the second direction 2A, respectively. That is, at least two or more dam parts 500 and at least two or more sealing parts 600 may be disposed on the partition wall part 310.

In addition, a second electrode 220 and a second substrate 120 may be disposed on the partition wall part 310 of the light conversion unit 300. In detail, the second electrode 220 may be disposed under the second substrate 120, and an adhesive layer 420 may be disposed between the second electrode 220 and the partition wall part 310, so that the electrode 220 and the partition wall part 310 may be adhered.

The second substrate 120, the second electrode 220, and the adhesive layer 420 may be disposed between the dam parts 500 facing each other. In addition, the second substrate 120, the second electrode 220, and the adhesive layer 420 may be disposed between the sealing parts 600 facing each other. That is, the second substrate 120, the second electrode 220, and the adhesive layer 420 may be disposed between the sealing parts 600 disposed between the dam parts 500.

The dam part 500 and the sealing part 600 may include the same or similar material. For example, the dam part 500 and the sealing part 600 may include a resin material. As an example, the dam part 500 and the sealing part 600 may include a material such as urethane acrylate or epoxy.

A region where the second electrode 220 is disposed may be defined as an effective region, and a region where the dam part 500 and the sealing part 600 are disposed may be defined as an ineffective region. In detail, the region where the second electrode 220 is disposed may be defined as the effective region where a path and transmittance of light change according to the application of voltage, and the region where the dam part 500 and the sealing part 600 are disposed may be defined as the ineffective region where the path and transmittance of light are not affected.

That is, the effective region may be formed on the partition wall part 310 between ineffective regions at both ends of the partition wall part 310. That is, the partition wall part 310 may change from the effective region toward the ineffective region while extending in the second direction. In addition, the second electrode 220, the sealing part 600, and the dam part 500 may be sequentially disposed while extending from the effective region toward the ineffective region.

The dam part 500 and the sealing part 600 may be disposed at the same or similar height to each other.

In addition, an upper surface of the dam part 500 and an upper surface of the sealing part 600 may be disposed on a plane the same as or similar to the upper surface of the second substrate 120.

That is, heights of the dam part 500 and the sealing part 600 may be the same as or similar to a total height of the adhesive layer 420, the second electrode 220, and the second substrate 120. In detail, the heights of the dam part 500 and the sealing part 600 may be formed to be less than or equal to the total height of the adhesive layer 420, the second electrode 220, and the second substrate 120.

Referring to FIG. 49, the heights of the dam part 500 and the sealing part 600 may be the same as or similar to the total height of the adhesive layer 420, the second electrode 220, and the second substrate 120.

Alternatively, referring to FIG. 50, the heights of the dam part 500 and the sealing part 600 may be smaller than the total height of the adhesive layer 420, the second electrode 220, and the second substrate 120. In detail, the heights of the dam part 500 and the sealing part 600 may be smaller than the total height of the adhesive layer 420, the second electrode 220, and the second substrate 120 by a first height h1.

For example, the heights of the dam part 500 and the sealing part 600 may be disposed at a height of 80% or more of the total height of the adhesive layer 420, the second electrode 220, and the second substrate 120. In more detail, the heights of the dam part 500 and the sealing part 600 may be disposed at a height of 80% to 100% of the total height of the adhesive layer 420, the second electrode 220, and the second substrate 120. In more detail, the heights of the dam part 500 and the sealing part 600 may be disposed at a height of 90% to 99% of the total height of the adhesive layer 420, the second electrode 220, and the second substrate 120.

When the heights of the dam part 500 and the sealing part 600 is formed to be less than 80% of the total height of the adhesive layer 420, the second electrode 220, and the second substrate 120, the dispersion liquid may overflow to the outside of the dam during the process due to a decrease in height of the dam part 500, and sealing characteristics may be deteriorated due to a decrease in height of the sealing unit 600. In addition, when the heights of the dam part 500 and the sealing part 600 may be formed to exceed 100% of the total height of the adhesive layer 420, the second electrode 220, and the second substrate 120, a light leakage phenomenon may occur on the upper surface of the light path control member due to a step difference between the dam part 500 and the sealing part 600 and the second substrate 120, thereby reducing luminance.

Meanwhile, referring to FIG. 51, the dam part 500 may be disposed to be spaced apart from an end of the partition wall part 310. That is, the dam parts 500 may be disposed to be spaced apart from both ends of the partition wall part 310, respectively.

For example, the dam parts 500 may be disposed to be spaced apart from both ends of the partition wall part 310 at a predetermined interval s.

Accordingly, on the partition wall part 310, the dam part 500, the sealing part 600, and the adhesive layer 420 may not be disposed by the interval s, and an exposed region where the upper surface of the partition wall part is exposed may be formed.

Such an exposed region may be formed by tolerance in a cutting process when the light path control member is manufactured, and a size of the interval S may be formed to be 3 μm or less.

Referring to FIG. 52, the sealing part 600 may include a first sealing part 610 and a second sealing part 620. The first sealing part 610 may be disposed between the dam part 500 and the dispersion liquid 320a. In addition, the second sealing part 620 may be disposed at the end of the partition wall part 310.

Accordingly, the dam part 500 may be disposed between the first sealing part 610 and the second sealing part 620. The second sealing part 620 may be disposed closer to the end of the partition wall part 310 than the first sealing part 610.

That is, while extending from the effective region to the ineffective region on the partition wall part 310, that is, extending from a central region of the partition wall part 310 to an end region of the partition wall part 310, the adhesive layer 420, the first sealing part 610, the dam part 500, and the second sealing part 620 may be sequentially disposed.

The second sealing part 620 may be disposed between the end of the partition wall part 310 and the dam part 500 to additionally fill the exposed region of the partition wall part 310 according to the tolerance of the manufacturing process.

Accordingly, by preventing the formation of the exposed region on the partition wall part 310 through the second sealing part 620, it is possible to prevent the inflow of external impurities that may be penetrated through the exposed region.

FIGS. 53 and 54 are cross-sectional views of the reception part of the light path control member cut in the second direction.

Referring to FIGS. 53 and 54, a light conversion material may be disposed on the reception part 320 of the light conversion unit 300. In detail, the dispersion liquid 320a and the light conversion particles 320b dispersed in the dispersion liquid 320a may be disposed on the reception part 320. That is, the reception part 320 may include a base layer 321 supporting the reception part and a reception region 322 in which the dispersion liquid 320a is disposed, and the dispersion liquid 320a and the light conversion particles 320b may be disposed inside the reception region 322 on the base layer 321.

The light conversion particles 320b may be moved according to the application of voltage to change the transmittance of the light path control member.

The reception part 320 may include a region where the dispersion liquid 320a and the light conversion particles 320b are disposed, and the region where the dam part 500 and the sealing part 600 are disposed.

In detail, the dam part 500 and the sealing part 600 may be disposed at both ends of the reception part 320 based on the second direction 2A, respectively. That is, at least two or more dam parts 500 and at least two or more sealing parts 600 may be disposed on the reception part 320.

In addition, a second electrode 220 and a second substrate 120 may be disposed on the partition wall part 310 of the light conversion unit 300. The second electrode 220 and the second substrate 120 may be disposed in a region corresponding to the region where the dispersion liquid 320a and the light conversion particles 320b are disposed.

In detail, the second electrode 220 is disposed under the second substrate 120, and an adhesive layer 420 is disposed between the second electrode 220 and the partition wall part 310, so that the electrode 220 and the partition wall part 310 may be adhered.

The second substrate 120, the second electrode 220, the adhesive layer 420, and the dispersion liquid 320a may be disposed between the dam parts 500. In addition, the second substrate 120, the second electrode 220, the adhesive layer 420, and the dispersion liquid 320a may be disposed between the sealing parts 600. That is, the second substrate 120, the second electrode 220, the adhesive layer 420, and the dispersion liquid 320a may be disposed between the sealing parts 600 disposed between the dam parts 500.

A region where the second electrode 220 is disposed may be defined as an effective region, and a region where the dam part 500 and the sealing part 600 are disposed may be defined as an ineffective region. In detail, the region where the second electrode 220 is disposed may be defined as the effective region where a path and transmittance of light change according to the application of voltage, and the region where the dam part 500 and the sealing part 600 are disposed may be defined as the ineffective region where the path and transmittance of light are not affected.

That is, an effective region may be formed on the reception part 320 between ineffective regions at both ends of the reception part 320. That is, the reception part 320 may change from the effective region toward the ineffective region while extending in the second direction. In addition, the dispersion liquid 320a in which the light conversion particles 320b are dispersed, the sealing part 600, and the dam part 500 may be sequentially disposed while extending from the effective region toward the ineffective region.

The dam part 500 and the sealing part 600 may be disposed at the same or similar height to each other.

In addition, an upper surface of the dam part 500 and an upper surface of the sealing part 600 may be disposed on a plane the same as or similar to the upper surface of the second substrate 120.

That is, heights of the dam part 500 and the sealing part 600 may be the same as or similar to a total height of the dispersion liquid 320a, the adhesive layer 420, the second electrode 220, and the second substrate 120. In detail, the heights of the dam part 500 and the sealing part 600 may be formed to be less than or equal to the total height of the dispersion liquid 320a, the adhesive layer 420, the second electrode 220, and the second substrate 120.

Referring to FIG. 53, the heights of the dam part 500 and the sealing part 600 may be the same as or similar to the total height of the dispersion liquid 320a, the adhesive layer 420, the second electrode 220, and the second substrate 120.

Alternatively, referring to FIG. 54, the heights of the dam part 500 and the sealing part 600 may be smaller than the total height of the dispersion liquid 320a, the adhesive layer 420, the second electrode 220, and the second substrate 120. In detail, the heights of the dam part 500 and the sealing part 600 may be smaller than the total height of the dispersion liquid 320a, the adhesive layer 420, the second electrode 220, and the second substrate 120 by a second height h2.

For example, the heights of the dam part 500 and the sealing part 600 may be disposed at a height of 80% or more of the total height of the dispersion liquid 320a, the adhesive layer 420, the second electrode 220, and the second substrate 120. In more detail, the heights of the dam part 500 and the sealing part 600 may be disposed at a height of 80% to 100% of the total height of the dispersion liquid 320a, the adhesive layer 420, the second electrode 220, and the second substrate 120. In more detail, the height of the dam part 500 and the sealing part 600 may be disposed at a height of 90% to 99% of the total height of the dispersion liquid 320a, the adhesive layer 420, the second electrode 220, and the second substrate 120.

When the heights of the dam part 500 and the sealing part 600 is formed to be less than 80% of the total height of the dispersion liquid 320a, the adhesive layer 420, the second electrode 220, and the second substrate 120, the dispersion liquid may overflow to the outside of the dam during the process due to a decrease in height of the dam part 500, and the sealing characteristics may be deteriorated due to a decrease in height of the sealing unit 600. In addition, when the heights of the dam part 500 and the sealing part 600 may be formed to exceed 100% of the total height of the dispersion liquid 320a, the adhesive layer 420, the second electrode 220, and the second substrate 120, a light leakage phenomenon may occur on the upper surface of the light path control member due to a step difference between the dam part 500 and the sealing part 600 and the second substrate 120, thereby reducing luminance.

Meanwhile, although not shown in the drawings, the dam part 500 may be disposed to be spaced apart from an end of the reception part 320. That is, as shown in FIGS. 51 and 52 described above, the dam parts 500 may be disposed to be spaced apart from both ends of the reception part 320, respectively.

Accordingly, an exposed region where the dam part 500, the sealing part 600, and the adhesive layer 420 are not disposed may be formed on the reception part 320.

In addition, an additional sealing part may be further disposed in the exposed region.

Accordingly, by preventing the formation of the exposed region on the reception part 320 through the arrangement of the additional sealing part, it is possible to prevent the inflow of external impurities that may be penetrated through the exposed region.

The dam parts 500 disposed at both ends of the partition wall part 310 and the reception part 320 described above are formed when the dispersion liquid is injected into the reception part 320.

In detail, when the dispersion liquid 320a is injected into the reception part 320, both ends of the reception part 320 in the second direction are exposed, and thus it is possible to restrict the movement of the dispersion liquid 320a by respectively disposing the dam part 500 in an inlet region and an outlet portion of the reception part 320 after injecting the dispersion liquid 320a.

That is, after adhering and disposing the second electrode 220 and the second substrate 120 through the adhesive layer 420 on the partition wall part 310 and the reception part 320, and disposing the dam part at positions spaced apart from both ends of the second substrate 120 in the second direction at a predetermined distance, and then the dispersion liquid may be injected between the dam part and one end of the second substrate 120 in the second direction.

As described above, since the dam part 500 includes a resin material having fluidity, the dam part 500 has a characteristic of spreading in the second direction when disposing the dam part 500 on the partition wall part 310 and the reception part 320, and thus a width of the dam part 500 in the second direction may be increased.

In this case, when the width of the dam part 500 increases, a distance between one end of the second substrate 120 in the second direction and the dam part 500 decreases proportionally, so that process efficiency may be reduced due to a lack of a space for injecting the dispersion liquid. In addition, the ineffective region that is not related to the light path control is increased due to the increase in the width of the dam part, so that the overall size of the light path control member may be increased.

In addition, when a small amount of a material forming the dam part 500 is disposed in order to alleviate the fluidity of the resin material forming the dam part 500, the width of the dam part 500 may be reduced, but the height of the dam part 500 is reduced together, and accordingly, there is a problem that the dispersion liquid overflows out of the dam part when injecting the dispersion liquid.

Therefore, the light path control member according to the embodiment may increase the width of the dam part 500 while decreasing the width of the dam part 500 by imparting thixotrophy to the dam part.

In detail, in order for the dam part 500 to have thixotropy, nanoparticles may be added to the resin material constituting the dam part 500. In detail, the dam part 500 may include a resin composition in which the resin material and the nanoparticles are mixed. The nanoparticles may include a metal or a non-metal oxide. For example, the nanoparticles may include an oxide such as aluminum oxide ($Al_2O_3$), titanium dioxide ($TiO_2$), or silicon dioxide ($SiO_2$).

The nanoparticles may be included in a certain wt % with respect to an entire resin composition. In detail, the nanoparticles may be included in an amount of less than 6 wt % with respect to the entire resin composition. In more detail, the nanoparticles may be included in an amount of more than 2 wt % to less than 6 wt % with respect to the entire resin composition. In more detail, the nanoparticles may be included in an amount of 3 wt % to 5 wt % with respect to the entire resin composition.

When the nanoparticles are included in an amount of 6 wt % or more with respect to the entire resin composition, a supporting force of the dam part may be reduced due to a decrease in the aspect ratio (height of the dam part/width of the dam part) of the dam part 5. 00In addition, when the nanoparticles are included in an amount of 2 wt % or less with respect to the entire the resin composition, the thixotropy of the dam part is small, so that the width of the dam part is increased, and thus the space for injecting the dispersion liquid may be reduced and the ineffective region may be increased.

The dam part 500 of the light path control member according to the embodiment may have the thixotropy due to the resin composition including the nanoparticles, and accordingly, the width of the dam part may have a range of 500 μm to 600 μm, and the height of the dam part may have a range of 100 μm to 150 μm. Here, the height of the dam part may be defined as a highest height of the dam part.

In addition, the dam part may have an aspect ratio (height of the dam/width of the dam part) of the dam part 500 in a range of 0.16 to 0.30 in the width and height range.

FIG. 55 is a view for describing a shape and size of the dam part disposed in the partition wall part 310 and the reception part 320 of the light conversion unit 300.

FIG. 55 (a) is a view for describing the height of the dam part 500 disposed in the partition wall part 310 and the reception part 320, and FIG. 55 (b) is a view for describing the width in the second direction of the dam part 500 disposed in the partition wall part 310 and the reception part 320.

Referring to FIG. 55 (a), the dam part 500 may have an upper surface having a curved surface. In detail, the dam part 500 may be formed in a semicircular shape having a curved surface. That is, the dam part 500 may have a constant maximum height H and may be formed in a shape in which the height decreases as the distance from the center increases.

In addition, referring to FIG. 55 (b), the dam part 500 may have a first width w1 and a second width w2. A maximum width of the dam part disposed in each of the partition wall part and the reception part may be different depending on the viscosity of the resin composition for forming the dam part 500. In this case, the first width w1 may be defined as a width of the dam part 500 disposed on all of the partition wall part and the reception part of the light conversion unit, and the second width w2 may be defined as the maximum width of the dam part 500 formed in a part of the entire reception part and the entire partition wall part of the light conversion unit.

The above-described width of the dam part 500 may be defined as the first width w1, and the above-described sealing unit 600 may be disposed in a region defined as the second width w2. That is, at least one of the entire regions of the partition wall part 310 and the reception part 320 may include a region where the sealing part 600 is disposed on the dam part 500.

Hereinafter, the dam part 500, the sealing unit 600, and the light conversion unit 300 of the light path control member according to the embodiment will be described with reference to FIGS. 56 to 66.

FIGS. 56 to 58 are cross-sectional views of the dam part of the light path control member cut in the first direction.

Referring to FIGS. 56 to 58, the dam part 500 may be disposed on the partition wall part 310 of the light conversion unit 300. In detail, the dam part 500 may be disposed on the partition wall part 310 while filling the reception part 320 of the light conversion unit 300.

A sealing part 600 and a dispersion liquid 320a, which will be described below, may be disposed together in each of the reception parts 320 in which the dam part 500 is disposed. That is, the dispersion liquid 320a, the sealing part 600, and the dam part 500 may be sequentially disposed in each of the reception part 320 in a direction away from the central region of the light path control member.

Referring to FIG. 56, a length of the dam part 500 in the first direction may be the same as a length of the light conversion unit 300 in the first direction.

Alternatively, referring to FIGS. 57 and 58, the length of the dam part 500 in the first direction may be different from the length of the light conversion unit 300 in the first direction.

In detail, referring to FIGS. 57 and 58, the length of the dam part 500 in the first direction may be smaller than the length of the light conversion unit 300 in the first direction.

For example, referring to FIG. 57, the length of the dam part 500 in the first direction may be smaller than the length of the light conversion unit 300 in the first direction. That is, the length of the dam part 500 in the first direction may have a size of a distance from the reception part at one end of the light conversion unit 300 in the first direction to the reception part at the other end of the light conversion unit 300. Accordingly, the light conversion unit 300 may include a partition wall part 320 in which the dam part 500 is not disposed. That is, the partition wall parts at one end and the other end of the light conversion unit 300 in the first direction may include an exposed region EA in which the dam part 500 is not disposed.

Alternatively, referring to FIG. 58, the length of the dam part 500 in the first direction may be smaller than the distance from one end to the other end of the light conversion unit 300 in the first direction. That is, the dam part 500 may be partially disposed on the partition wall part 310 at one end and the partition wall part 310 at the other end in the first direction of the light conversion unit 300.

Accordingly, the light conversion unit 300 may include the partition wall part 320 in which the dam part 500 is not disposed. That is, the partition wall parts at one end and the other end of the light conversion unit 300 in the first direction may include the region where the dam part 500 is disposed and the region where the dam part 500 is not disposed, and accordingly, that is, the partition wall parts at one end and the other end of the light conversion unit 300 in the first direction may include the exposed region EA in which the dam part 500 is not disposed.

FIGS. 59 to 61 are cross-sectional views of the sealing part of the light path control member cut in the first direction.

Referring to FIGS. 59 to 61, the sealing part 600 may be disposed on the partition wall part 310 of the light conversion unit 300. In detail, the sealing part 600 may be disposed on the partition wall part 310 while filling the reception part 320 of the light conversion unit 300.

The sealing part 600 may be disposed between the dispersion liquid 320a and the dam part 500 in each of the reception parts 320 in which the sealing part 600 is disposed. The sealing part 600 may be disposed in contact with the dispersion liquid 320a and may prevent the inflow of external impurities that may be penetrated into the dispersion liquid 320a.

Referring to FIG. 59, a length of the sealing part 600 in the first direction may be the same as the length of the light conversion unit 300 in the first direction.

Alternatively, referring to FIGS. 60 and 61, the length of the sealing part 600 in the first direction may be different from the length of the light conversion unit 300 in the first direction.

In detail, referring to FIGS. 60 and 61, the length of the dam part 500 in the first direction may be smaller than the length of the light conversion unit 300 in the first direction.

For example, referring to FIG. 60, the length of the sealing part 600 in the first direction may have a size of a distance from the reception part at one end of the light conversion unit 300 in the first direction to the reception part at the other end of the light conversion unit 300. Accordingly, the light conversion unit 300 may include a partition wall part 320 in which the sealing part 600 is not disposed. That is, the partition wall parts at one end and the other end of the light conversion unit 300 in the first direction may include an exposed region EA in which the sealing unit 600 is not disposed.

Alternatively, referring to FIG. 61, the length of the sealing unit 600 in the first direction may be smaller than the distance from one end to the other end of the light conversion unit 300 in the first direction. That is, the sealing part 600 may be partially disposed on the partition wall part 310 at one end and the partition wall part 310 at the other end in the first direction of the light conversion unit 300.

Accordingly, the light conversion unit 300 may include the partition wall part 320 in which the sealing part 600 is not disposed. That is, the partition wall parts at one end and the other end of the light conversion unit 300 in the first direction may include the region where the sealing unit 600 is disposed and the region where the sealing unit 600 is not disposed, and accordingly, that is, the partition wall parts at one end and the other end of the light conversion unit 300 in the first direction may include the exposed region EA in which the sealing part 600 is not disposed.

The light path control member according to the tenth embodiment may control the width and height of the dam part disposed in order to inject the dispersion liquid. In detail, as the dam part is formed of the resin composition including the nanoparticles, and thus the dam part may have the thixotrophy.

Accordingly, when disposing the dam part with the resin composition, it is possible to minimize a phenomenon in which the resin composition spreads in one direction, thereby reducing the width of the dam part. In addition, since it is not necessary to reduce an amount of the resin composition in order to reduce the width of the dam part, the height of the dam part may be maintained at a constant height.

Accordingly, it is possible to sufficiently secure the space for injecting the dispersion liquid by reducing the width of the dam part, thereby improving process efficiency of injecting the dispersion liquid, and it is possible to reduce the overall size of the light path control member by reducing a size of the ineffective region due to the reduction of the width of the dam part irrelevant to the light path control member.

In addition, by maintaining the height of the dam part at a constant height, it is possible to prevent the dispersion liquid from overflowing to the outside of the dam part when the dispersion liquid is injected, thereby improving process reliability.

In addition, in the light path control member according to the embodiment, an adhesive layer having a color or an adhesive layer including a reflective material may be disposed at at least one end of the light conversion unit.

Accordingly, the light leakage phenomenon in the lateral direction of the light path control member may be minimized, and thus the front transmittance of the light path control member may be improved.

Therefore, the light path control member according to the tenth embodiment may be easily manufactured and may improve the reliability and luminance of the light path control member.

Hereinafter, referring to FIGS. 62 to 66, a display device to which a light path control member according to an embodiment is applied will be described.

Referring to FIGS. 62 and 63, a light path control member 1000 according to an embodiment may be disposed on or under a display panel 2000.

The display panel 2000 and the light path control member 1000 may be disposed to be adhered to each other. For example, the display panel 2000 and the light path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the light path control member and the display panel, the light path control member and the display panel may be adhered after the release film is removed.

Meanwhile, referring to FIGS. 62 and 63, one end or one end and the other end of the light path control member may protrude, and the light conversion unit may not be disposed at the protruding portion. The protrusion region is an electrode connection portion in which the first electrode 210 and the second electrode 220 are exposed, and may connect an external printed circuit board and the light path control member through the electrode connection portion.

The display panel 2000 may include a first' substrate 2100 and a second' substrate 2200. When the display panel 2000 is a liquid crystal display panel, the light path control member may be formed under the liquid crystal panel. That is, when a surface viewed by the user in the liquid crystal panel is defined as an upper portion of the liquid crystal panel, the light path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 62, the light path control member may be disposed under the liquid crystal panel and on the backlight unit 3000, and the light path control member may be disposed between the backlight unit 3000 and the display panel 2000.

Alternatively, as shown in FIG. 63, when the display panel 2000 is an organic light emitting diode panel, the light path control member may be formed on the organic light emitting diode panel. That is, when the surface viewed by the user in the organic light emitting diode panel is defined as an upper portion of the organic light emitting diode panel, the light path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

That is, light emitted from the display panel 2000 or the backlight unit 3000 may move from the second substrate 120 toward the first substrate 110 of the light path control member.

In addition, although not shown in drawings, a polarizing plate may be further disposed between the light path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection preventing polarizing plate.

In addition, an additional functional layer 1300 such as an anti-reflection layer, an anti-glare, or the like may be further disposed on the light path control member 1000. Specifically, the functional layer 1300 may be adhered to one surface of the first substrate 110 of the light path control member. Although not shown in drawings, the functional layer 1300 may be adhered to the first substrate 110 of the light path control member via an adhesive layer. In addition, a release film for protecting the functional layer may be further disposed on the functional layer 1300.

Further, a touch panel may be further disposed between the display panel and the light path control member.

It is shown in the drawings that the light path control member is disposed at an upper portion of the display panel, but the embodiment is not limited thereto, and the light path control member may be disposed at various positions such as a position in which light is adjustable, that is, a lower portion of the display panel, or between a second substrate and a first substrate of the display panel, or the like.

In addition, it is shown in the drawings that the light conversion unit of the light path control member according to the embodiment is in a direction parallel or perpendicular to an outer surface of the second substrate, but the light conversion unit is formed to be inclined at a predetermined angle from the outer surface of the second substrate. Through this, a moire phenomenon occurring between the display panel and the light path control member may be reduced.

Referring to FIGS. 64 to 66, a light path control member according to an embodiment may be applied to various display devices.

Referring to FIGS. 64 to 66, the light path control member according to the embodiment may be applied to a display device that displays a display.

For example, when power is applied to the light path control member as shown in FIG. 64, the reception part functions as the light transmitting part, so that the display device may be driven in the public mode, and when power is not applied to the light path control member as shown in FIG. 65, the reception part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 66, the display device to which the light path control member according to the embodiment is applied may also be applied inside a vehicle.

For example, the display device including the light path control member according to the embodiment may display a video confirming information of the vehicle and a movement route of the vehicle. The display device may be disposed between a driver seat and a passenger seat of the vehicle.

In addition, the light path control member according to the embodiment may be applied to a dashboard that displays a speed, an engine, an alarm signal, and the like of the vehicle.

Further, the light path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light path control member comprising:
a first substrate;
a first electrode disposed on the first substrate;
a second substrate disposed on the first substrate;
a second electrode disposed under the second substrate; and
a light conversion unit disposed between the first electrode and the second electrode,
wherein at least one of the first electrode and the second electrode includes a coating layer and a conductive nanowire accommodated in the coating layer,
the coating layer and the light conversion unit are disposed in direct contact with each other, and
a surface resistance of at least one of the first electrode and the second electrode is 30 Ω/sq to 100 Ω/sq.

2. The light path control member of claim 1, wherein a light scattering transmittance of at least one of the first electrode and the second electrode is 0.01% to 0.5 $.

3. The light path control member of claim 2, wherein the conductive nanowire includes a silver nanowire.

4. The light path control member of claim 1, wherein the first electrode and the second electrode include the same material.

5. The light path control member of claim 1, wherein the coating layer includes a liquid resin such as polyvinyl alcohol (PVA) and polyethylene glycol (PEG) or a urethane or acryl-based polymer.

6. The light path control member of claim 1, wherein the light conversion unit includes a plurality of reception parts and a plurality of partition wall part,
a dispersion liquid and light conversion particles dispersed in the dispersion liquid are included in the reception part, and
the light conversion particles move by an applied voltage.

7. A light path control member comprising:
a first substrate including an effective region and an ineffective region;
a first electrode disposed on the first substrate;
a second substrate disposed on the first substrate and including an effective region and an ineffective region;
a second electrode disposed under the second substrate; and
a light conversion unit disposed between the first electrode and the second electrode,
wherein the light conversion unit includes a partition wall part and a reception part that are alternately disposed,
a first hole passing through the first substrate is formed in at least one of the effective region and the ineffective region of the first substrate,
a second hole passing through the second substrate is formed in at least one of the effective region and the ineffective region of the second substrate,
a first connection electrode is disposed in the first hole, and
a second connection electrode is disposed in the second hole.

8. The light path control member of claim 7, wherein the ineffective region of the first substrate includes a plurality of first holes,
the ineffective region of the second substrate includes a plurality of second holes, and
at least one hole among the plurality of first holes does not overlap the second hole in a thickness direction of the first substrate and the second substrate.

9. The light path control member of claim 7, wherein widths of the first hole and the second hole are greater than a width of the reception part.

10. The light path control member of claim 7, wherein widths of the first hole and the second hole is 10 µm to 30 µm.

11. The light path control member of claim 7, wherein widths of the first hole and the second hole decrease while extending toward the second electrode.

12. The light path control member of claim 7, wherein the first substrate includes a first surface facing the first electrode and a second surface opposite to the first surface, the second substrate includes a first surface facing the second electrode and a second surface opposite to the first surface, the first hole is exposed to the outside on the second surface of the first substrate, the second hole is exposed to the outside on the second surface of the second substrate, a printed circuit board and the first hole are connected through a pad portion disposed on the second surface of the first substrate, and the printed circuit board and the second hole are connected through a pad portion disposed on the second surface of the second substrate.

13. The light path control member of claim 7, wherein the first substrate includes a plurality of first holes disposed in the ineffective region and a plurality of third holes disposed in the effective region, the second substrate includes a plurality of second holes disposed in the ineffective region and a plurality of fourth holes disposed in the effective region, at least one of the plurality of first holes overlaps the second hole in a thickness direction of the first substrate and the second substrate, and at least one of the plurality of third holes overlaps the fourth hole in the thickness direction of the first substrate and the second substrate.

14. The light path control member of claim 13, wherein the third hole and the fourth hole overlap at least one of the partition wall part and the reception part in the thickness direction of the substrate.

15. The light path control member of claim 7, wherein a dispersion liquid and light conversion particles dispersed in the dispersion liquid are included in the reception part, and the light conversion particles move by an applied voltage.

16. A display device comprising:
a display panel; and
a light path control member disposed on the display panel, wherein the light path control member comprising:
a first substrate including an effective region and an ineffective region;
a first electrode disposed on the first substrate;
a second substrate disposed on the first substrate and including an effective region and an ineffective region;
a second electrode disposed under the second substrate; and
a light conversion unit disposed between the first electrode and the second electrode,
wherein the light conversion unit includes a partition wall part and a reception part alternately disposed,
a first hole passing through the first substrate is formed in at least one of the effective region and the ineffective region of the first substrate,
a second hole passing through the second substrate is formed in at least one of the effective region and the ineffective region of the second substrate,
a first connection electrode is disposed in the first hole, and
a second connection electrode disposed in the second hole.

17. The display device of claim 16, wherein a surface resistance of at least one of the first electrode and the second electrode is 30 Ω/sq to 100 Ω/sq, and a light scattering transmittance of at least one of the first electrode and the second electrode is 0.01% to 0.5%.

18. The display device of claim 16, wherein the first substrate includes a first surface facing the first electrode and a second surface opposite to the first surface, the second substrate includes a first surface facing the second electrode and a second surface opposite to the first surface, the first hole is exposed to the outside on the second surface of the first substrate, the second hole is exposed to the outside on the second surface of the second substrate, a printed circuit board and the first hole are connected through a pad portion disposed on the second surface of the first substrate, and the printed circuit board and the second hole are connected through a pad portion disposed on the second surface of the second substrate.

19. The display device of claim 16, wherein a dispersion liquid and light conversion particles dispersed in the dispersion liquid are included in the reception part, and the light conversion particles move by an applied voltage.

* * * * *